United States Patent
Seto et al.

(10) Patent No.: US 8,293,148 B2
(45) Date of Patent: Oct. 23, 2012

(54) AZO COMPOUNDS, AZO PIGMENTS, PIGMENT DISPERSION, COLORING COMPOSITION, AND INK FOR INKJET RECORDING

(75) Inventors: Nobuo Seto, Shizuoka (JP); Masahiro Higashi, Shizuoka (JP); Keiichi Tateishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/061,574

(22) PCT Filed: Sep. 1, 2009

(86) PCT No.: PCT/JP2009/065273
§ 371 (c)(1),
(2), (4) Date: Mar. 1, 2011

(87) PCT Pub. No.: WO2010/026969
PCT Pub. Date: Mar. 11, 2010

(65) Prior Publication Data
US 2011/0163283 A1    Jul. 7, 2011

(30) Foreign Application Priority Data

Sep. 2, 2008  (JP) .................. 2008-225037
Aug. 31, 2009 (JP) .................. 2009-201142

(51) Int. Cl.
G02B 5/23  (2006.01)
C09B 29/00  (2006.01)
(52) U.S. Cl. .............. 252/586; 106/31.48; 106/31.77; 430/7; 534/774; 534/778
(58) Field of Classification Search ............ 252/586; 534/755, 757, 758, 766, 769, 767, 774, 778; 430/7; 106/31.77, 31.48
See application file for complete search history.

(56) References Cited

U.S. PATENT DOCUMENTS

| | | | |
|---|---|---|---|
| 2,936,306 A | 5/1960 | Schmid et al. | |
| 5,532,346 A | 7/1996 | Moore et al. | |
| 2004/0163569 A1* | 8/2004 | Shakhnovich | 106/31.8 |
| 2011/0143270 A1* | 6/2011 | Seto et al. | 430/7 |

FOREIGN PATENT DOCUMENTS

| | | |
|---|---|---|
| JP | 55-161856 A | 12/1980 |
| JP | 56-38354 A | 4/1981 |
| JP | 3-068955 A | 3/1991 |
| JP | 06-019166 * | 1/1994 |
| JP | 6-019166 A | 1/1994 |
| JP | 8-278642 A | 10/1996 |
| JP | 9511278 T | 11/1997 |
| JP | 11-100519 A | 4/1999 |
| JP | 2004-123866 A | 4/2004 |
| JP | 2005-215286 A | 8/2005 |
| JP | 2008-007732 A | 1/2008 |
| JP | 2008-013472 A | 1/2008 |
| WO | 00/23525 A1 | 4/2000 |
| WO | 2005/052074 A1 | 6/2005 |

OTHER PUBLICATIONS

Pivnenko, Z. A. et al, "Spectrophotometric study of the reactions of the complex formations of iron (III) with azo reagents based on antipyrine" Chemical Abstracts, 1976, vol. 85, abstract No. 171134f.
Written Opinion (PCT/ISA/237) dated Nov. 10, 2009 in PCT/JP2009/065273.
International Search Report (PCT/ISA/210) dated Nov. 10, 2009, in PCT/JP2009/065273.
Examination Report dated Jun. 27, 2012 issued by the European Patent Office in counterpart European Application No. 09811495.2.
Shah, K.H., et al. "Synthesis and dyeing performance of monoazo disperse dyes derived from 3-amino-5-nitro-2, 1-benzisothiazole", Indian Journal of Fibre & Textile Research, Sep. 1998, vol. 23, pp. 189-193.
European Search Report dated Jun. 13, 2012 issued by the European Patent Office in counterpart European Application 09811495.2.

* cited by examiner

*Primary Examiner* — Bijan Ahvazi
(74) *Attorney, Agent, or Firm* — Sughrue Mion, PLLC

(57) ABSTRACT

An azo pigment showing excellent coloring characteristics such as tinctorial strength and hue and excellent fastness such as light fastness, and a pigment dispersion containing the azo pigment are provided.

An azo pigment represented by the following general formula (1) and a pigment dispersion containing the pigment:

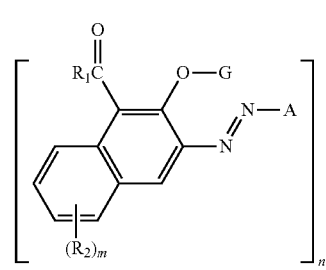

General formula (1)

wherein
G represents a hydrogen atom, an aliphatic group, an aryl group, a heterocyclic group, an acyl group, an aliphatic oxycarbonyl group, a carbamoyl group, or a sulfonyl group,
$R_1$ represents an amino group, an aliphatic oxy group, an aliphatic group, an aryl group, or a heterocyclic group,
$R_2$ represents a substituent,
A represents an aromatic 5- to 6-membered heterocyclic group,
m represents an integer of from 0 to 5, and
n represents an integer of from 1 to 4.

16 Claims, 3 Drawing Sheets

EXEMPLIFIED COMPOUND D-1

EXEMPLIFIED COMPOUND D-23

AZO COMPOUNDS, AZO PIGMENTS, PIGMENT DISPERSION, COLORING COMPOSITION, AND INK FOR INKJET RECORDING

TECHNICAL FIELD

The present invention relates to a novel nitrogen-containing heterocyclic ring azo compound, an azo pigment, a pigment dispersion containing the azo pigment, a coloring composition and an ink for inkjet recording.

BACKGROUND ART

In recent years, as image-recording materials, materials for forming color images have been predominant and, specifically, recording materials for an ink jet system, recording materials for a thermal transfer system, recording materials for an electro-photographic system, transfer type silver halide light-sensitive materials, printing inks, and recording pens have found widespread use. Also, in photographing devices such as CCDs for photographing equipment, and in LCDs and PDPs for display, color filters are used for recording or reproducing a color image. In these color image recording materials and color filters, colorants (dyes or pigments) of three primary colors of a so-called additive color mixing process or subtractive color mixing process have been used in order to display or record full-color images. In actuality, however, there is no fast colorant having the absorption characteristics capable of realizing a preferred color reproduction region and resisting various use conditions and environmental conditions. Thus, the improvement thereof has strongly been desired.

Dyes or pigments to be used for the above-mentioned uses are required to have in common the following properties. That is, they are required to have absorption characteristics favorable in view of color reproduction and have good fastness under the conditions of the environment wherein they are used, for example, fastness against light, heat, and an oxidative gas such as ozone. In addition, in the case where the colorant is a pigment, the pigment is further required to be substantially insoluble in water or in an organic solvent, to have a good fastness to chemicals, and not to lose the preferred absorption characteristics it shows in a molecularly dispersed state even when used as particles. Although the required properties described above can be controlled by adjusting the intensity of intermolecular interaction, both of them are in a trade-off relation with each other, thus being difficult to allow them to be compatible with each other. Besides, in the case of using a pigment as the colorant, the pigment is additionally required to have a particle size and a particle shape necessary for realizing desired transparency, to have good fastness under the conditions of the environment wherein they are used, for example, fastness against light, heat, and an oxidative gas such as ozone, to have good fastness to an organic solvent and chemicals such as a sulfurous acid gas, and to be capable of being dispersed in a used medium to a level of fine particles, with the dispersed state being stable. In particular, there is a strong demand for a pigment which has a good yellow hue and is fast to light, moist heat, and active gases in the environment, particularly for a pigment having high tinctorial strength and is fast against light.

That is, in comparison with a dye which is required to have properties as colorant molecules, the pigment is required to have more properties, i.e., it is required to satisfy all of the above-mentioned requirements as a solid of an aggregate of a colorant (dispersion of fine particles) as well as the properties as molecules of a colorant molecule. As a result, a group of compounds which can be used as pigments are extremely limited in comparison with dyes. Even when high-performance dyes are converted to pigments, few of them can satisfy requirement for the properties as a dispersion of fine particles. Thus, such pigments are difficult to develop. This can be confirmed from the fact that the number of pigments registered in Color Index is no more than $1/10$ of the number of dyes.

Azo pigments are excellent in hue and tinctorial strength which are characteristics of coloring, and hence they have widely been used in printing inks, ink for an inkjet system, and electro-photographic materials. Of the pigments, the most typically used pigments are yellow diarylide pigments and red naphthol azo pigments. Examples of such diarylide pigments include C.I. pigment yellow 12, C.I. pigment yellow 13, and C.I. pigment yellow 17. Examples of such red naphthol azo pigments include C.I. pigment red 208, and C.I. pigment red 242. However, these pigments are inferior in fastness, particularly light fastness, and hence they are decomposed when prints printed by them are exposed to light, thus being inappropriate for prints which are to be stored for a long lime.

In order to remove such defects, there have been disclosed azo pigments having a fastness improved by increasing molecular weight or by introducing a group having a strong intermolecular interaction (see, for example, patent documents 1 to 3). However, even the improved pigments, for example, the pigments described in patent document 1 have the defect that they have still insufficient light fastness though improved to some extent, and pigments described in, for example, patent documents 2 and 3 have a greenish hue and a low tinctorial strength, thus being inferior in coloring characteristics.

Also, patent documents 4 to 7 disclose colorants which have absorption characteristics of excellent color reproducibility and have a sufficient fastness. However, some of the specific compounds described in the patent documents show poor fastness though showing good hue, and some of them show poor hue though showing good fastness. Also, some dissolve in water or in an organic solvent, thus being insufficient in fastness against chemicals.

In the case of expressing a full-color image based on the primary color mixing process using three colors of yellow, magenta, and cyan or using four colors further including black, use of a pigment for only one color, the pigment having an inferior fastness would change gray balance of the prints with the lapse of time, and use of a pigment having inferior coloring characteristics would reduce color reproducibility upon printing. Thus, in order to obtain prints which can maintain high color reproducibility for a long time, there have been desired a yellow pigment and a pigment dispersion which have both good coloring characteristics and good fastness.

Azo colorants have conventionally been utilized in various fields since they absorb various visible lights. For example, they have come into use in such various fields as coloring of synthetic resins, printing inks, colorants for sublimation type thermal transfer materials, inks for inkjet recording, and colorants for color filters. Important performance required for azo colorants as colorants includes absorption spectrum. Hue of a colorant exerts a great influence on color tone and feeling of a body colored with the colorant, giving a large effect on visual sensation. Therefore, there have long been made studies on absorption spectrum of a colorant.

Conventionally known azo dyes containing a nitrogen-containing, 5-membered ring as an azo component are also disclosed in patent documents 8 and 9. Also, patent document 10 discloses naphthol series azo pigments wherein a benzene ring and a naphthalene ring are connected to each other through an azo group.

Patent document 1: JP-A-56-38354
Patent document 2: U.S. Pat. No. 2,936,306
Patent document 3: JP-A-11-100519
Patent document 4: WO05/52074
Patent document 5: WO00/023525
Patent document 6: JP-A-2008-13472
Patent document 7: JP-T-9-511278 (the term "JP-T" as used herein means a published Japanese translation of a PCT application)
Patent document 8: JP-A-55-161856
Patent document 9: JP-A-2008-7732
Patent document 10: JP-A-2004-123866

DISCLOSURE OF THE INVENTION

Problems that the Invention is to Solve

An object of the invention is to provide azo compounds and azo pigments having excellent coloring characteristics such as tinctorial strength and hue and excellent fastness such as light fastness and ozone fastness, an azo pigment dispersion, a coloring composition, a coloring composition for color filter, a color filter, and an ink for inkjet recording.

Means for Solving the Problem

As a result of intensive investigations, the inventors have found that particular nitrogen-containing, heterocyclic azo pigments show a good hue and exhibit good light fastness, heat fastness, and ozone fastness. Specific means for solving the above-described problem will be described below.

<1> An azo pigment represented by the following general formula (1), a tautomer, salt, or hydrate thereof.

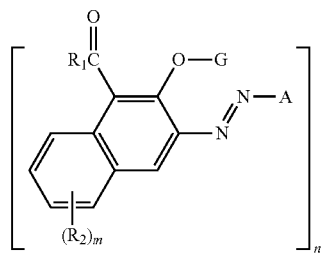

General formula (1)

In the general formula (1), G represents a hydrogen atom, an aliphatic group, an aryl group, a heterocyclic group, an acyl group, an aliphatic oxycarbonyl group, a carbamoyl group, an aliphatic sulfonyl group, or an arylsulfonyl group, $R_1$ represents an amino group, an aliphatic oxy group, an aliphatic group, an aryl group, or a heterocyclic group, $R_2$ represents a substituent, A represents an aromatic 5- to 6-membered heterocyclic group provided that, in the case where the aromatic 5- to 6-membered heterocyclic group contains two or more nitrogen atoms, at least one nitrogen atom is an unsubstituted nitrogen atom, m represents an integer of from 0 to 5, n represents an integer of from 1 to 4 and, when n=2, the general formula (1) represents a dimer formed through $R_1$, $R_2$, A, or G and, when n=3, the general formula (1) represents a trimer formed through $R_1$, $R_2$, A, or G and, when n=4, the general formula (1) represents a tetramer formed through $R_1$, $R_2$, A, or G.

<2> The azo pigment according to <1> represented by the foregoing general formula (1), which is an azo pigment represented by a following general formula (2), a tautomer, salt, or hydrate thereof.

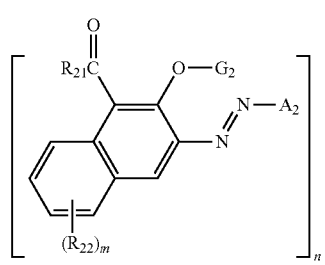

General Formula (2)

In the general formula (2), $G_2$ represents a hydrogen atom, an aliphatic group, an aryl group, or a heterocyclic group, $R_{21}$ represents an amino group, an aliphatic oxy group, an aliphatic group, an aryl group, or a heterocyclic group, $R_{22}$ represents a substituent, $A_2$ represents any one of the following general formulae (A-1) to (A-34), m and n are the same as are defined with respect to the general formula (1) and, when n=2, the general formula (2) represents a dimer formed through $R_{21}$, $R_{22}$, $G_2$, or $A_2$ and, when n=3, the general formula represents a trimer formed through $R_{21}$, $R_{22}$, $G_2$, or $A_2$ and, when n=4, the general formula represents a tetramer formed through $R_{21}$, $R_{22}$, $G_2$, or $A_2$.

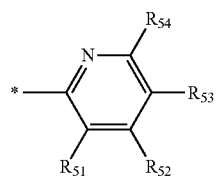

(A-1)

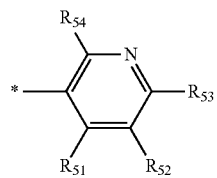

(A-2)

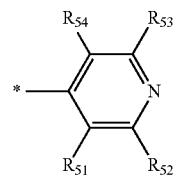

(A-3)

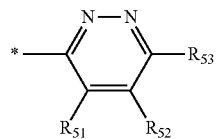

(A-4)

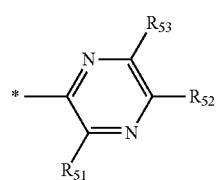 (A-5)
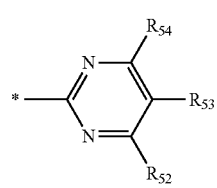 (A-6)
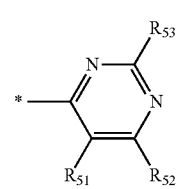 (A-7)
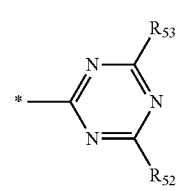 (A-8)
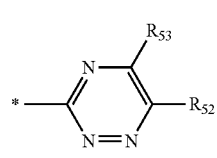 (A-9)
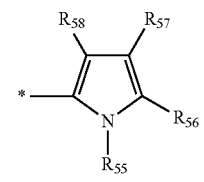 (A-10)
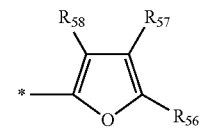 (A-11)
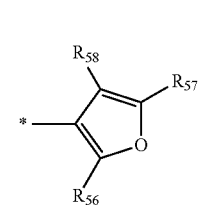 (A-12)
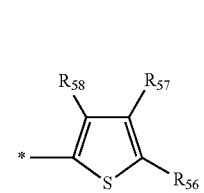 (A-13)
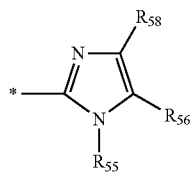 (A-14)
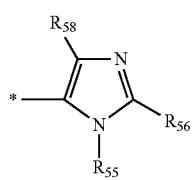 (A-15)
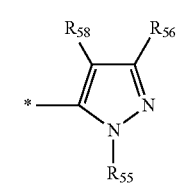 (A-16)
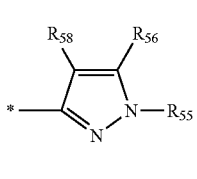 (A-17)
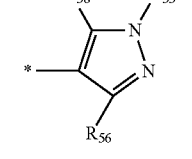 (A-18)
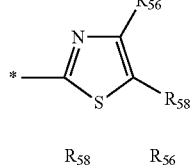 (A-19)
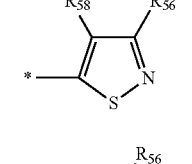 (A-20)
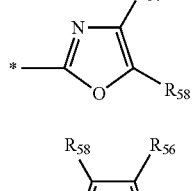 (A-21)
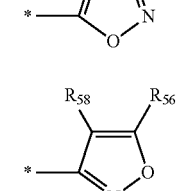 (A-22)
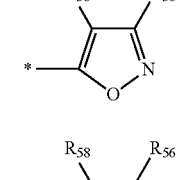 (A-23)

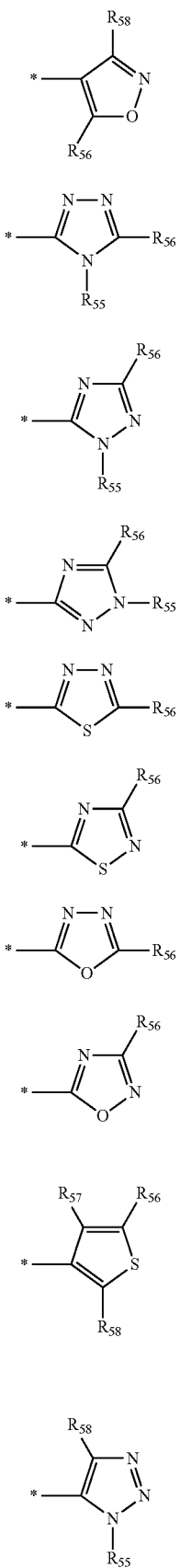

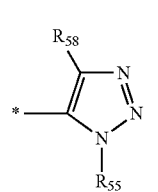

(A-24)
(A-25)
(A-26)
(A-27)
(A-28)
(A-29)
(A-30)
(A-31)
(A-32)
(A-33)

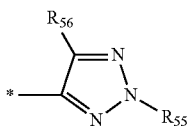

(A-34)

In the formulae (A-1) to (A-34), $R_{51}$ to $R_{58}$ each represents a hydrogen atom or a substituent, adjacent substituents may be connected to each other to form a 5- or 6-membered ring, and * shows the point of attachment to the azo group in the general formula (2).

<3> The azo pigment according to <1> or <2>, a tautomer, salt, or hydrate thereof, wherein A and $A_2$ each represents any one of the following general formulae (A-1) to (A-5), (A-7), (A-10) to (A-18), (A-20), (A-22) to (A-26), and (A-32) to (A-34).

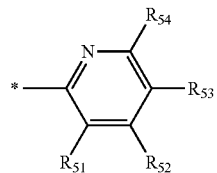

(A-1)

(A-2)

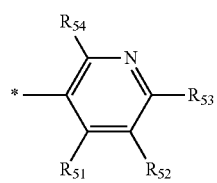

(A-3)

(A-4)

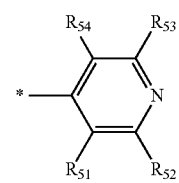

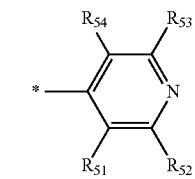

(A-5)

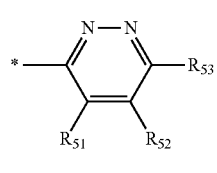

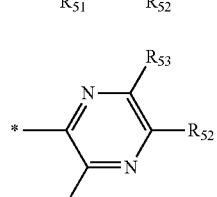

(A-7)

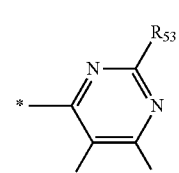

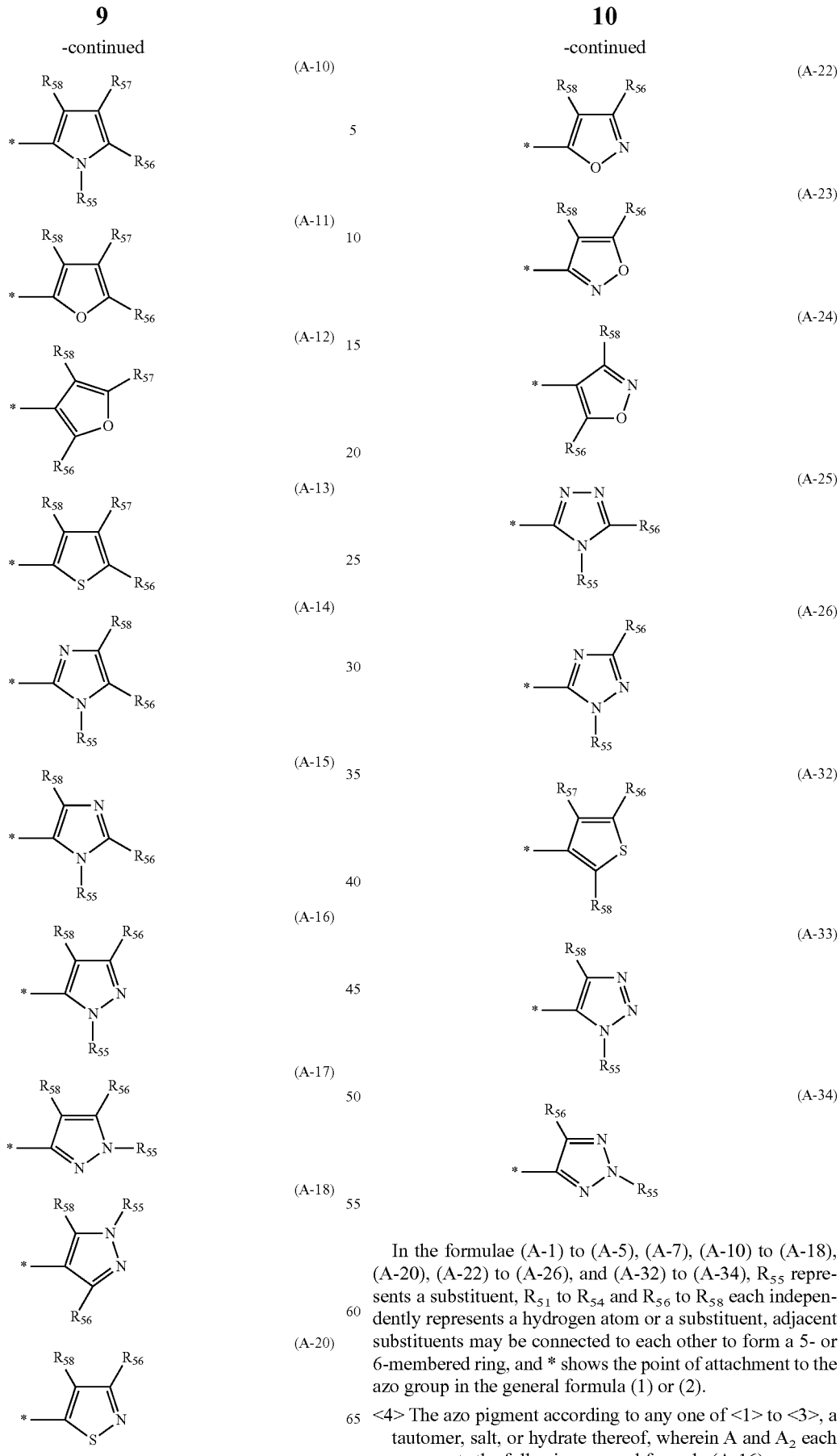

In the formulae (A-1) to (A-5), (A-7), (A-10) to (A-18), (A-20), (A-22) to (A-26), and (A-32) to (A-34), $R_{55}$ represents a substituent, $R_{51}$ to $R_{54}$ and $R_{56}$ to $R_{58}$ each independently represents a hydrogen atom or a substituent, adjacent substituents may be connected to each other to form a 5- or 6-membered ring, and * shows the point of attachment to the azo group in the general formula (1) or (2).

<4> The azo pigment according to any one of <1> to <3>, a tautomer, salt, or hydrate thereof, wherein A and $A_2$ each represents the following general formula (A-16).

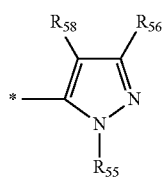
(A-16)

In the formula (A-16), $R_{55}$ represents a substituent, $R_{56}$ and $R_{58}$ each independently represents a hydrogen atom or a substituent, and * shows the point of attachment to the azo group in the general formula (1).

<5> A pigment dispersion having at least one azo pigment according to any one of <1> to <4>, a tautomer, salt, or hydrate thereof.

<6> A coloring composition having at least one azo pigment according to any one of <1> to <4>, a tautomer, salt, or hydrate thereof.

<7> An ink for inkjet recording using the pigment dispersion according to <5>.

<8> A coloring composition for color filter using the coloring composition according to <6>.

<9> The coloring composition for color filter according to <8>, further having a polymerizable compound and a solvent.

<10> The coloring composition for color filter according to <9>, wherein the azo pigment represented by the foregoing general formula (1) in an amount of from 0.01 to 2 parts by weight per 1 part by weight of the polymerizable compound.

<11> The coloring composition for color filter according to <9> or <10>, wherein the polymerizable compound is a light-sensitive compound.

<12> The coloring composition for color filter according to any one of <8> to <11>, further comprising one or more dispersants selected from among surfactants, silicone series additives, pigment series additives, silane series coupling agents, and titanium series coupling agents.

<13> A color filter formed by using the coloring composition for filter according to any one of <10> to <12>.

<14> The color filter according to <13>, which is formed by a photolithography method or an inkjet method.

<15> A process of preparing a coloring composition for color filter according to any one of <8> to <12>, having: obtaining a pigment dispersion by dispersing one or more dispersants selected from among surfactants, silicone series additives, pigment series additives, silane series coupling agents, and titanium series coupling agents, and an azo compound represented by the general formula (1) in part of a solvent; and mixing the pigment dispersion with a polymerizable compound and the rest of the solvent.

<16> An azo compound represented by a following general formula (1), a tautomer, salt, or hydrate thereof.

General formula (1)

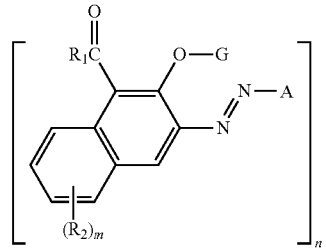

In the general formula (1), G represents a hydrogen atom, an aliphatic group, an aryl group, a heterocyclic group, an acyl group, an aliphatic oxycarbonyl group, a carbamoyl group, an aliphatic sulfonyl group, or an arylsulfonyl group, $R_1$ represents an amino group, an aliphatic oxy group, an aliphatic group, an aryl group, or a heterocyclic group, $R_2$ represents a substituent, A represents an aromatic 5-, to 6-membered heterocyclic group provided that, in the case where the aromatic 5- to 6-membered heterocyclic group contains two or more nitrogen atoms, at least one nitrogen atom is an unsubstituted nitrogen atom, m represents an integer of from 0 to 5, n represents an integer of from 1 to 4 and, when n=2, the general formula (1) represents a dimer formed through $R_1$, $R_2$, A, or G and, when n=3, the general formula (1) represents a trimer formed through $R_1$, $R_2$, A, or G and, when n=4, the general formula (1) represents a tetramer formed through $R_1$, $R_2$, A, or G.

<17> An azo compound represented by the general formula (2), a tautomer, salt, or hydrate thereof.

General Formula (2)

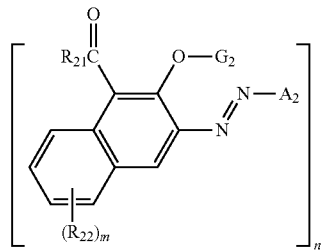

In the general formula (2), G2 represents a hydrogen atom, an aliphatic group, an aryl group, or a heterocyclic group, $R_{21}$ represents an amino group, an aliphatic oxy group, an aliphatic group, an aryl group, or a heterocyclic group, $R_{22}$ represents a substituent, $A_2$ represents any one of the following general formulae (A-1) to (A-34), m and n are the same as are defined with respect to the general formula (1) and, when n=2, the general formula (2) represents a dimer formed through $R_{21}$, $R_{22}$, $G_2$, or $A_2$ and, when n=3, the general formula represents a trimer formed through $R_{21}$, $R_{22}$, $G_2$, or $A_2$ and, when n=4, the general formula represents a tetramer formed through $R_{21}$, $R_{22}$, $G_2$, or $A_2$.

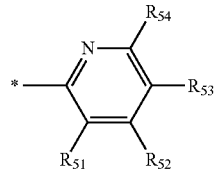
(A-1)

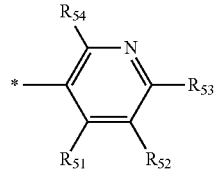
(A-2)

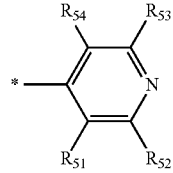
(A-3)

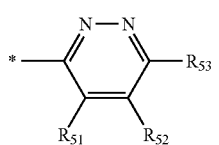 (A-4)
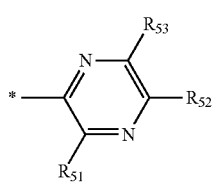 (A-5)
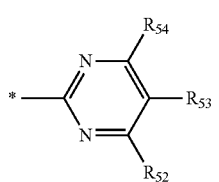 (A-6)
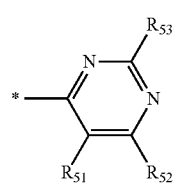 (A-7)
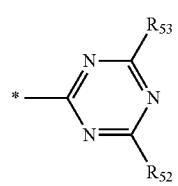 (A-8)
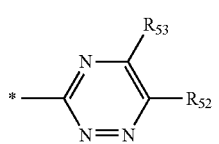 (A-9)
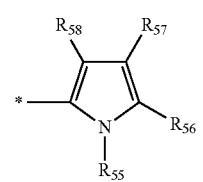 (A-10)
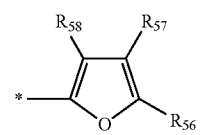 (A-11)
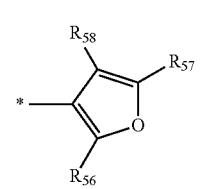 (A-12)
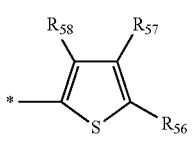 (A-13)
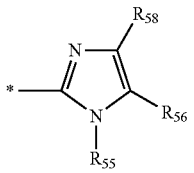 (A-14)
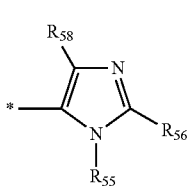 (A-15)
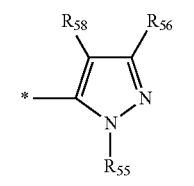 (A-16)
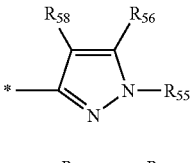 (A-17)
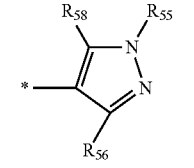 (A-18)
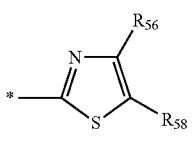 (A-19)
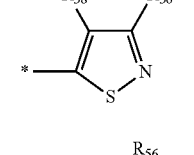 (A-20)
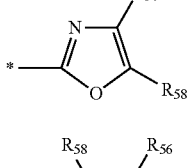 (A-21)
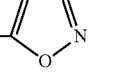 (A-22)

-continued (A-23) 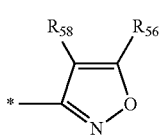

(A-24) 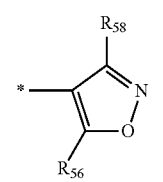

(A-25) 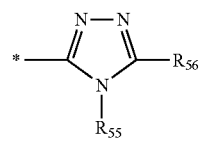

(A-26) 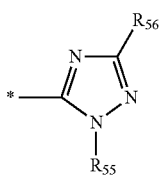

(A-27) 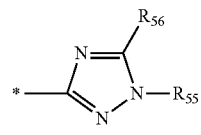

(A-28) 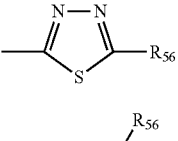

(A-29) 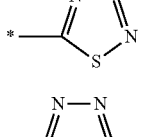

(A-30) 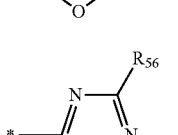

(A-31) 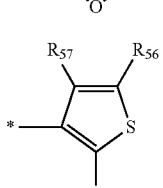

(A-32) 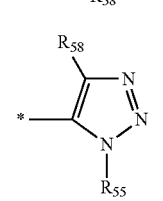

(A-33) 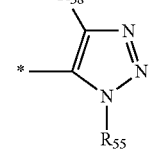

-continued (A-34) 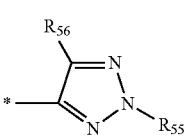

In the general formulae (A-1) to (A-34), $R_{51}$ to $R_{58}$ each represents a hydrogen atom or a substituent, adjacent substituents may be connected to each other to form a 5- or 6-membered ring, and * shows the point of attachment to the azo group in the general formula (2).

<18> The azo compound according to <17> represented by the foregoing general formula (2), which is an azo compound represented by a following general formula (2'), a tautomer, salt, or hydrate thereof.

General Formula (2')

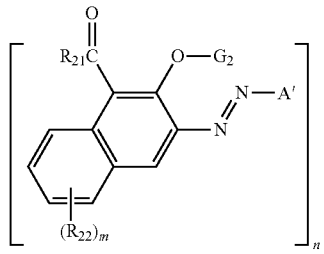

In the general formula (2'), $G_2$ represents a hydrogen atom, an aliphatic group, an aryl group, or a heterocyclic group, $R_{21}$ represents an amino group, an aliphatic oxy group, an aliphatic group, an aryl group, or a heterocyclic group, $R_{22}$ represents a substituent, A' represents any one of the following general formulae (A-1) to (A-5), (A-7), (A-10) to (A-18), (A-20), (A-22) to (A-26), and (A-32) to (A-34), m represents an integer of from 0 to 5, and n represents an integer of from 1 to 4 and, when n=2, the general formula (2') represents a dimer formed through $R_{21}$, $R_{22}$, $G_2$, or A' and, when n=3, the general formula represents a trimer formed through $R_{21}$, $R_{22}$, $G_2$, or A' and, when n=4, the general formula represents a tetramer formed through $R_{21}$, $R_{22}$, $G_2$, or A'.

(A-1) 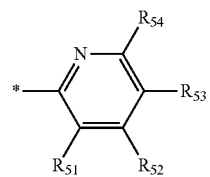

(A-2) 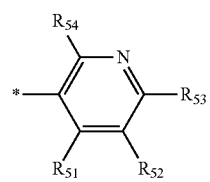

(A-3) 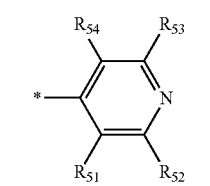

-continued
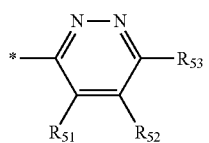 (A-4)
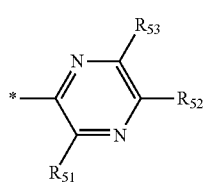 (A-5)
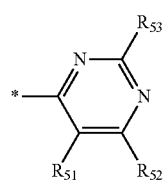 (A-7)
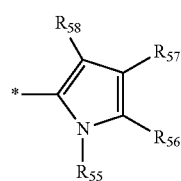 (A-10)
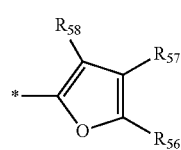 (A-11)
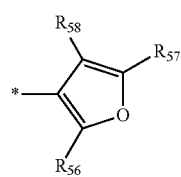 (A-12)
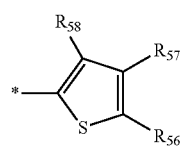 (A-13)
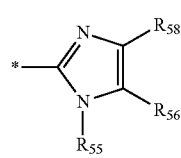 (A-14)
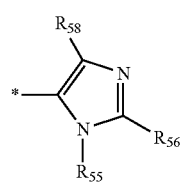 (A-15)
-continued
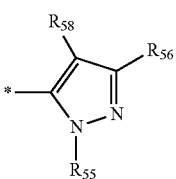 (A-16)
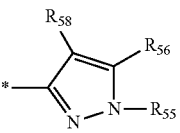 (A-17)
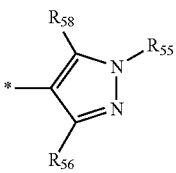 (A-18)
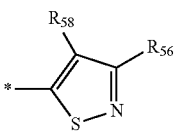 (A-20)
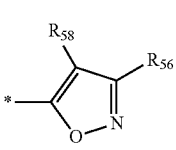 (A-22)
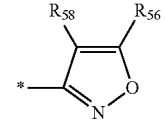 (A-23)
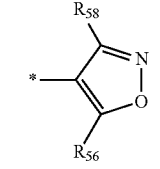 (A-24)
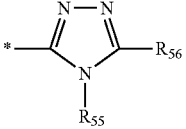 (A-25)
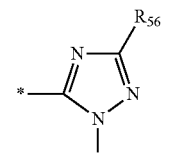 (A-26)
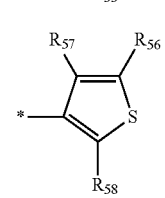 (A-32)

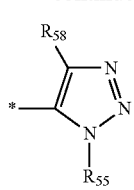

(A-33)

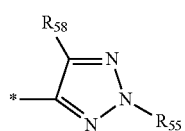

(A-34)

In the general formulae (A-1) to (A-5), (A-7), (A-10) to (A-18), (A-20), (A-22) to (A-26), and (A-32) to (A-34), $R_{55}$ represents a substituent, $R_{51}$ to $R_{54}$ and $R_{56}$ to $R_{58}$ each independently represents a hydrogen atom or a substituent, adjacent substituents may be connected to each other to form a 5- or 6-membered ring, and * shows the point of attachment to the azo group in the general formula (2').

<19> The azo compound according to <18> represented by the foregoing general formula (2'), which is an azo compound represented by a following general formula (3), a tautomer, salt, or hydrate thereof.

General Formula (3)

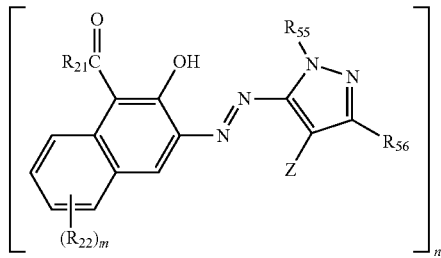

In the formula (3), $R_{21}$, $R_{22}$, $R_{55}$, $R_{56}$, m, and n are the same as those defined with respect to the general formula (2'), and Z represents an electron-withdrawing group having a Hammett σp value of 0.2 or more and, when n=2, the general formula (3) represents a dimer formed through $R_{21}$, $R_{22}$, $R_{55}$, $R_{56}$, or Z and, when n=3, the general formula represents a trimer formed through $R_{21}$, $R_{22}$, $R_{55}$, $R_{56}$, or Z and, when n=4, the general formula represents a tetramer formed through $R_{21}$, $R_{22}$, $R_{55}$, $R_{56}$, or Z.

ADVANTAGES OF THE INVENTION

The azo pigments of the present invention have excellent coloring characteristics such as high tinctorial strength and hue, and have excellent fastness such as light fastness, ozone fastness, and heat fastness.

Further, the pigment dispersion of the invention has the azo pigment of the invention dispersed in various media, and show excellent coloring characteristics, excellent fastness, excellent ink liquid stability, and excellent dispersion stability.

BEST MODE FOR CARRYING OUT THE INVENTION

Figure 1:
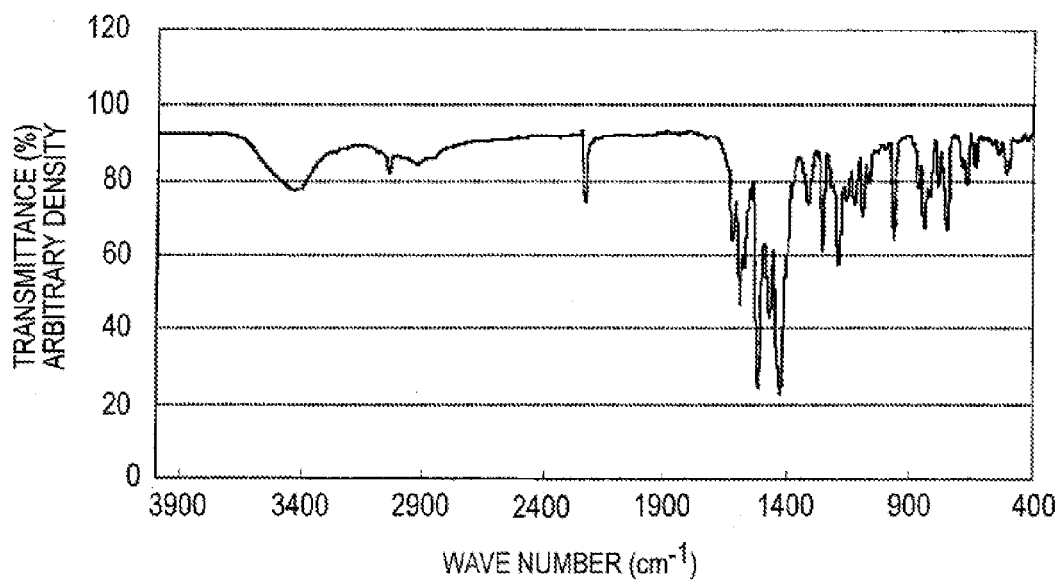
FIG. 1 is an infrared absorption spectrum of an exemplified compound D-1 synthesized according to Synthesis Example 1.
Figure 2:
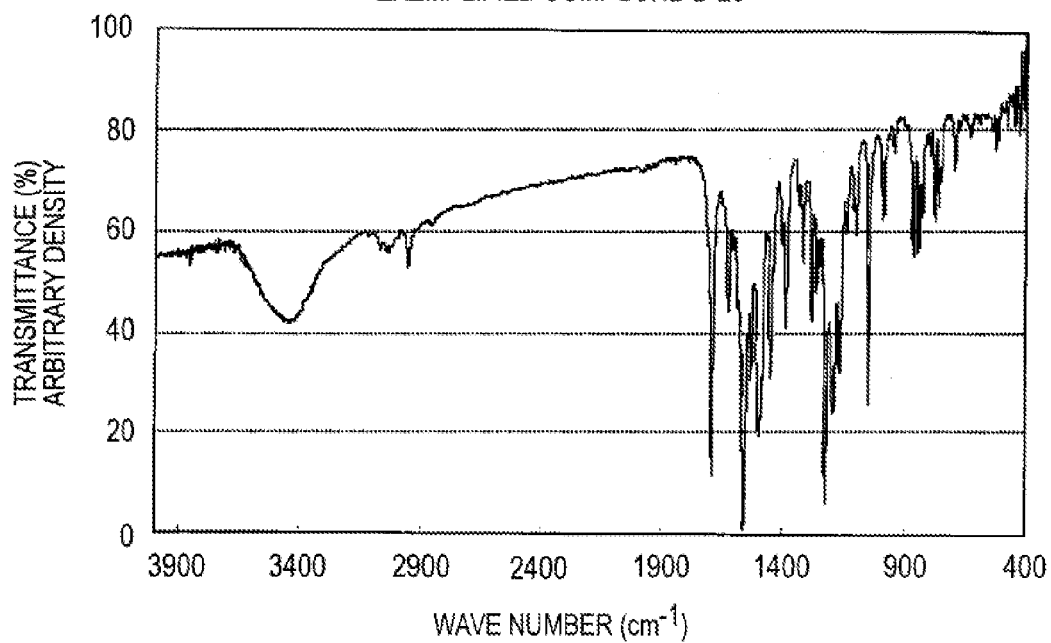
FIG. 2 is an infrared absorption spectrum of an exemplified compound D-23 synthesized pursuant to the process of Synthesis Example 1.
Figure 3:
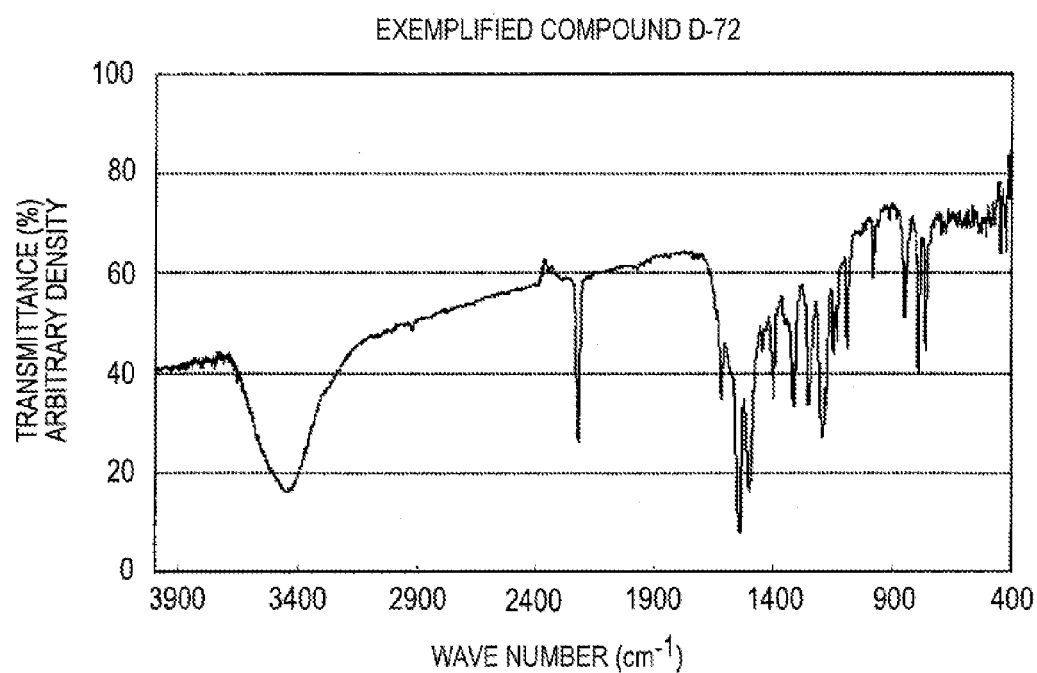
FIG. 3 is an infrared absorption spectrum of an exemplified compound D-72 synthesized pursuant to the process of Synthesis Example 1.
Figure 4:
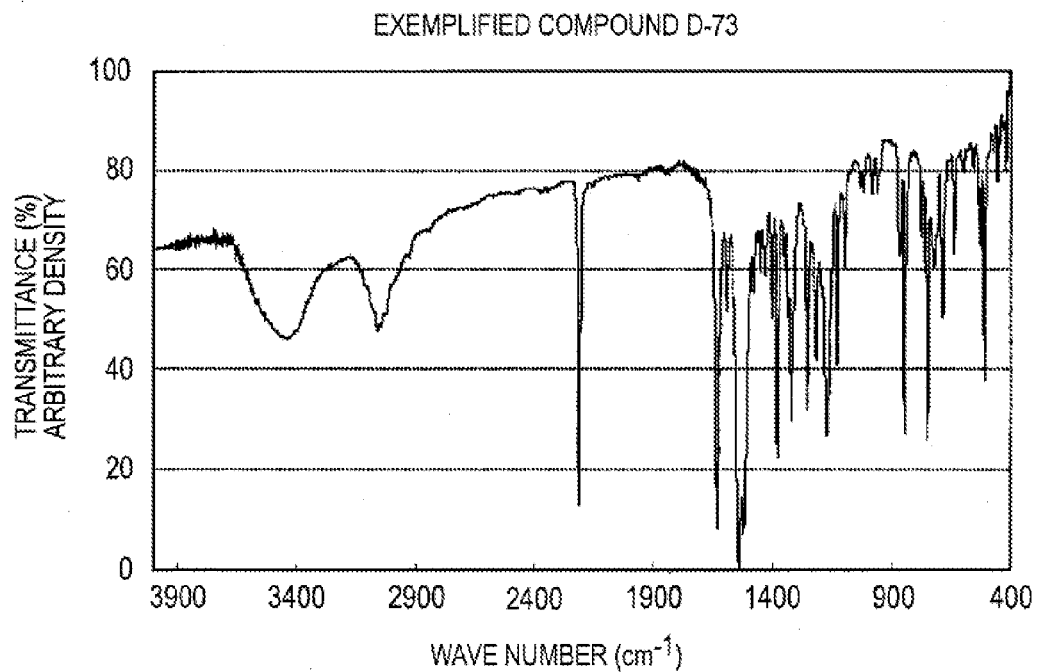
FIG. 4 is an infrared absorption spectrum of an exemplified compound D-73 synthesized pursuant to the process of Synthesis Example 1.
Figure 5:
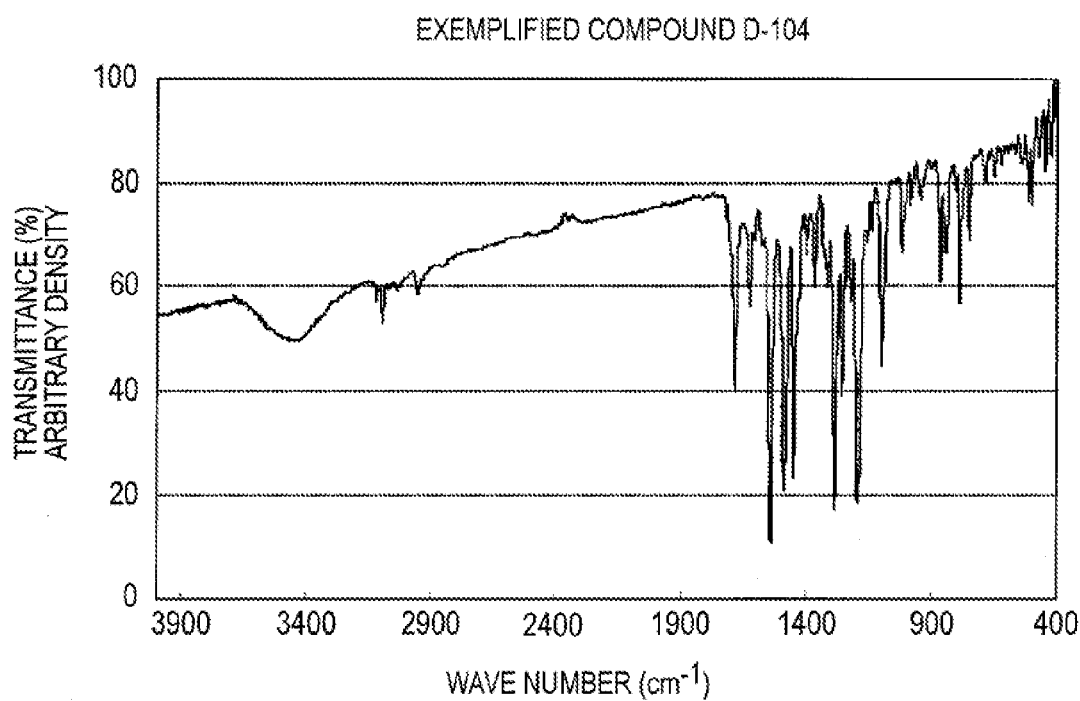
FIG. 5 is an infrared absorption spectrum of an exemplified compound D-104 synthesized pursuant to the process of Synthesis Example 1.
Figure 6:
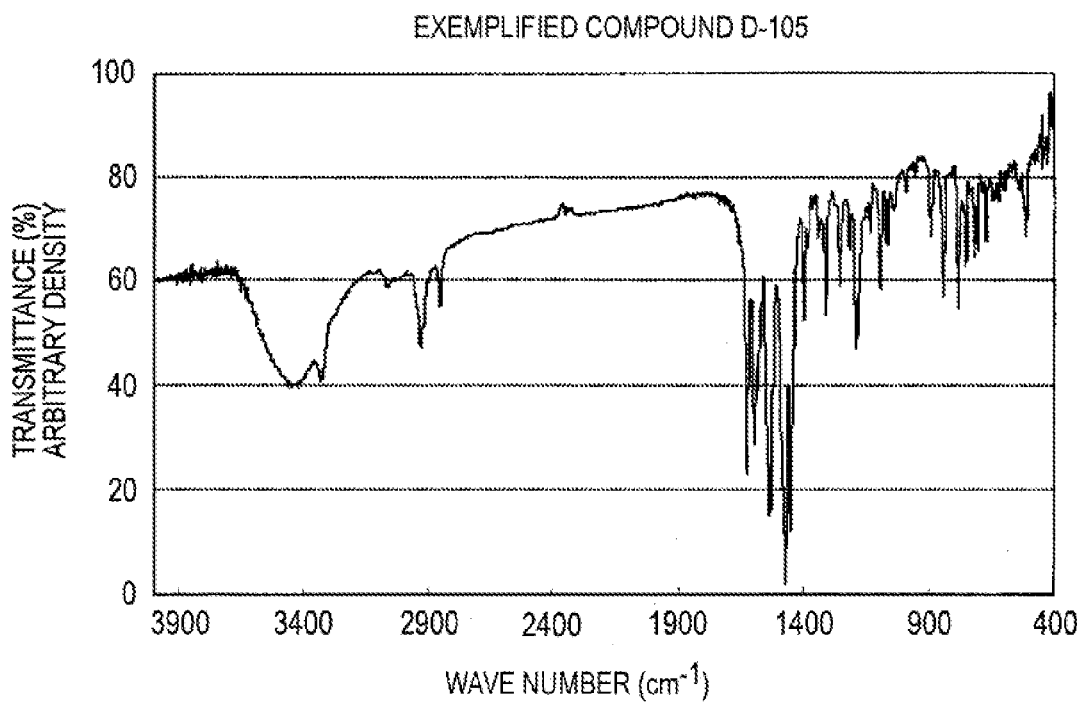
FIG. 6 is an infrared absorption spectrum of an exemplified compound D-105 synthesized pursuant to the process of Synthesis Example 1.

First, the terms "aliphatic group", "aryl group", "heterocyclic group", and "substituent" as used in the present invention will be described below.

In the aliphatic group in the invention, the aliphatic moiety thereof may be straight, branched, or cyclic, and may be saturated or unsaturated. Specifically, there can be illustrated an alkyl group, an alkenyl group, a cycloalkyl group, and a cycloalkenyl group. Further, the aliphatic group may be unsubstituted or may have a substituent.

Also, the aryl group may be a monocyclic group or a condensed ring group, and may be unsubstituted or may have a substituent. Also, with the heterocyclic group, the heterocyclic moiety may be any ring that contains a hetero atom (e.g., a nitrogen atom, a sulfur atom, or an oxygen atom) in the ring, and may be a saturated ring or an unsaturated ring. Also, the ring may be a monocyclic ring or a condensed ring, and may be unsubstituted or may have a substituent.

Also, the substituent in the invention means any substitutable group, and examples thereof include an aliphatic group, an aryl group, a heterocyclic group, an acyl group, an acyloxy group, an acylamino group, an aliphatic oxy group, an aryloxy group, a heterocyclic oxy group, an aliphatic oxycarbonyl group, an aryloxycarbonyl group, a heterocyclic oxycarbonyl group, a carbamoyl group, an aliphatic sulfonyl group, an arylsulfonyl group, a heterocyclic sulfonyl group, an aliphatic sulfonyloxy group, an arylsulfonyloxy group, a heterocyclic sulfonyloxy group, a sulfamoyl group, an aliphatic sulfonamido group, an arylsulfonamido group, a heterocyclic sulfonamido group, an amino group, an aliphatic amino group, an arylamino group, a heterocyclic amino group, an aliphatic oxycarbonylamino group, an aryloxycarbonylamino group, a heterocyclic oxycarbonylamino group, an aliphatic sulfinyl group, an arylsulfinyl group, an aliphatic thio group, an arylthio group, a hydroxyl group, a cyano group, a sulfo group, a carboxyl group, an aliphatic oxyamino group, an aryloxyamino group, a carbamoylamino group, a sulfamoylamino group, a halogen atom, a sulfamoylcarbamoyl group, a carbamoylsulfamoyl group, a dialiphatic oxyphosphinyl group, a diaryloxyphosphinyl group, and an ionic hydrophilic group (e.g., a carboxyl group, a sulfo group, a phosphono group, or a quaternary ammonium salt).

These substituents may further have a substituent and, as the further substituent, there can be illustrated a group selected from among the substituents having been described above.

In the case where the azo pigment of the invention contains an ionic hydrophilic group as a substituent, it is preferably a salt with a multi-valent metal cation (for example, magnesium cation, calcium cation, or barium cation), and is particularly preferably a lake pigment.

A Hammett substituent constant σp to be used in this specification is briefly explained below.

The Hammett's rule is an empirical rule advocated by L. P. Hammett in 1935 in an attempt to quantitatively discuss the influences of a substituent on the reaction or equilibrium of a benzene derivative, the validity of which has been widely accepted nowadays. Substituent constants obtained by the Hammett's rule include σp and σm values. These values are found in a number of general books. The details are given in, for example, J. A. Dean (ed.), Lange's Handbook of Chemistry, the 12th Ed., MacGraw-Hill, 1979 and Kagakuno Ryoiki, Extra No. 122, Nankodo, 1979, 96-103. While substituents are described in the invention by reference to their Hammett substituent constants σp, it is needless to say that such description applies to not only the substituents whose Hammett substituent constants σp are known from the literature but those whose Hammett substituent constants σp are unknown from the literature but are to fall within a range in question when determined in accordance with the Hammett's rule. Although compounds of the invention represented by the general formulae (1) are not benzene derivatives, σp values are referred to as a measure of the electron effect of their substituents irrespective of the position of substitution. In the invention, the σp value will be used hereinafter.

Azo Pigments

Pigments are in a state wherein molecules constituting them are strongly connected to each other through aggregation energy produced by strong interaction between pigment molecules. In order to realize this state, van der Waals force and intermolecular hydrogen bond are necessary as described in, for example, The Imaging Society of Japan, vol. 43, p. 10 (2004).

In order to increase the intermolecular van der Waals force, introduction of an aromatic group, a polar group and/or a hetero atom to a molecule may be considered. Also, in order to form intermolecular hydrogen bond, introduction of a substituent which contains a hydrogen atom connected to a hetero atom and/or introduction of an electron donative substituent may be considered. Further, polarity of the entire molecule may preferably be considered to be higher. For these purposes, with a chain group such as an alkyl group, a shorter group may be considered to be preferred and, with respect to the value of molecular weight/azo group, a smaller value may be considered to be preferred.

From these standpoints, pigment particles preferably contain an amido bond, a sulfonamido bond, an ether bond, a sulfon group, an oxycarbonyl group, an imido group, a carbamoylamino group, a heterocyclic ring, a benzene ring, or the like.

The azo pigments of the invention is characterized by being represented by the following general formula (1).

The compounds represented by the general formula (1) intend to produce intermolecular interaction between colorant molecules due to the unique structure thereof, show a low solubility for water or for an organic solvent, thus being usable as azo pigments.

As is different from dyes which are used by dissolving in water or an organic solvent in a molecular dispersion state, pigments are used by finely dispersing in a solvent as solid particles such as molecular aggregates.

Also, the pigments can show excellent coloring characteristics such as tinctorial strength and hue and excellent fastness such as light fastness and ozone fastness by having the particular structure represented by the following general formula (1).

Next, pigments represented by the general formula (1) will be described below.

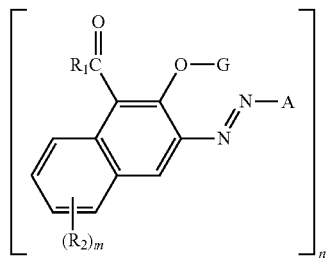

General formula (1)

In the general formula (1), G represents a hydrogen atom, an aliphatic group, an aryl group, a heterocyclic group, an acyl group, an aliphatic oxycarbonyl group, a carbamoyl group, an aliphatic sulfonyl group, or an arylsulfonyl group, $R_1$ represents an amino group, an aliphatic oxy group, an aliphatic group, an aryl group, or a heterocyclic group, $R_2$ represents a substituent, and A represents an aromatic 5- to 6-membered heterocyclic group. However, in the case where the aromatic 5- to 6-membered heterocyclic group contains two or more nitrogen atoms, at least one nitrogen atom is an unsubstituted nitrogen atom. m represents an integer of from 0 to 5, and n represents an integer of from 1 to 4. When n=2, the general formula (1) represents a dimer formed through $R_1$, $R_2$, A, or G. When n=3, the general formula (1) represents a trimer formed through $R_1$, $R_2$, A, or G. When n=4, the general formula (1) represents a tetramer formed through $R_1$, $R_2$, A, or G.

The aliphatic group represented by G may have a substituent, and may be saturated or unsaturated. As a group which may be the substituent, any group that has been described hereinbefore in the aforesaid paragraph on substituents and that is substitutable may be employed. As the aliphatic group represented by G, an aliphatic group containing a total of from 1 to 8 carbon atoms is preferred, and an alkyl group containing a total of from 1 to 4 carbon atoms is more preferred. Examples thereof include methyl, ethyl, vinyl, cyclohexyl, and carbamoylmethyl.

The aryl group represented by G may be a condensed ring, and may have a substituent. As a group which may be the substituent, any group that has been described hereinbefore in the aforesaid paragraph on substituents and that is substitutable may be employed. As the aryl group represented by G, an aryl group containing a total of from 6 to 12 carbon atoms is preferred, and an aryl group containing a total of from 6 to 10 carbon atoms is more preferred. Examples thereof include phenyl, 4-nitrophenyl, 4-acetylaminophenylo, and 4-methanesulfonylphenyl.

The heterocyclic group represented by G may have a substituent, may be saturated or unsaturated, and may be a condensed ring. The heterocyclic group represented by G is preferably a heterocyclic group containing a total of from 2 to 12 carbon atoms and being connected at a carbon atom, more preferably a 5- or 6-membered heterocyclic group containing a total of from 2 to 10 carbon atoms and being connected at a carbon atom, and examples thereof include 2-tetrahydrofuryl and 2-pyrimidyl.

The acyl group represented by G may be an aliphatic carbonyl group, an aryl carbonyl group, or a heterocyclic carbonyl group, and may have a substituent. As a group which may be the substituent, any group that has been described hereinbefore in the aforesaid paragraph on substituents and that is substitutable may be employed. The acyl group represented by G is preferably an acyl group containing a total of from 2 to 8 carbon atoms, more preferably an acyl group containing a total of from 2 to 4 carbon atoms, and examples thereof include acetyl, benzoyl, and 3-pyridinecarbonyl.

The aliphatic oxycarbonyl group represented by G may have a substituent. As a group which may be the substituent, any group that has been described hereinbefore in the aforesaid paragraph on substituents and that is substitutable may be employed. The aliphatic oxycarbonyl group represented by G is preferably an alkoxycarbonyl group containing a total of from 2 to 8 carbon atoms, more preferably an alkoxycarbonyl group containing a total of from 2 to 4 carbon atoms. Examples thereof include methoxycarbonyl, ethoxycarbonyl, and (t)-butoxycarbonyl.

The carbamoyl group represented by G may have a substituent. As a group which may be the substituent, any group that has been described hereinbefore in the aforesaid paragraph on substituents and that is substitutable may be employed, and preferred substituents are an aliphatic group, an aryl group, and a heterocyclic group. As the carbamoyl group which is represented by G and which may have a substituent, an unsubstituted carbamoyl group, an alkylcarbamoyl group containing a total of from 2 to 9 carbon atoms, and an arylcarbamoyl group containing a total of from 7 to 11 carbon atoms are preferred, and an unsubstituted carbamoyl group and an alkylcarbamoyl group containing a total of from 2 to 5 carbon atoms are more preferred. Examples thereof include N-methylcarbamoyl, N,N-dimethylcarbamoyl, and N-phenylcarbamoyl.

The sulfonyl group represented by G may be an aliphatic sulfonyl group, an arylsulfonyl group, or a heterocyclic sulfonyl group, and may have a substituent. As a group which may be the substituent, any group that has been described hereinbefore in the aforesaid paragraph on substituents and that is substitutable may be employed. The sulfonyl group represented by G is preferably an alkylsulfonyl group containing a total of from 1 to 6 carbon atoms or an arylsulfonyl group containing a total of from 6 to 10 carbon atoms, more preferably an alkylsulfonyl group containing a total of from 1 to 4 carbon atoms, and is exemplified by methanesulfonyl and benzenesulfonyl.

G is preferably a hydrogen atom, an aliphatic group, an aryl group, or a heterocyclic group, more preferably a hydrogen atom.

The amino group represented by $R_1$ may have a substituent. As a group which may be the substituent, any group that has been described hereinbefore in the aforesaid paragraph on substituents and that is substitutable may be employed, and preferred substituents are an aliphatic group, an aryl group, and a heterocyclic group. The amino group which is represented by $R_1$ and which may have a substituent is preferably an unsubstituted amino group, an alkylamino group containing a total of from 1 to 10 carbon atoms, a dialkylamino group containing a total of from 2 to 10 carbon atoms, an arylamino group containing a total of from 6 to 14 carbon atoms, or a saturated or unsaturated heterocyclic amino group containing a total of from 2 to 12 carbon atoms, more preferably an unsubstituted amino group, an alkylamino group containing a total of from 1 to 8 carbon atoms, a dialkylamino group containing a total of from 2 to 8 carbon atoms, an arylamino group containing a total of from 6 to 10 carbon atoms, or a saturated or unsaturated heterocyclic amino group containing a total of from 2 to 12 carbon atoms. Examples thereof include methylamino, N,N-dimethylamino, N-phenylamino, and N-(2-pyrimidyl)amino.

The aliphatic oxy group represented by $R_1$ may have a substituent. As the substituent, any group that has been described hereinbefore in the aforesaid paragraph on substituents and that is substitutable may be employed. As the aliphatic oxy group of $R_1$, an alkoxy group containing a total of from 1 to 8 carbon atoms is preferred, and an alkoxy group containing a total of from 1 to 4 carbon atoms is more preferred. Examples thereof include methoxy, ethoxy, (t)-butoxy, methoxyethoxy, and carbamoylmethoxy.

The aliphatic group represented by $R_1$ may have a substituent. As the substituent, any group that has been described hereinbefore in the aforesaid paragraph on substituents and that is substitutable may be employed. As the aliphatic group of $R_1$, an alkyl group containing a total of from 1 to 8 carbon atoms is preferred, and an alkyl group containing a total of from 1 to 4 carbon atoms is more preferred. Examples thereof include methyl, ethyl, (s)-butyl, methoxyethyl, and carbamoylmethyl.

The aryl group represented by $R_1$ may have a substituent. As the substituent, any group that has been described hereinbefore in the aforesaid paragraph on substituents and that is substitutable may be employed. The aryl group of $R_1$ is preferably an aryl group containing a total of from 6 to 12 carbon atoms, more preferably an aryl group containing a total of from 6 to 10 carbon atoms. Examples thereof include phenyl, 4-methylphenyl, and 3-chlorophenyl.

The heterocyclic group represented by $R_1$ may be a saturated heterocyclic group or an unsaturated heterocyclic group, and may have a substituent. As the substituent, any group that has been described hereinbefore in the aforesaid paragraph on substituents and that is substitutable may be employed. The heterocyclic group represented by $R_1$ is preferably a heterocyclic group containing a total of from 2 to 10 carbon atoms, more preferably a saturated heterocyclic group containing a total of from 2 to 8 carbon atoms and being connected through a nitrogen atom. Examples thereof include 1-piperidyl, 4-morpholinyl, 2-pyrimidyl, and 4-pyridyl.

$R_1$ is preferably an amino group which may have a substituent, an aliphatic oxy group, or a saturated heterocyclic group connected through a nitrogen atom, more preferably an amino group which may have a substituent.

The substituent represented by $R_2$ may be any group that has been described hereinbefore in the aforesaid paragraph on substituents and that is substitutable may be employed, and is preferably an aliphatic group, an aryl group, a heterocyclic group, an aliphatic oxycarbonyl group, a carboxyl group, a carbamoyl group which may have a substituent, an acylamino group, a sulfonamido group, a carbamoylamino group which may have a substituent, a sulfamoyl group which may have a substituent, an aliphatic oxy group, an aliphatic thio group, a cyano group, or a halogen atom, more preferably an aliphatic oxycarbonyl group, a carbamoyl group which may have a substituent, an acylamino group, a carbamoyl group which may have a substituent, an aliphatic oxy group, or a halogen atom.

The aromatic 5- or 6-membered heterocyclic group represented by A may be condensed with other ring or may be monocyclic, and the other ring may be carbocyclic, heterocyclic, aromatic, or non-aromatic. The heterocyclic group is preferably an aromatic 5- or 6-membered ring containing from 1 to 3 hetero atoms. In the case where the aromatic 5- or 6-membered heterocyclic ring contains two or more nitrogen atoms, at least one nitrogen atom is an unsubstituted nitrogen atom. The aromatic 5- or 6-membered heterocyclic group which is represented by A and which may be condensed with other ring preferably contains a total of from 2 to 15 carbon atoms, more preferably from 2 to 10 carbon atoms. Examples thereof include a pyridine ring, a pyrazine ring, a pyrimidine ring, a pyridazine ring, a triazine ring, a pyrrole ring, a furan ring, a thiophene ring, an imidazole ring, a pyrazole ring, an oxazole ring, a thiazole ring, an isoxazole ring, an isothiazole ring, a triazole ring, a thiadiazole ring, an oxadiazole ring, and a condensed heterocyclic group wherein one of these groups is condensed with a benzene ring derivative or a heterocyclic derivative.

m preferably represents from 0 to 3, more preferably from 0 to 1, still more preferably 0. n preferably represents 1 or 2.

Pigments represented by the general formula (1) are preferably azo pigments represented by the following general formula (2).

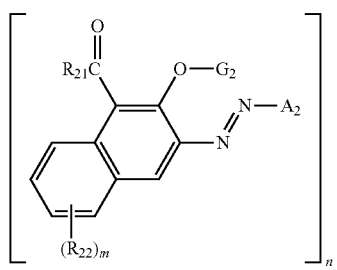

General Formula (2)

In the general formula (2), $G_2$ represents a hydrogen atom, an aliphatic group, an aryl group, or a heterocyclic group, $R_{21}$ represents an amino group, an aliphatic oxy group, an aliphatic group, an aryl group, or a heterocyclic group, and $R_{22}$ represents a substituent. $A_2$ represents the following general formulae (A-1) to (A-34). m and n are the same as are defined with respect to the general formula (1). When n=2, the general formula (2) represents a dimer formed through $R_{21}$, $R_{22}$, $G_2$, or $A_2$. When n=3, the general formula represents a trimer formed through $R_{21}$, $R_{22}$, $G_2$, or $A_2$. When n=4, the general formula represents a tetramer formed through $R_{21}$, $R_{22}$, $G_2$, or $A_2$.

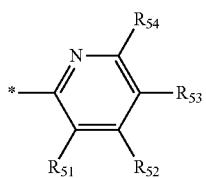 (A-1)

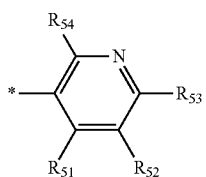 (A-2)

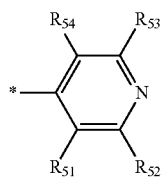 (A-3)

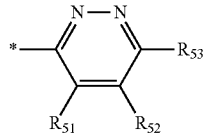 (A-4)

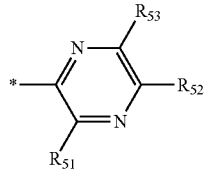 (A-5)

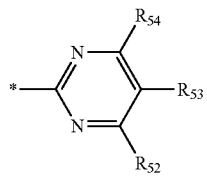 (A-6)

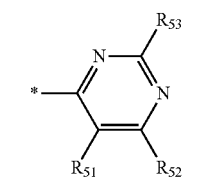 (A-7)

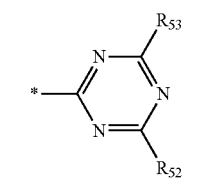 (A-8)

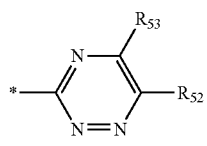 (A-9)

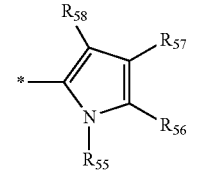 (A-10)

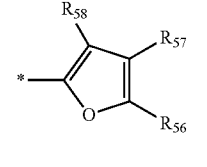 (A-11)

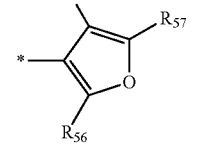 (A-12)

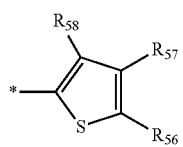 (A-13)
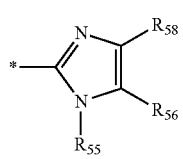 (A-14)
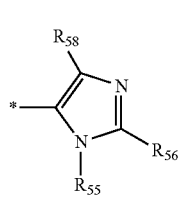 (A-15)
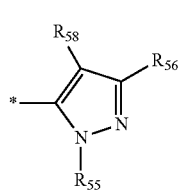 (A-16)
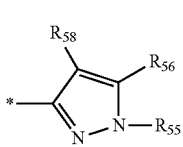 (A-17)
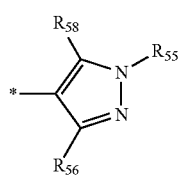 (A-18)
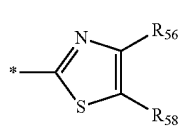 (A-19)
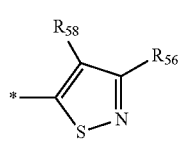 (A-20)
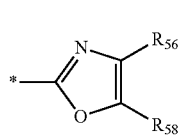 (A-21)
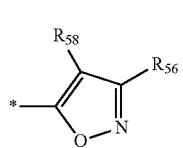 (A-22)
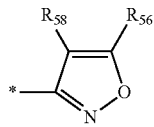 (A-23)
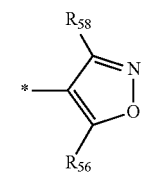 (A-24)
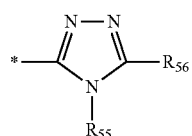 (A-25)
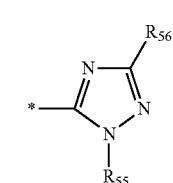 (A-26)
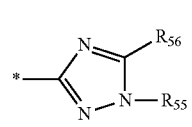 (A-27)
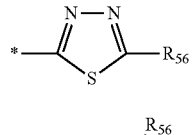 (A-28)
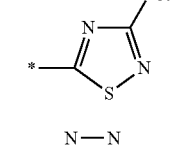 (A-29)
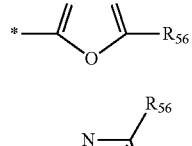 (A-30)
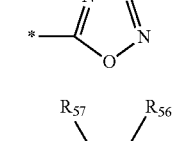 (A-31)
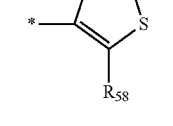 (A-32)
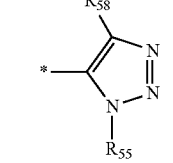 (A-33)

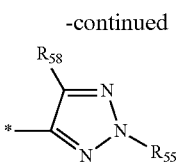
(A-34)

In the general formulae (A-1) to (A-34), $R_{51}$ to $R_{58}$ each represents a hydrogen atom or a substituent, and adjacent substituents may be connected to each other to form a 5- or 6-membered ring. * shows the point of attachment to the azo group in the general formula (2).

The aliphatic group, aryl group, and heterocyclic group represented by $G_2$ are the same as are described for G in the general formula (1). In view of the effects of the invention, $G_2$ is preferably a hydrogen atom.

The amino group, aliphatic oxy group, and saturated heterocyclic group connected through the nitrogen atom, which are represented by $R_{21}$, are the same as are described for $R_1$ with respect to the general formula (1). In view of the effects of the invention, $R_{21}$ is preferably an amino group which may have a substituent or a saturated heterocyclic group connected through the nitrogen atom, more preferably an amino group which may have a substituent.

The substituent represented by $R_{22}$ is preferably the same as is described for $R_2$ in the general formula (1).

The aliphatic group represented by $R_{22}$ may have a substituent, and may be saturated or unsaturated and, as a group which may be the substituent, any group that has been described hereinbefore in the aforesaid paragraph on substituents and that is substitutable may be employed. The aliphatic group of $R_{22}$ is preferably an alkyl group containing a total of from 1 to 8 carbon atoms, more preferably an alkyl group containing a total of from 1 to 6 carbon atoms, and examples thereof include methyl, ethyl, i-propyl, cyclohexyl, and t-butyl.

The aryl group represented by $R_{22}$ may have a substituent and, as a group which may be the substituent, any group that has been described hereinbefore in the aforesaid paragraph on substituents and that is substitutable may be employed. The aryl group of $R_{22}$ is preferably an aryl group containing a total of from 6 to 12 carbon atoms, more preferably an aryl group containing a total of from 6 to 10 carbon atoms, and examples thereof include phenyl, 3-methoxyphenyl, and 4-carbamoylphenyl.

The heterocyclic group represented by $R_{22}$ may have a substituent and may be saturated or unsaturated or condensed with other ring. As a group which may be the substituent, any group that has been described hereinbefore in the aforesaid paragraph on substituents and that is substitutable may be employed. The heterocyclic group of $R_{22}$ is preferably a heterocyclic group containing a total of from 2 to 16 carbon atoms, more preferably a 5- or 6-membered heterocyclic ring containing a total of from 2 to 12 carbon atoms. Examples thereof include 1-pyrrolidinyl, 4-morpholinyl, 2-pyridyl, 1-pyrrolyl, 1-imidazolyl, and 1-benzimidazolyl.

The aliphatic oxycarbonyl group represented by $R_{22}$ may have a substituent and may be saturated or unsaturated. As a group which may be the substituent, any group that has been described hereinbefore in the aforesaid paragraph on substituents and that is substitutable may be employed. The aliphatic oxycarbonyl group of $R_{22}$ is preferably an alkoxycarbonyl group containing a total of from 1 to 8 carbon atoms, more preferably an alkoxycarbonyl group containing a total of from 1 to 6 carbon atoms. Examples thereof include methoxycarbonyl, i-propyloxycarbonyl, and carbamoylmethoxycarbonyl.

The carbamoyl group represented by $R_{22}$ may have a substituent and, as a group which may be the substituent, any group that has been described hereinbefore in the aforesaid paragraph on substituents and that is substitutable may be employed. The substituent is preferably an aliphatic group, an aryl group, a heterocyclic group, or the like. The carbamoyl group of $R_{22}$ which may have a substituent is preferably a carbamoyl group, an alkylcarbamoyl group containing a total of from 2 to 9 carbon atoms, a dialkylcarbamoyl group containing a total of from 3 to 10 carbon atoms, an arylcarbamoyl group containing a total of from 7 to 13 carbon atoms, or a heterocyclic carbamoyl group containing a total of from 3 to 12 carbon atoms, more preferably a carbamoyl group, an alkylcarbamoyl group containing a total of from 2 to 7 carbon atoms, a dialkylcarbamoyl group containing a total of from 3 to 6 carbon atoms, an arylcarbamoyl group containing a total of from 7 to 11 carbon atoms, or a heterocyclic carbamoyl group containing a total of from 3 to 10 carbon atoms. Examples thereof include carbamoyl, methylcarbamoyl, dimethylcarbamoyl, phenylcarbamoyl, and 4-pyridinecarbamoyl.

The acylamino group represented by $R_{22}$ may have a substituent and may be aliphatic, aromatic, or heterocyclic and, as a group which may be the substituent, any group that has been described hereinbefore in the aforesaid paragraph on substituents and that is substitutable may be employed. The acylamino group of $R_{22}$ is preferably an acylamino group containing a total of from 2 to 12 carbon atoms, more preferably an acylamino group containing a total of from 1 to 8 carbon atoms, still more preferably an alkylcarbonylamino group containing a total of from 1 to 8 carbon atoms. Examples thereof include acetylamino, benzoylamino, 2-pyridinecarbonylamino, and propanoylamino.

The sulfonamido group represented by $R_{22}$ may have a substituent and may be aliphatic, aromatic, or heterocyclic and, as a group which may be the substituent, any group that has been described hereinbefore in the aforesaid paragraph on substituents and that is substitutable may be employed. The sulfonamido group of $R_{22}$ is preferably a sulfonamido group containing a total of from 1 to 12 carbon atoms, more preferably a sulfonamido group containing a total of from 1 to 8 carbon atoms, still more preferably a sulfonamido group containing a total of from 1 to 8 carbon atoms. Examples thereof include methanesulfonamido, benzenesulfonamido, and 2-pyridinesulfonamido.

The carbamoylamino group represented by $R_{22}$ may have a substituent and, as a group which may be the substituent, any group that has been described hereinbefore in the aforesaid paragraph on substituents and that is substitutable may be employed. The substituent is preferably an aliphatic group, an aryl group, a heterocyclic group, or the like. The carbamoylamino group of $R_{22}$ which may have a substituent is preferably a carbamoylamino group, an alkylcarbamoylamino group containing a total of from 2 to 9 carbon atoms, a dialkylcarbamoylamino group containing a total of from 3 to 10 carbon atoms, an arylcarbamoylamino group containing a total of from 7 to 13 carbon atoms, or a heterocyclic carbamoylamino group containing a total of from 3 to 12 carbon atoms, more preferably a carbamoylamino group, an alkylcarbamoylamino group containing a total of from 2 to 7 carbon atoms, a dialkylcarbamoylamino group containing a total of from 3 to 6 carbon atoms, an arylcarbamoylamino group containing a total of from 7 to 11 carbon atoms, or a heterocyclic carbamoylamino group containing a total of from 3 to 10 carbon atoms. Examples thereof include carbamoylamino, methylcarbamoylamino, N,N-dimethylcarbamoylamino, phenylcarbamoylamino, and 4-pyridinecarbamoylamino.

With the sulfamoyl group which is represented by $R_{22}$ and which may have a substituent, the group which may be a substituent may be any group that has been described hereinbefore in the aforesaid paragraph on substituents that is substitutable. The substituent is preferably an aliphatic group, an aryl group, a heterocyclic group, or the like. The sulfamoyl group of $R_{22}$ which may have a substituent is preferably a sulfamoyl group, an alkylsulfamoyl group containing a total of from 1 to 9 carbon atoms, a dialkylsulfamoyl group containing a total of from 2 to 10 carbon atoms, an arylsulfamoyl group containing a total of from 7 to 13 carbon atoms, or a heterocyclic sulfamoyl group containing a total of from 2 to 12 carbon atoms, more preferably a sulfamoyl group, an alkylsulfamoyl group containing a total of from 1 to 7 carbon atoms, a dialkylsulfamoyl group containing a total of from 3 to 6 carbon atoms, an arylsulfamoyl group containing a total of from 6 to 11 carbon atoms, or a heterocyclic sulfamoyl group containing a total of from 2 to 10 carbon atoms. Examples thereof include sulfamoyl, methylsulfamoyl, N,N-dimethylsulfamoyl, phenylsulfamoyl, and 4-pyridinesulfamoyl.

The aliphatic oxy group represented by $R_{22}$ may have a substituent and may be saturated or unsaturated and, as a group which may be the substituent, any group that has been described hereinbefore in the aforesaid paragraph on substituents and that is substitutable may be employed. The aliphatic oxy group of $R_{22}$ is preferably an alkoxy group containing a total of from 1 to 8 carbon atoms, more preferably an alkoxy group containing a total of from 1 to 6 carbon atoms, and examples thereof include methoxy, ethoxy, i-propyloxy, cyclohexyloxy, and methoxyethoxy.

The aliphatic thio group represented by $R_{22}$ may have a substituent and may be saturated or unsaturated and, as a group which may be the substituent, any group that has been described hereinbefore in the aforesaid paragraph on substituents and that is substitutable may be employed. The aliphatic thio group of $R_{22}$ is preferably an alkyl thio group containing a total of from 1 to 8 carbon atoms, more preferably an alkyl thio group containing a total of from 1 to 6 carbon atoms, and examples thereof include methylthio, ethylthio, carbamoylmethylthio, and t-butylthio.

The halogen atom represented by $R_{22}$ is preferably a fluorine atom, a chlorine atom, or a bromine atom, more preferably a chlorine atom.

In view of the effects of the invention, $R_{22}$ is preferably an aliphatic oxycarbonyl group or a carbamoyl group which may have a substituent. In view of the effects of the invention, m preferably represents 0 or 1, more preferably 0.

The general formulae (A-1) to (A-34) represented by A will be described.

The substituents represented by $R_{51}$ to $R_{54}$ may be any group that has been described hereinbefore in the aforesaid paragraph on substituents and that is substitutable may be employed. The substituent of $R_{51}$ to $R_{54}$ is preferably an aliphatic group, an aryl group, a heterocyclic group, an aliphatic oxycarbonyl group, a carbamoyl group which may have a substituent, an acylamino group, a sulfonamido group, an aliphatic oxy group, an aliphatic thio group, a cyano group, or the like, more preferably an aliphatic group, an aliphatic oxycarbonyl group, a carbamoyl group which may have a substituent, an aliphatic oxy group, a cyano group, or the like.

In view of the effects of the invention, $R_{51}$ to $R_{54}$ each is preferably a hydrogen atom, an aliphatic group, an aryl group, a heterocyclic group, an aliphatic oxycarbonyl group, a carbamoyl group which may have a substituent, an acylamino group, a sulfonamido group, an aliphatic oxy group, an aliphatic thio group, a cyano group, or the like, more preferably a hydrogen atom, an aliphatic group, an aliphatic oxycarbonyl group, a carbamoyl group which may have a substituent, an aliphatic oxy group, or a cyano group.

The substituent represented by $R_{55}$ may be any group that has been described hereinbefore in the aforesaid paragraph on substituents and that is substitutable may be employed. The substituent of $R_{55}$ is preferably an aliphatic group, an aryl group, a heterocyclic group, or the like, more preferably an aliphatic group, an aryl group, or an aromatic 5- or 6-membered heterocyclic group containing a nitrogen atom at a position adjacent to the binding position.

In view of the effects of the invention, $R_{55}$ is preferably an aliphatic group, an aryl group, or a heterocyclic group, more preferably an aliphatic group, an aryl group, or an aromatic 5- or 6-membered heterocyclic group containing a nitrogen atom at a position adjacent to the binding position, still more preferably an aromatic 5- or 6-membered heterocyclic group containing a nitrogen atom at a position adjacent to the binding position. When $R_{55}$ is an aromatic 5- or 6-membered heterocyclic group containing a nitrogen atom at a position adjacent to the binding position, not only the intermolecular mutual action of the colorant molecules but the intramolecular mutual action is easily strengthened. This is favorable in the point that it facilitates formation of a pigment having a stable molecular arrangement, which serves to show good hue and high fastness (e.g., light fastness, gas fastness, heat fastness, water fastness, etc.).

The substituent represented by $R_{56}$ to $R_{57}$ may be any group that has been described hereinbefore in the aforesaid paragraph on substituents and that is substitutable may be employed. The substituent. of $R_{56}$ to $R_{57}$ is preferably an aliphatic group, an aryl group, a heterocyclic group, an aliphatic oxycarbonyl group, a carbamoyl group which may have a substituent, an acylamino group, a sulfonamido group, an aliphatic oxy group, an aliphatic thio group, a cyano group, or the like, more preferably an aliphatic group, an aliphatic oxy group, an aliphatic thio group, a cyano group, or the like.

In view of the effects of the invention, $R_{56}$ to $R_{57}$ is preferably a hydrogen atom, an aliphatic group, an aryl group, a heterocyclic group, an aliphatic oxycarbonyl group, a carbamoyl group which may have a substituent, an acylamino group, a sulfonamido group, an aliphatic oxy group, an aliphatic thio group, a cyano group, or the like, more preferably a hydrogen atom, an aliphatic group, an aliphatic oxy group, an aliphatic thio group, or a cyano group.

As the substituent represented by $R_{58}$, any group that has been described hereinbefore in the aforesaid paragraph on substituents and that is substitutable may be employed. In view of the effects of the invention, $R_{58}$ is preferably a heterocyclic group or an electron-withdrawing group having a Hammett substituent σp value of 0.2 or more, more preferably an electron-withdrawing group having a Hammett substituent σp value of 0.3 or more. With the electron-withdrawing group, the upper limit of the Hammett substituent σp value is 1.0 or less.

Specific examples of $R_{58}$ which is an electron-withdrawing group having a σp value of 0.2 or more include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanato group, a thiocarbonyl group, a halogenated alkyl group, a halogenated alkoxy group, a halogenated aryloxy group, a halogenated alkylamino group, a halogenated alkylthio group, an aryl group substituted by other electron-withdrawing group having a σp value of 0.2 or more, a heterocyclic group, a halogen atom, an azo group, and a selenocyanato group.

In view of the effects of the invention, $R_{58}$ is preferably an acyl group, a carbamoyl group, an alkyloxycarbonyl group, a cyano group, an alkylsulfonyl group, or a sulfamoyl group, more preferably a carbamoyl group, an alkyloxycarbonyl group, or a cyano group, most preferably a cyano group.

In view of hue and fastness, $A_2$ in the foregoing general formula (2) preferably represents one of the general formulae of (A-1) to (A-5), (A-7), (A-10) to (A-20), (A-22) to (A-26), and (A-32) to (A-34). More preferably, $A_2$ represents one of the general formulae of (A-1), (A-5), (A-10) to (A-18), (A-20), (A-22) to (A-26), and (A-32), still more preferably one of the general formulae of (A-10), (A-14) to (A-17), and (A-20), particularly preferably (A-16).

In view of the effects of the invention, the pigment represented by the general formula (2) is preferably a pigment wherein $G_2$ represents a hydrogen atom, $R_{21}$ represents an amino group which may have a substituent, or a saturated heterocyclic group connected through the nitrogen atom, m is 0 or 1 and, when m is 1, $R_{22}$ represents an aliphatic oxycarbonyl group or a carbamoyl group which may have a substituent, $A_2$ represents one of (A-1) to (A-5), (A-7), (A-10) to (A-18), (A-20), (A-22) to (A-26), and (A-32) to (A-34), and n is 1 or 2, or is preferably a pigment wherein $G_2$ represents a hydrogen atom, $R_{21}$ represents an amino group which may have a substituent or a saturated heterocyclic group connected at the nitrogen atom, m is 0, $A_2$ represents one of (A-1), (A-5), (A-10) to (A-18), (A-20), (A-22) to (A-26), and (A-32), and n is 1 or 2, still more preferably a pigment wherein $G_2$ represents a hydrogen atom, $R_{21}$ represents an amino group which may have a substituent, m is 0, $A_2$ represents one of (A-10), (A-14) to (A-17), and (A-20), and n is 1 or 2, most preferably a pigment wherein $G_2$ represents a hydrogen atom, $R_{21}$ represents an amino group which may have a substituent, m is 0, $A_2$ represents (A-16), and n is 1 or 2.

In view of the effects of the invention, the azo pigments represented by the general formulae (1) and (2) are preferably azo pigments represented by the following general formula (3).

The azo pigments represented by the general formula (3), and the tautomers, salts, and hydrates thereof will be described in detail below.

General Formula (3)

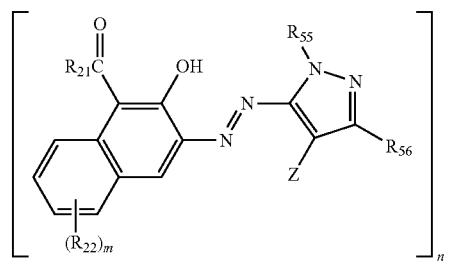

In the general formula (3), $R_{21}$, $R_{22}$, $R_{55}$, $R_{56}$, m, and n are the same as those defined with respect to the general formula (2). Z represents an electron-withdrawing group having a Hammett σp value of 0.2 or more.

As the substituent represented by Z and having a Hammett σp value of 0.2 or more, there are illustrated those groups which have been mentioned in the description on $R_{58}$ in the general formula (2).

Preferred substituents or scopes of $R_{21}$, $R_{22}$, $R_{55}$, $R_{56}$, m, and n in the pigments represented by the general formula (3) are the same as those in the general formula (2).

In view of the effects of the invention, Z is preferably an acyl group, a carbamoyl group, an alkyloxycarbonyl group, a cyano group, an alkylsulfonyl group, or a sulfamoyl group, more preferably a carbamoyl group, an alkyloxycarbonyl group, or a cyano group, most preferably a cyano group.

The aromatic 5- or 6-membered heterocyclic group containing a nitrogen atom at a position adjacent to the binding position, which is preferred as $R_{55}$ in view of the effects of the invention, may have a substituent, may be a saturated heterocyclic group or an unsaturated heterocyclic group, and may be a condensed heterocyclic group, and is preferably an aromatic 5- or 6-membered heterocyclic group containing a nitrogen atom at a position adjacent to the binding position and containing a total of from 2 to 12 carbon atoms, more preferably an aromatic 5- or 6-membered heterocyclic group containing a nitrogen atom at a position adjacent to the binding position and containing a total of from 2 to 10 carbon atoms. Examples thereof include 2-thiazolyl, 2-benzothiazolyl, 2-oxazolyl, 2-benzoxazolyl, 2-pyridyl, 2-pyrazinyl, 3-pyridazinyl, 2-pyrimidinyl, 4-pyrimidinyl, 2-imidazolyl, 2-benzimidazolyl, and 2-triazinyl. These heterocyclic groups may have a tautomer structure together with the substituent.

In the general formula (3), $R_{55}$ is preferably any one of the following (Y-1) to (Y-13), more preferably any one of the following (Y-1) to (Y-6), still more preferably any one of the following (Y-1), (Y-4), and (Y-6). * in the general formulae (Y-1) to (Y-13) shows the point of attachment to the N atom of the pyrazole ring. $Y_1$ to $Y_{11}$ each represents a hydrogen atom or a substituent. $G_{11}$ in (Y-13) represents non-metallic atoms capable of forming a 5- or 6-membered heterocyclic ring. The heterocyclic ring represented by $G_{11}$ may be unsubstituted or may have a substituent, and may be a monocyclic ring or a condensed ring. Formulae (Y-1) to (Y-13) may have a tautomer structure together with the substituent.

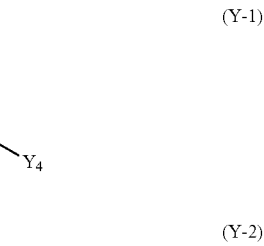

(Y-1)

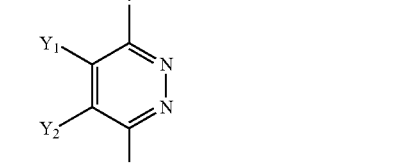

(Y-2)

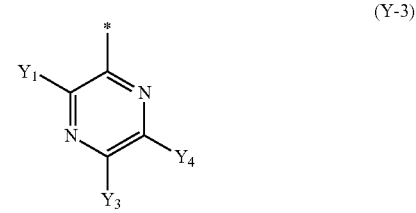

(Y-3)

(Y-4) 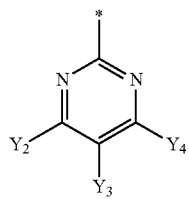

(Y-5) 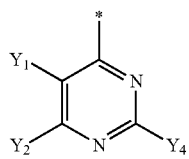

(Y-6) 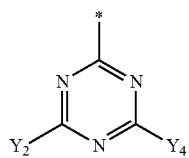

(Y-7) 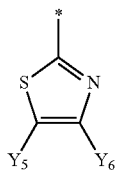

(Y-8) 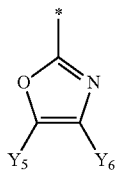

(Y-9) 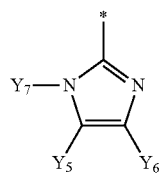

(Y-10) 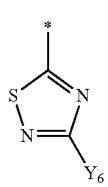

(Y-11) 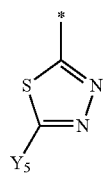

(Y-12) 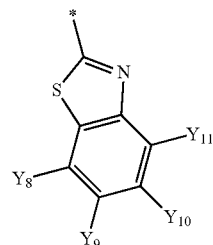

(Y-13) 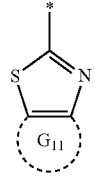

In view of the effects of the invention, the pigment represented by the general formula (3) is a pigment wherein $R_{21}$ represents an amino group which may have a substituent or a saturated heterocyclic group connected through the nitrogen atom, m is 0 or 1 and, when m is 1, $R_{22}$ represents an aliphatic oxycarbonyl group or a carbamoyl group which may have a substituent, $R_{55}$ represents an aromatic 5- or 6-membered heterocyclic group containing a nitrogen atom at a position adjacent to the binding position, $R_{56}$ represents a hydrogen atom or an aliphatic group, Z represents an acyl group, a carbamoyl group, an alkyloxycarbonyl group, a cyano group, an alkylsulfonyl group, or a sulfamoyl group, and n represents 1 or 2, more preferably a pigment wherein $R_{21}$ represents an amino group which may have a substituent or a saturated heterocyclic group connected at the nitrogen atom, m is 0, $R_{55}$ is any one of (Y-1) to (Y-13), $R_{56}$ represents a hydrogen atom or an aliphatic group, Z represents a carbamoyl group, an alkyloxycarbonyl group, or a cyano group, and n represents 1 or 2, still more preferably a pigment wherein $R_{21}$ represents an amino group which may have a substituent, m is 0, $R_{55}$ is any one of (Y-1) to (Y-6), $R_{56}$ represents a hydrogen atom or an aliphatic group, Z represents a carbamoyl group, an alkyloxycarbonyl group, or a cyano group, and n represents 1 or 2, most preferably a pigment wherein $R_{21}$ represents an amino group which may have a substituent, m is 0, $R_{55}$ is any one of (Y-1), (Y-4), and (Y-6), $R_{56}$ represents a hydrogen atom, Z represents a cyano group, and n represents 1 or 2.

In view of the effects of the invention, the pigment represented by the general formulae (1), (2), and (3) is preferably a pigment which has a "total carbon number/azo group number" ratio of 40 or less, more preferably 30 or less. In view of the effects of the invention, the pigment represented by the general formulae (1), (2), and (3) is preferably a pigment which has a "molecular weight/azo group number" ratio of 700 or less. In view of the effects of the invention, the pigment represented by the general formulae (1), (2), and (3) is preferably a pigment which does not have an ionic substituent such as a sulfo group or a carboxyl group.

The invention includes in its scope tautomers of the azo pigments represented by the general formulae (1), (2), and (3). Although the general formulae (1), (2), and (3) are shown in the form of limiting structure among several tautomer forms which are possible in view of chemical structure, the azo pigment may be tautomers of other structure than the shown one, and may be used as a mixture containing plural tautomers. For example, with the pigment represented by the general formula (1), azo-hydrazone tautomers represented by the following general formula (1') can be considered.

The invention also includes in its scope tautomers of the azo pigments represented by the following general formula (1') which is a tautomer of the azo pigment represented by the general formula (1).

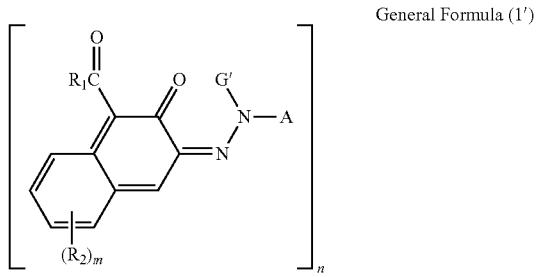

General Formula (1')

In the general formula (1'), $R_1$, $R_2$, A, m, and n are the same as those defined with respect to the general formula (1). In the general formula (1'), G' is a group corresponding to G defined with respect to the general formula (1).

Of the azo pigments represented by the general formula (1) and general formula (2), there can be illustrated, as has been described hereinbefore, azo pigments represented by the following general formula (3-1) or the general formula (3-2) as examples of particularly preferred pigments. The pigment represented by the above general formula (1) is preferably an azo pigment represented by the following general formula (3-1) or the general formula (3-2).

The azo pigments represented by the general formula (3-1) or (3-2), and the tautomers, salts, and hydrates thereof will be described in detail below.

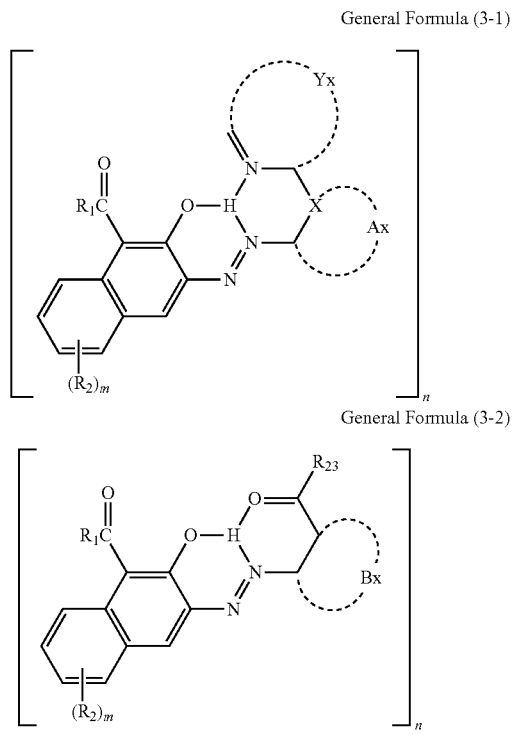

General Formula (3-1)

General Formula (3-2)

In the general formula (3-1) and the general formula (3-2), $R_1$, $R_2$, m, and n are the same as those defined with respect to the general formula (1), the general formula (2), and the general formula (3). X represents a carbon atom or a nitrogen atom, $A_x$ represents an aromatic 5- or 6-membered heterocyclic group together with X and the carbon atom, and $B_x$ represents an aromatic 5- or 6-membered heterocyclic group together with the carbon atoms. Each of the formed heterocyclic groups represents a group corresponding to the group defined with respect to A in the general formula (1). $Y_x$ represents a corresponding heterocyclic group defined for $R_{55}$ in the general formula (2) together with the nitrogen atom and carbon atoms. $R_{23}$ represents a substituent formed by removing carbonyl group from a corresponding substituent among the substituents of $R_{51}$, $R_{54}$, $R_{58}$, etc. specified with respect to the general formula (3).

With the azo pigments represented by the above-described general formulae (1), (2), (3), (3-1), and (3-2), many tautomers may be considered.

Also, in the invention, the azo pigment represented by the general formula (1) preferably has a substituent capable of forming an intramolecular hydrogen bond or intramolecular crosslinking hydrogen bond. It is more preferred for the azo pigment to have a substituent capable of forming at least one or more intramolecular hydrogen bonds, particularly a substituent capable of forming at least one or more intramolecular crosslinking hydrogen bonds.

The reason why this structure is preferred is that, as is shown by the general formulae (3-1) and (3-2), nitrogen atom constituting the heterocyclic group contained in the azo pigment structure, hydrogen atom and oxygen atom of the hydroxyl group of the naphthalene substituent, nitrogen atom of the azo group or of its tautomer of the hydrazone group, or a carbonyl group in the azo component contained in the azo pigment structure, hydrogen atom and oxygen atom of the hydroxyl group of the naphthalene substituent, and nitrogen atom of the azo group or of its tautomer of the hydrazone group are liable to form intramolecular cosslinking hydrogen bonds.

As a result, flatness of the molecule is enhanced, the intramolecular and intermolecular mutual action is improved, crystallinity of the azo pigment represented by the general formula (3-1) or the general formula (3-2) is enhanced (higher structure of the pigment becoming liable to be formed), and hence performances required as pigments, i.e., light fastness, heat stability, moist heat stability, water resistance, gas resistance, and/or solvent resistance, can markedly be improved, thus such pigments being more preferred.

In view of this point, too, pigments represented by the general formulae (1) and (2) are preferably pigments represented by the general formulae (3) and (3-1) or (3-2), more preferably pigments represented by the general formula (3) or (3-1), particularly preferably pigments represented by the general formula (3).

<Azo Compounds>

The invention also relates to azo compounds represented by the following general formula (1), and the tautomers, salts, and hydrates thereof.

General formula (1)

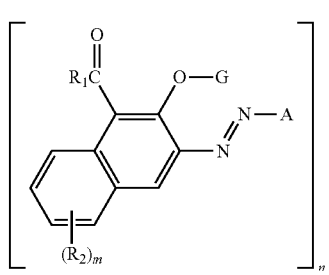

In the general formula (1), G represents a hydrogen atom, an aliphatic group, an aryl group, a heterocyclic group, an acyl group, an aliphatic oxycarbonyl group, a carbamoyl group, an aliphatic sulfonyl group, or an arylsulfonyl group, $R_1$ represents an amino group, an aliphatic oxy group, an aliphatic group, an aryl group, or a heterocyclic group, $R_2$ represents a substituent, and A represents an aromatic 5- to 6-membered heterocyclic group. However, in the case where the aromatic 5- to 6-membered heterocyclic group contains two or more nitrogen atoms, at least one nitrogen atom is an unsubstituted nitrogen atom. m represents an integer of from 0 to 5, and n represents an integer of from 1 to 4. When n=2, the general formula (1) represents a dimer formed through $R_1$, $R_2$, A, or G. When n=3, the general formula (1) represents a trimer formed through $R_1$, $R_2$, A, or G. When n=4, the general formula (1) represents a tetramer formed through $R_1$, $R_2$, A, or G.

The azo compounds represented by the general formula (1) are preferably azo compounds represented by the general formula (2).

General Formula (2)

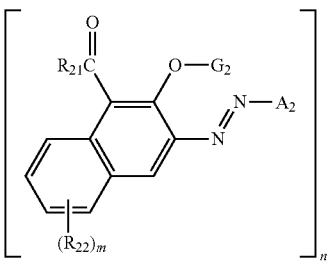

In the general formula (2), $G_2$ represents a hydrogen atom, an aliphatic group, an aryl group, or a heterocyclic group, $R_{21}$ represents an amino group, an aliphatic oxy group, or a heterocyclic group connected through the nitrogen atom, and $R_{22}$ represents a substituent. $A_2$ represents any one of the following general formulae (A-1) to (A-34). m represents an integer of from 0 to 5, and n represents an integer of from 1 to 4. When n=2, the general formula (2) represents a dimer formed through $R_{21}$, $R_{22}$, A, or $G_2$. When n=3, the general formula represents a trimer formed through $R_{21}$, $R_{22}$, A, or $G_2$. When n=4, the general formula represents a tetramer formed through $R_{21}$, $R_{22}$, A, or $G_2$.

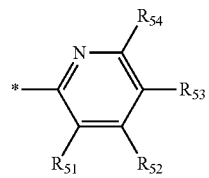 (A-1)

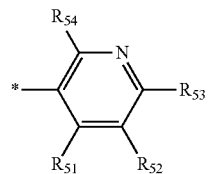 (A-2)

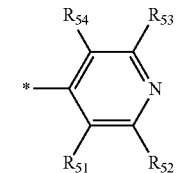 (A-3)

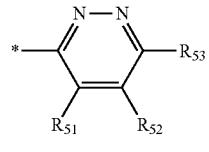 (A-4)

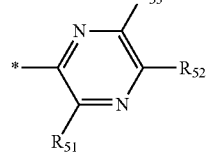 (A-5)

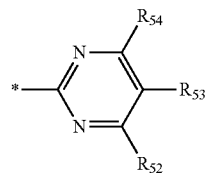 (A-6)

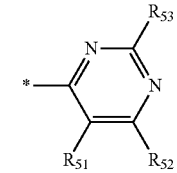 (A-7)

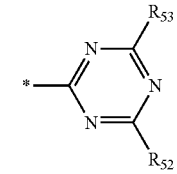 (A-8)

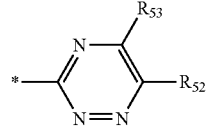 (A-9)

-continued
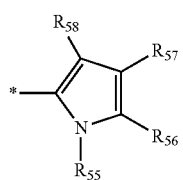 (A-10)
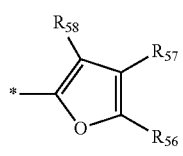 (A-11)
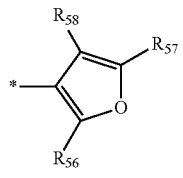 (A-12)
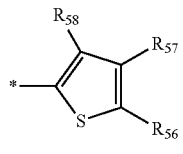 (A-13)
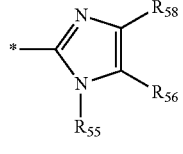 (A-14)
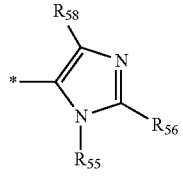 (A-15)
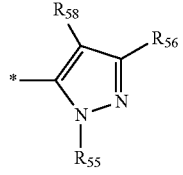 (A-16)
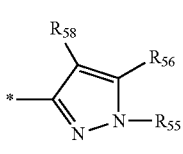 (A-17)
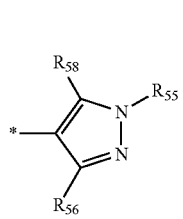 (A-18)
-continued
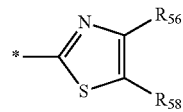 (A-19)
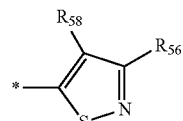 (A-20)
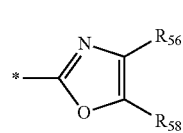 (A-21)
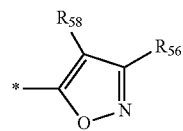 (A-22)
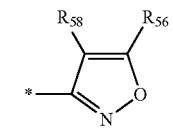 (A-23)
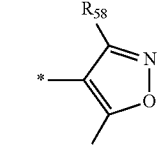 (A-24)
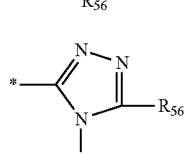 (A-25)
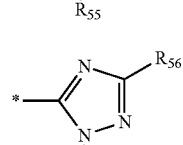 (A-26)
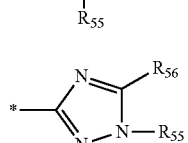 (A-27)
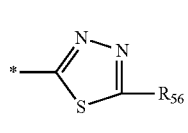 (A-28)
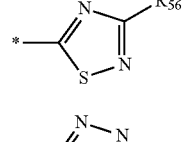 (A-29)
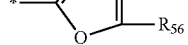 (A-30)

-continued

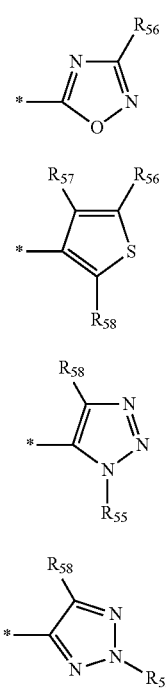

(A-31)

(A-32)

(A-33)

(A-34)

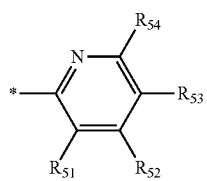
(A-1)

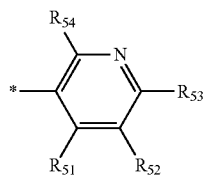
(A-2)

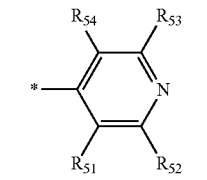
(A-3)

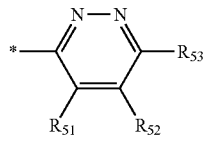
(A-4)

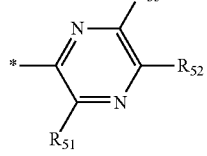
(A-5)

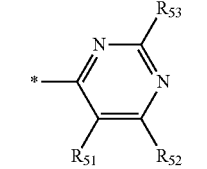
(A-7)

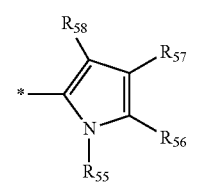
(A-10)

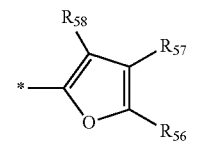
(A-11)

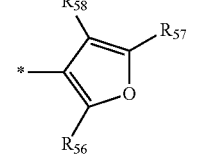
(A-12)

In the general formulae (A-1) to (A-34), $R_{51}$ to $R_{58}$ each represents a hydrogen atom or a substituent, and adjacent substituents may be connected to each other to form a 5- or 6-membered ring. * shows the point of attachment to the azo group in the general formula (2).

The azo compounds represented by the foregoing general formula (2) are preferably azo compounds represented by the following general formula (2'), a tautomer, salt, or hydrate thereof.

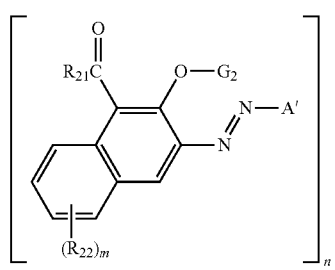

General Formula (2')

In the general formula (2'), $G_2$ represents a hydrogen atom, an aliphatic group, an aryl group, or a heterocyclic group, $R_{21}$ represents an amino group, an aliphatic oxy group, an aliphatic group, an aryl group, or a heterocyclic group, $R_{22}$ represents a substituent, A' represents any one of the following general formulae (A-1) to (A-5), (A-7), (A-10) to (A-18), (A-20), (A-22) to (A-26), and (A-32) to (A-34). m represents an integer of from 0 to 5, and n represents an integer of from 1 to 4. When n=2, the general formula (2') represents a dimer formed through $R_{21}$, $R_{22}$, A', or $G_2$. When n=3, the general formula represents a trimer formed through $R_{21}$, $R_{22}$, A', or $G_2$. When n=4, the general formula represents a tetramer formed through $R_{21}$, $R_{22}$, A', or $G_2$.

(A-13) 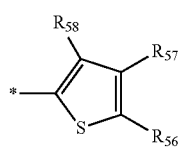

(A-14) 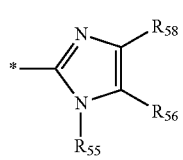

(A-15) 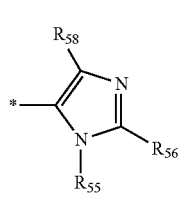

(A-16) 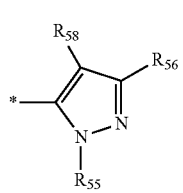

(A-17) 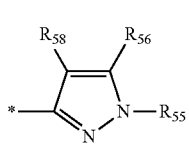

(A-18) 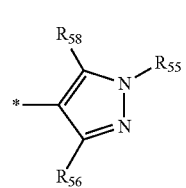

(A-20) 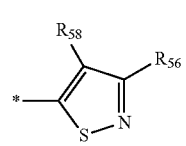

(A-22) 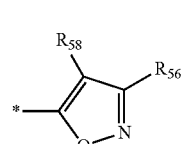

(A-23) 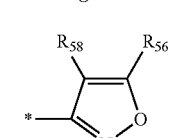

(A-24) 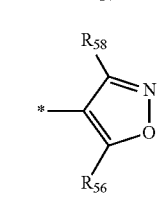

(A-25) 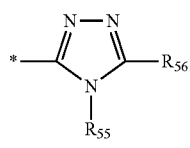

(A-26) 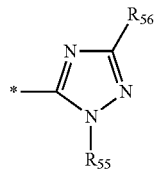

(A-32) 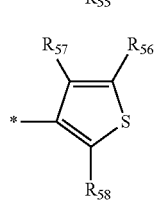

(A-33) 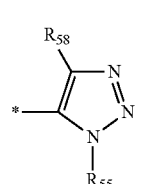

(A-34) 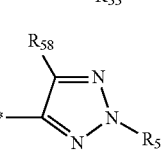

In the general formulae (A-1) to (A-5), (A-7), (A-10) to (A-18), (A-20), (A-22) to (A-26), and (A-32) to (A-34), $R_{55}$ represents a substituent, $R_{51}$ to $R_{54}$ and $R_{56}$ to $R_{58}$ each independently represents a hydrogen atom or a substituent, and adjacent substituents may be connected to each other to form a 5- or 6-membered ring. * shows the point of attachment to the azo group in the general formula (2').

The azo compounds represented by the foregoing general formula (2) are preferably azo compounds represented by the following general formula (3), and the tautomers, salts, and hydrates thereof.

General Formula (3)

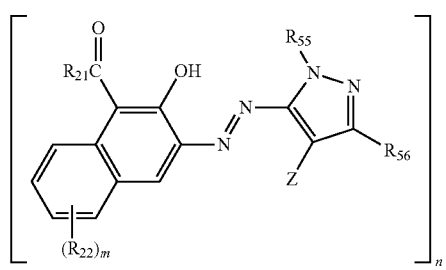

In the general formula (3), $R_{21}$, $R_{22}$, $R_{55}$, $R_{56}$, m, and n are the same as those defined with respect to the general formula (2). Z represents an electron-withdrawing group having a Hammett σp value of 0.2 or more.

As the salts, hydrates, and tautomers of the compounds of the invention represented by the general formula (2) and the general formula (3), there can be illustrated those which are similar to the azo pigment salts, hydrates, and tautomers of the invention.

Preferred substituents in the azo compounds of the general formulae (2) and (3) are the same as those illustrated as preferred substituents in the azo pigments of the general formulae (2) and (3). However, in the case where the azo compounds of the invention represented by the general formula (2) and the general formula (3) are used as dyes, substituents having a larger carbon chain are more preferred in view of enhancing solubility, but a too large carbon chain might decrease solubility, thus the carbon chain size being preferably within the scope having been stated in the description on respective substituents. Also, in the case of using the compounds as water-soluble dyes, the compounds preferably contain a sulfonic acid group, a carboxylic acid group, or the salt thereof as a substituent.

The novel azo compounds of the invention are useful as azo pigments.

Specific examples of the azo pigments and the azo compounds represented by the foregoing general formula (1), the general formula (2), and the general formula (3) will be shown below. However, the azo pigments and the azo compounds to be used in the invention are not limited only to the following examples. Also, it is needless to say that, although the structures of the following specific examples are shown in the form of limiting structure among several tautomer forms which are possible in view of chemical structure, the azo pigments and the azo compounds may be tautomers of other structure than the shown ones.

D-1
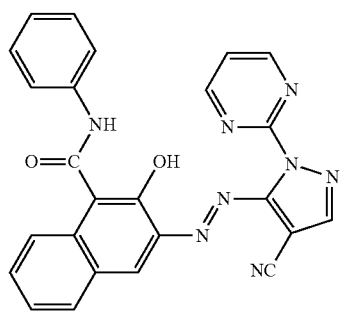

D-2
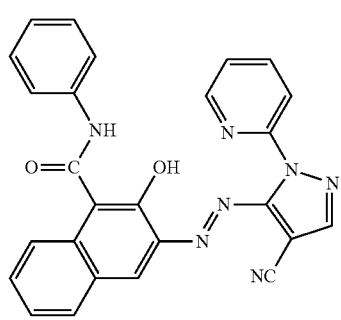

D-3
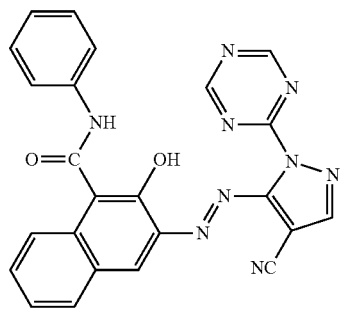

D-4
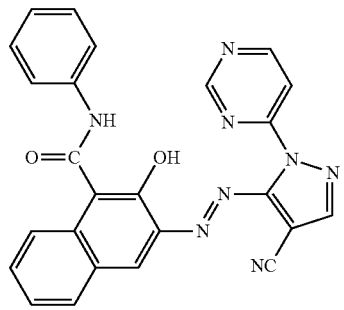

D-5
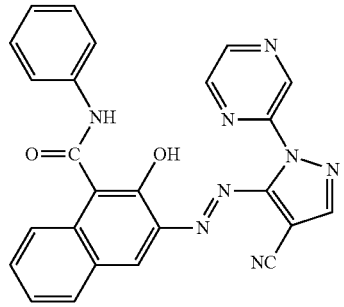

D-6
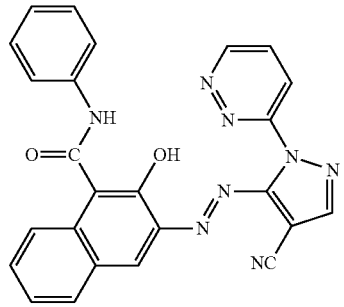

D-7
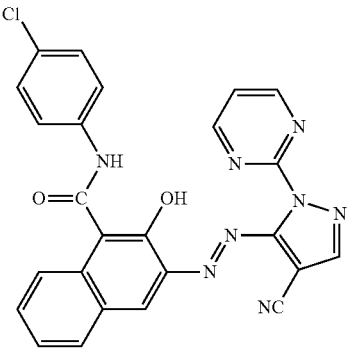

D-8
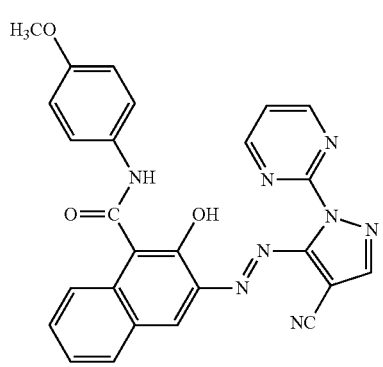
D-11
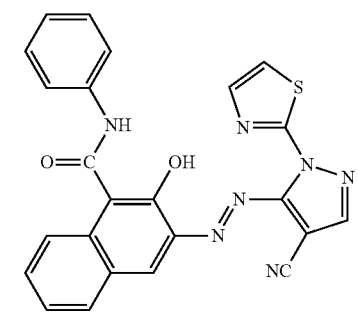
D-12
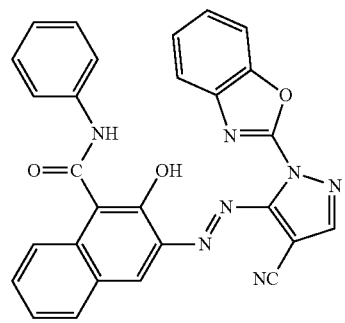
D-13
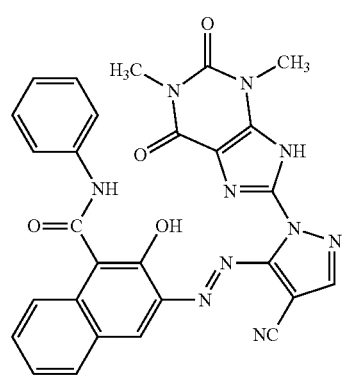
D-14
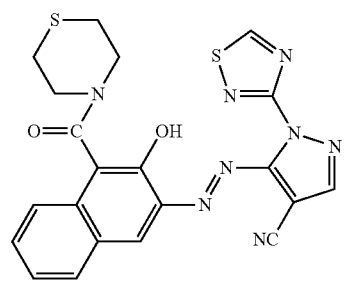
D-15
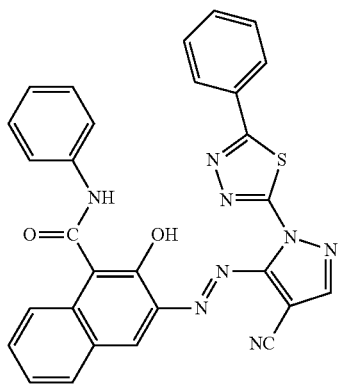
D-16
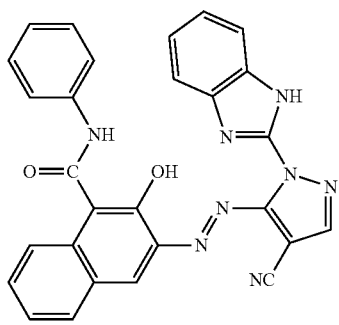
D-17
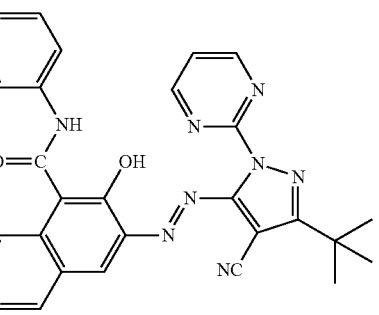
D-18
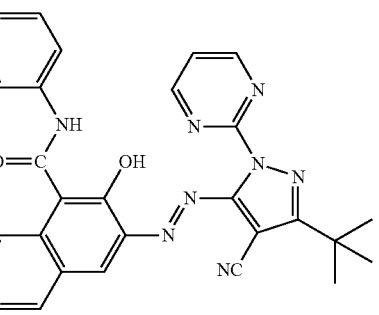
D-19
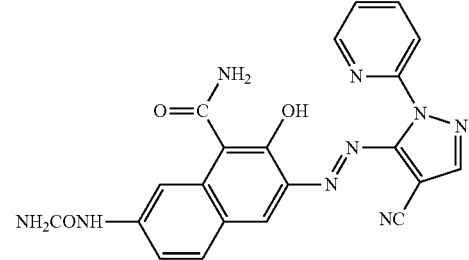

D-20
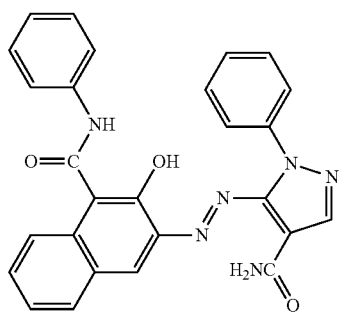
D-21
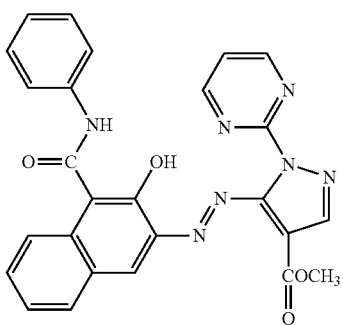
D-22
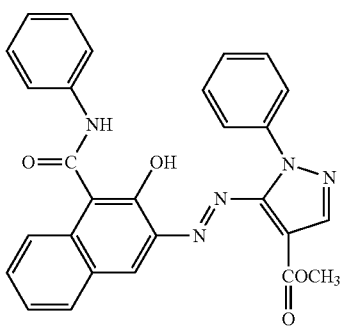
D-23
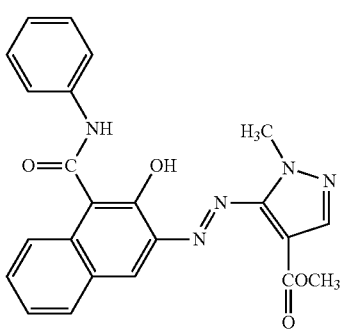
D-24
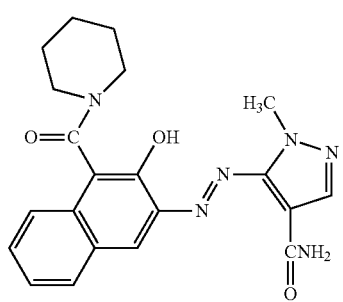
D-25
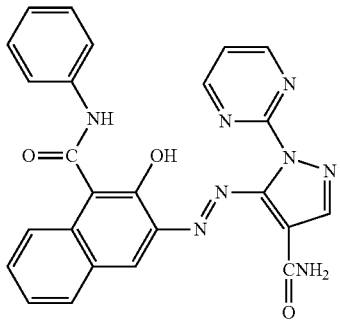
D-26
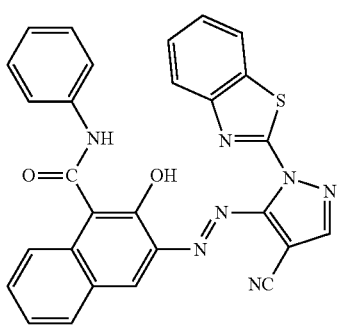
D-27
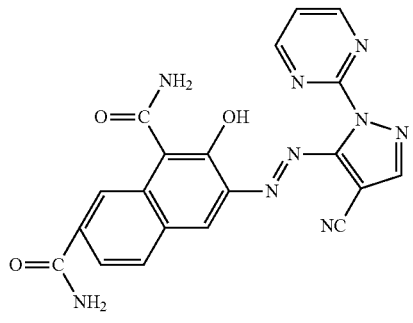
D-28
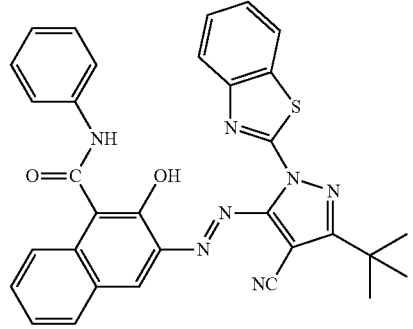
D-29
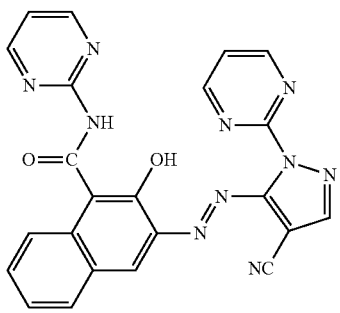

-continued
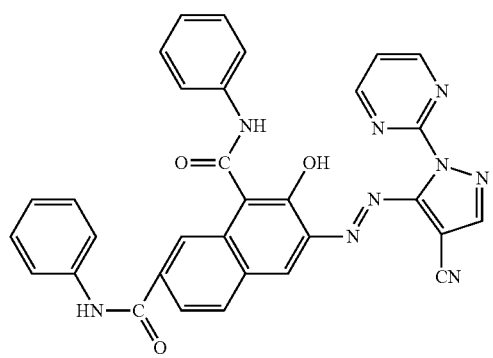
D-30
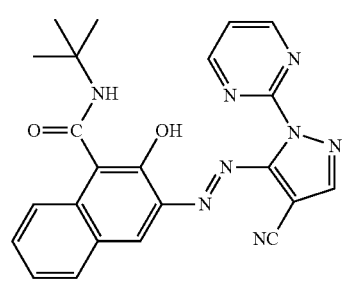
D-31
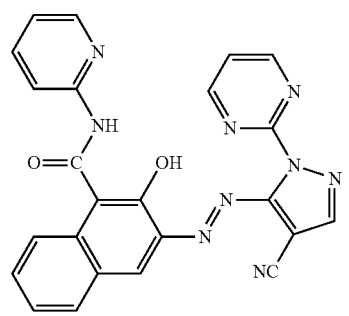
D-32
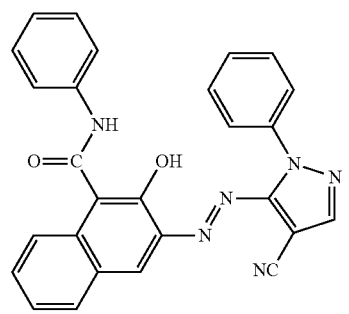
D-33
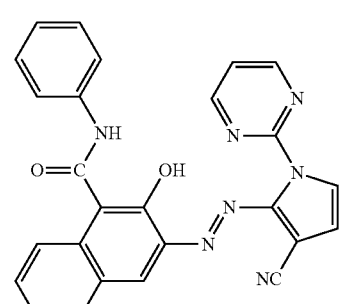
D-34
-continued
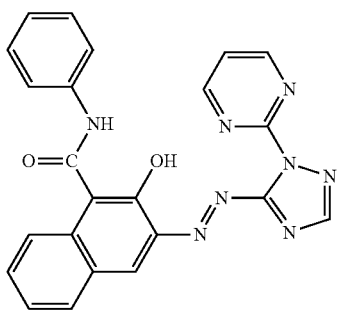
D-35
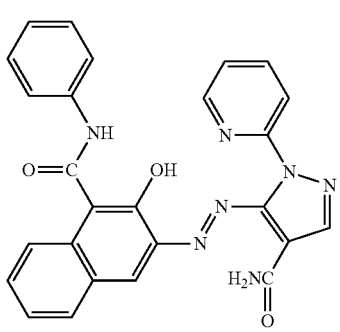
D-36
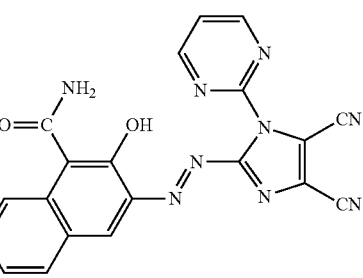
D-37
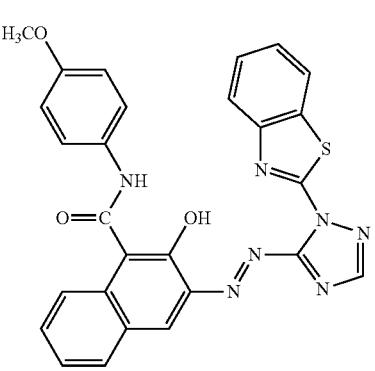
D-38
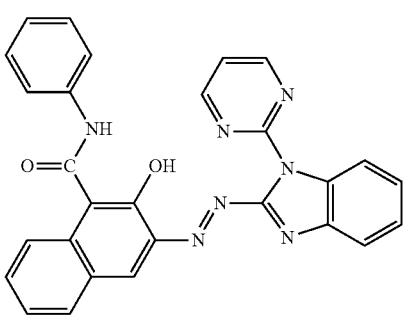
D-39

-continued
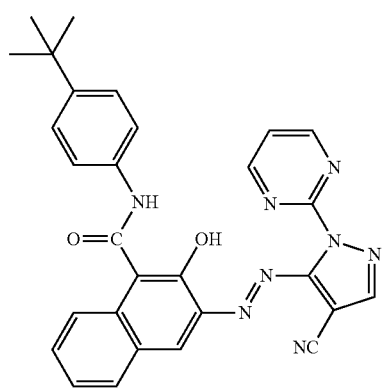
D-40
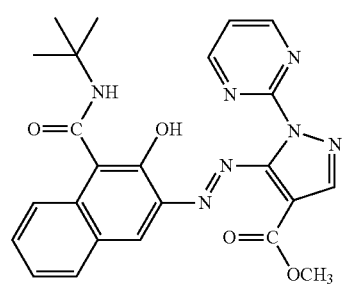
D-41
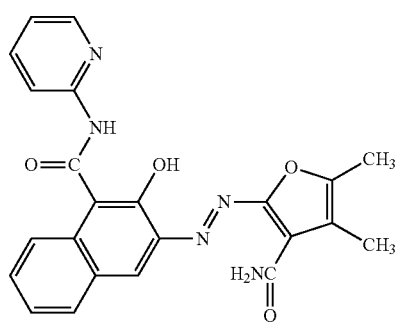
D-42
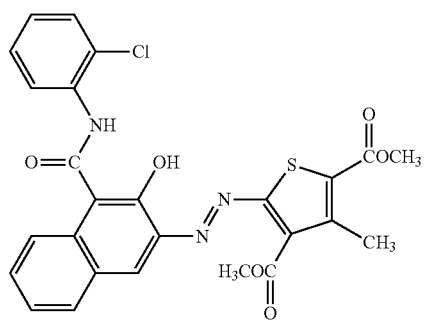
D-43
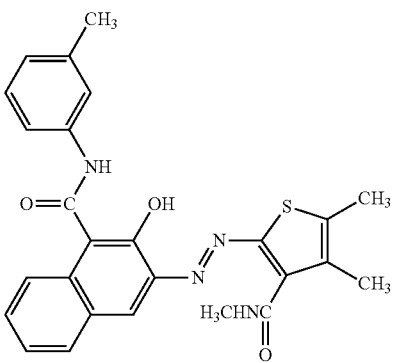
D-44
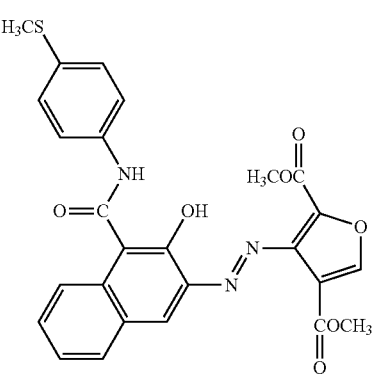
D-45
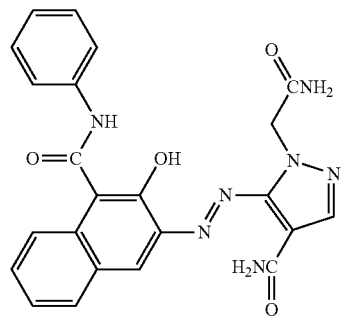
D-46
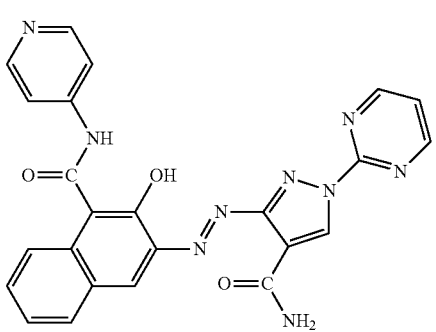
D-47

-continued
D-48
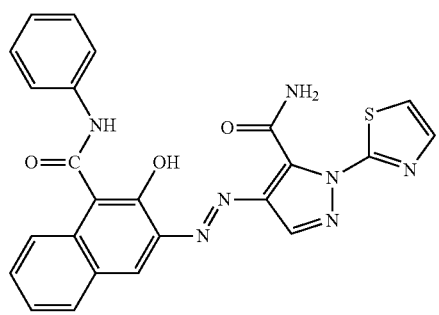
D-49
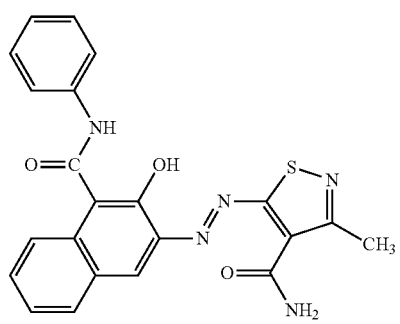
D-50
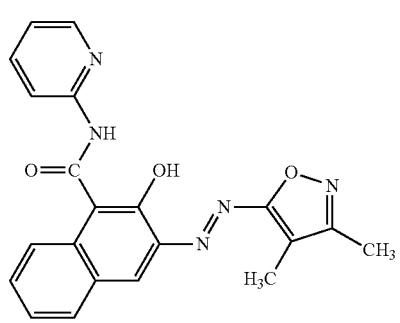
D-61
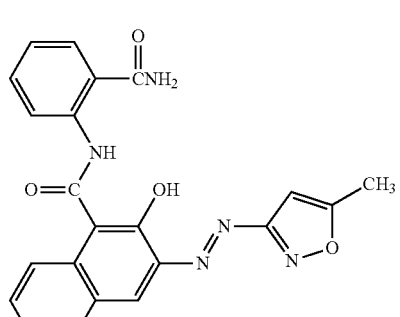
D-62
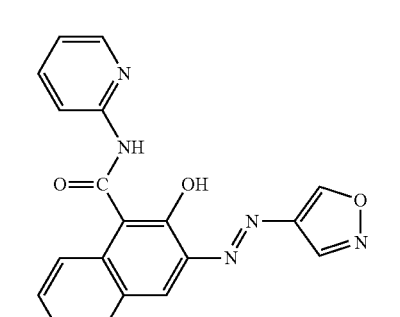
-continued
D-63
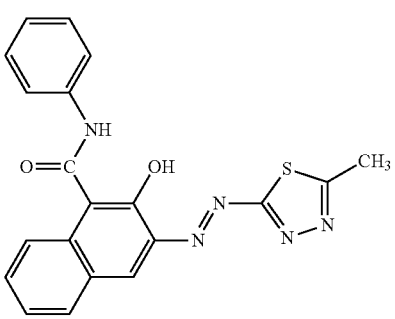
D-64
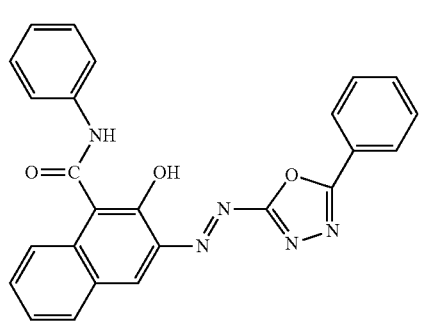
D-65
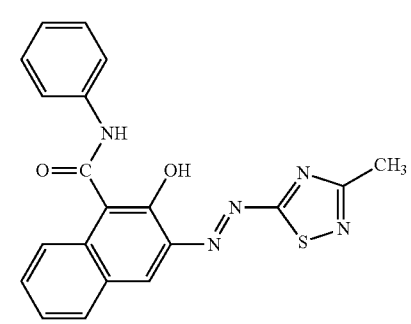
D-66
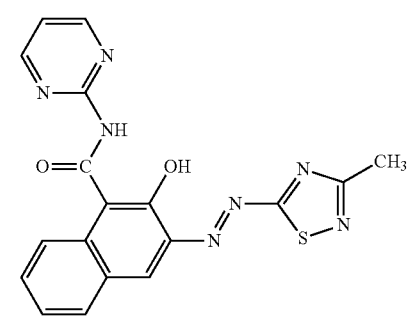
D-67
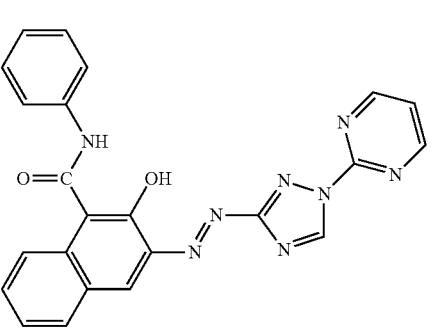

D-68
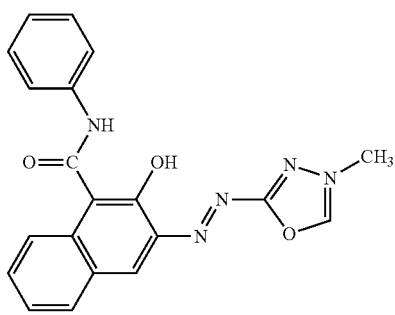
D-69
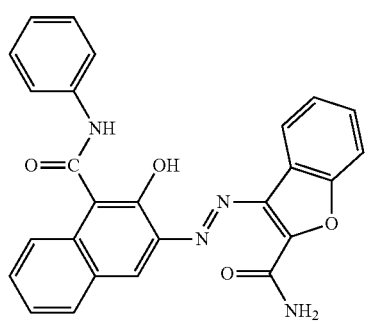
D-70
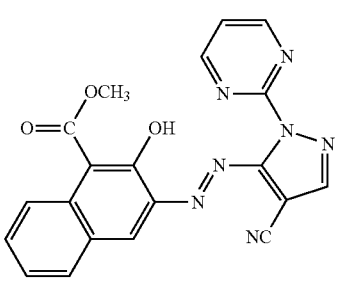
D-71
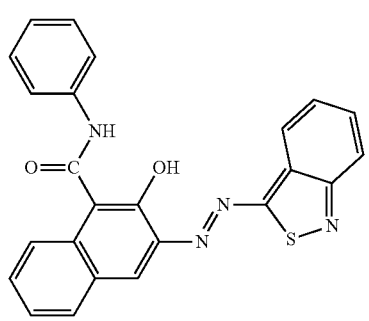
D-72
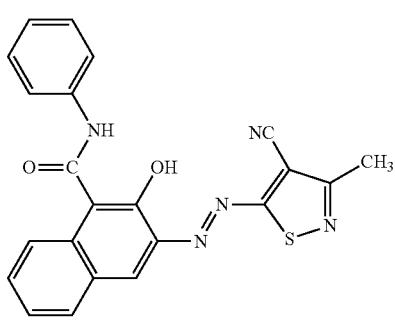
D-73
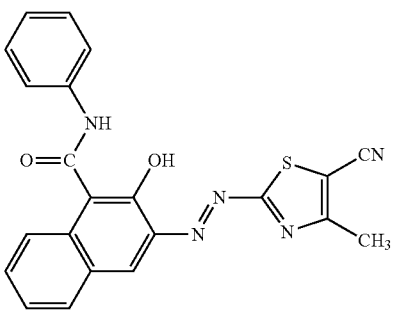
D-74
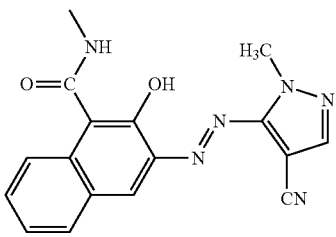
D-75
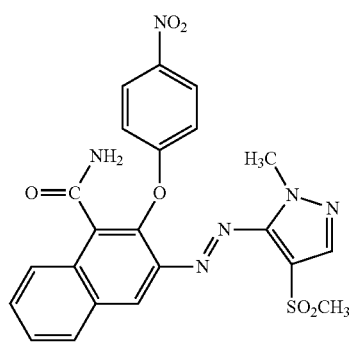
D-76
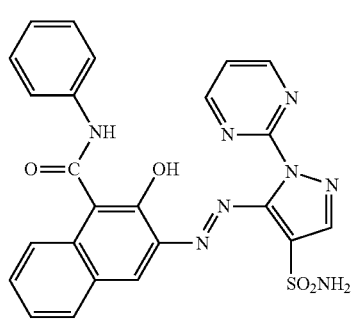
D-77
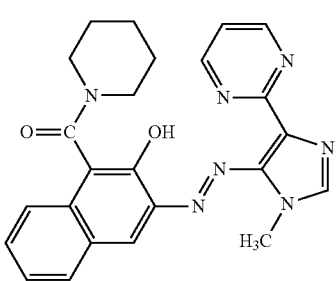

D-78
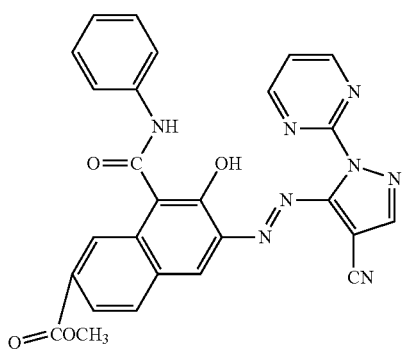
D-79
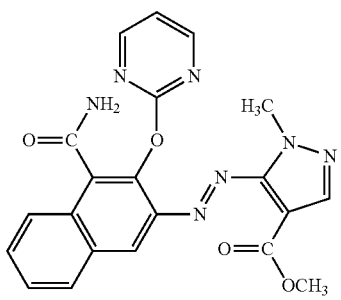
D-80
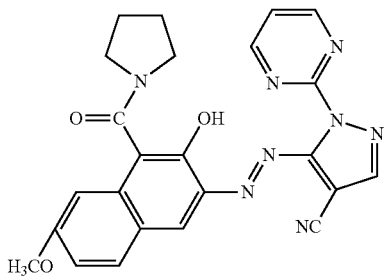
D-81
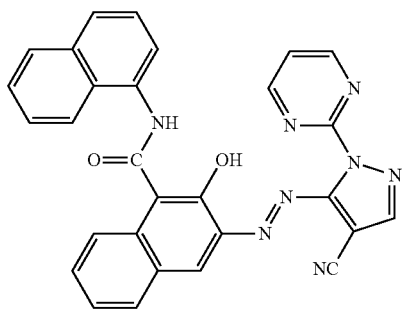
D-82
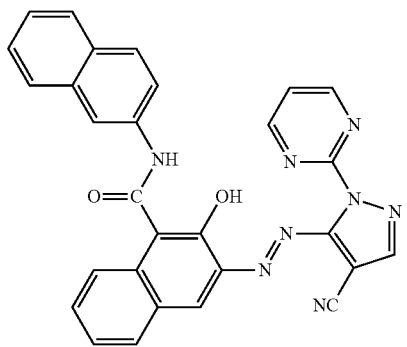
D-83
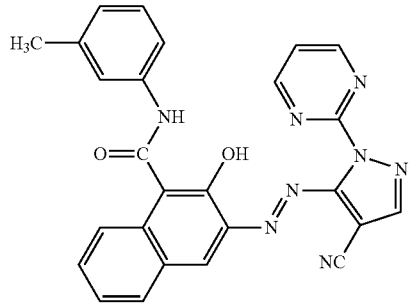
D-84
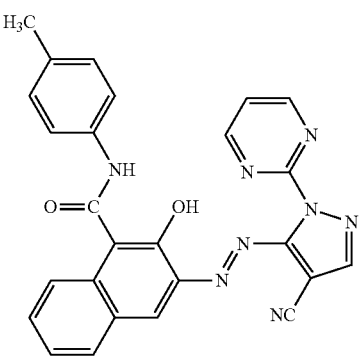
D-85
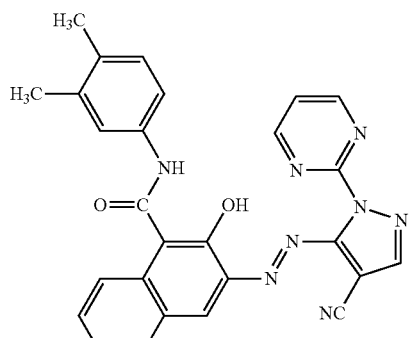
D-86
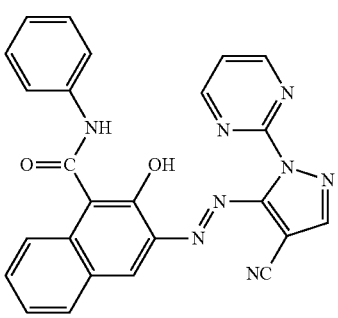
D-87
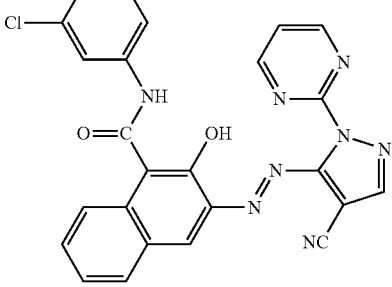

D-88
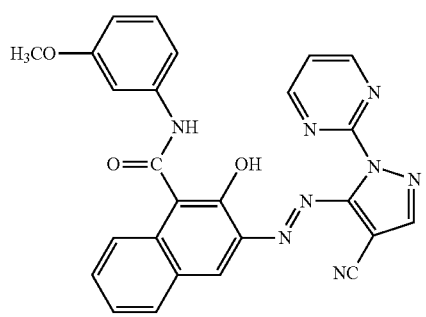
D-89
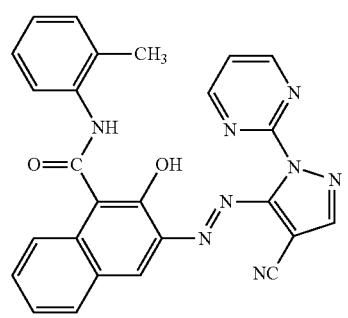
D-90
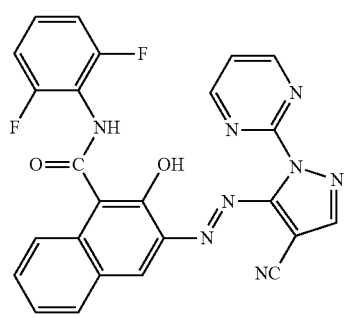
D-91
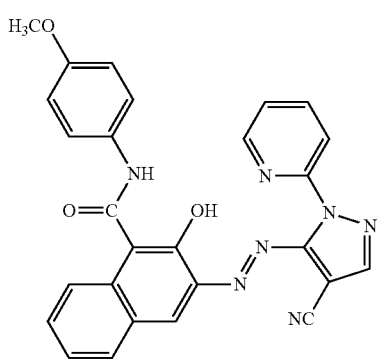
D-92
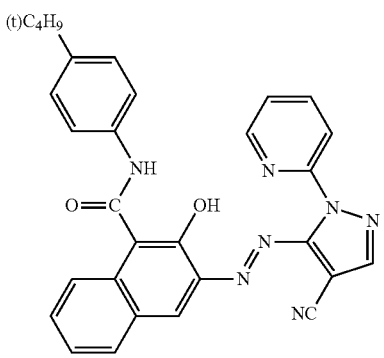
D-93
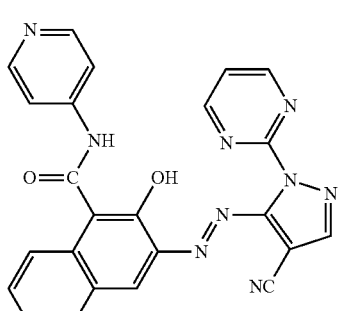
D-94
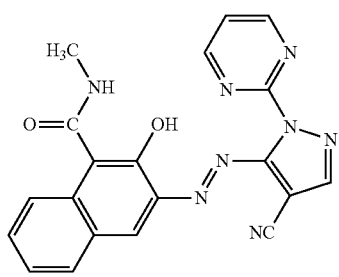
D-95
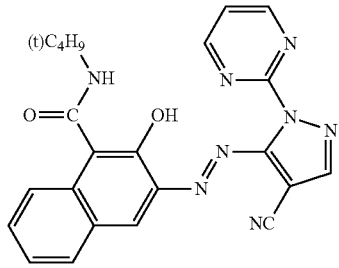
D-96
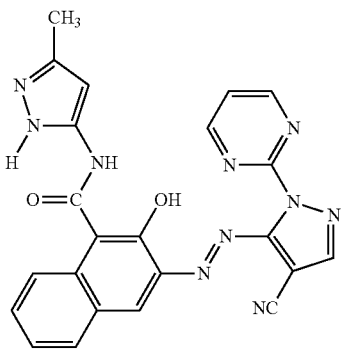
D-97
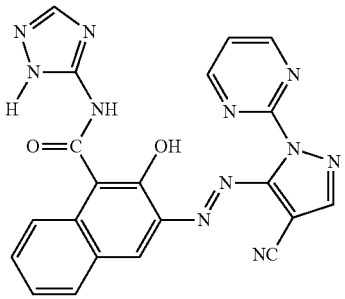

-continued
D-98
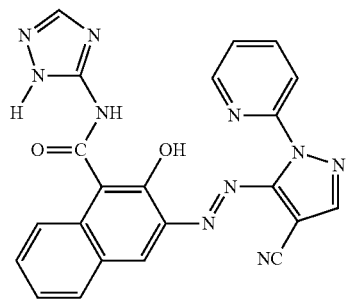
D-98
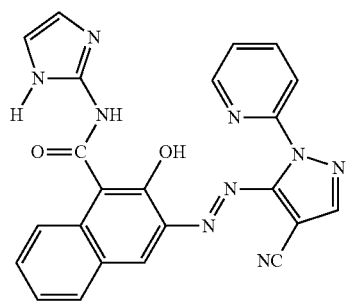
D-99
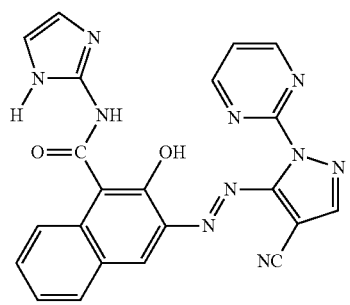
D-100
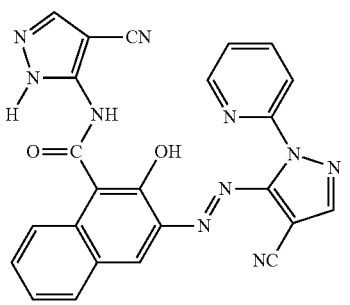
D-101
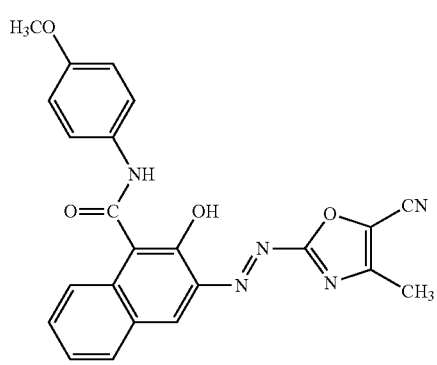
-continued
D-102
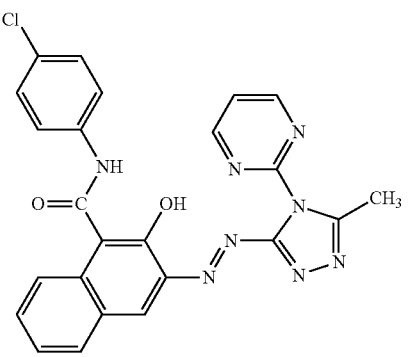
D-103
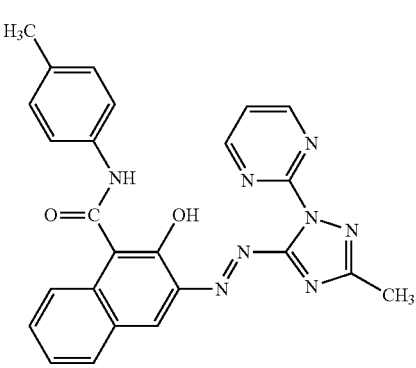
D-104
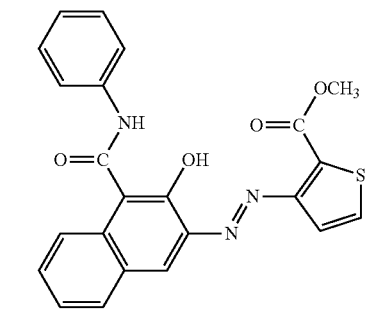
D-105
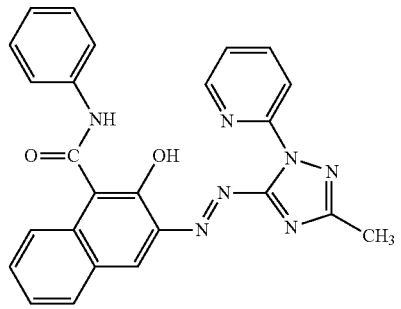

-continued
D-106
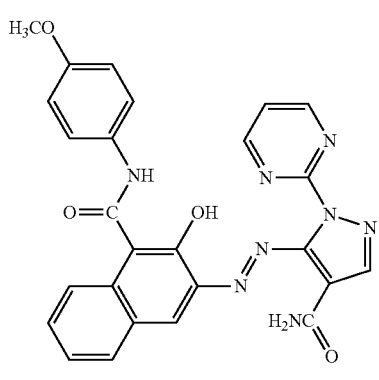
D-107
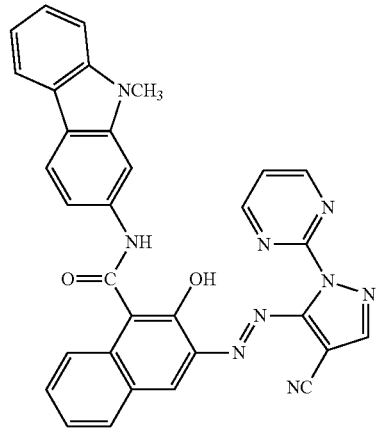
D-108
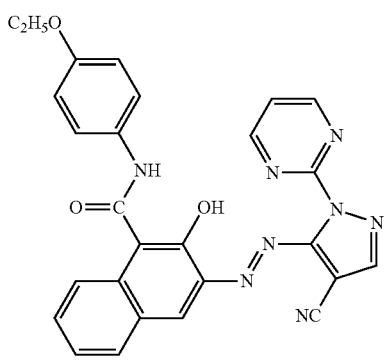
D-109
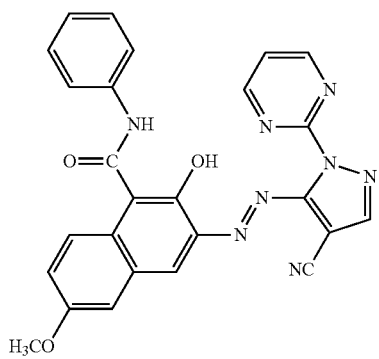
-continued
D-110
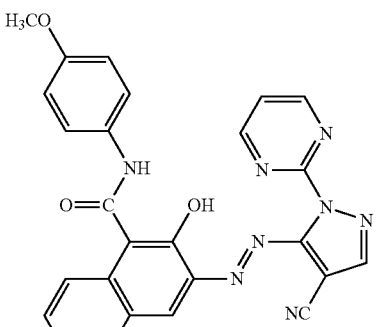
D-151
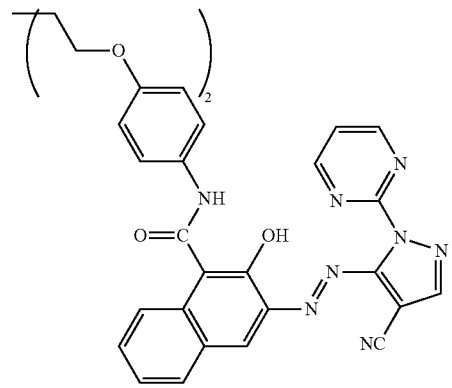
D-152
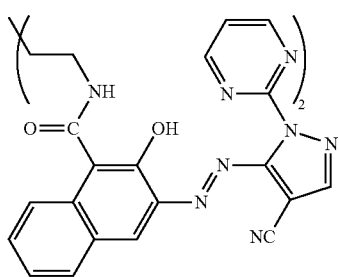
D-153
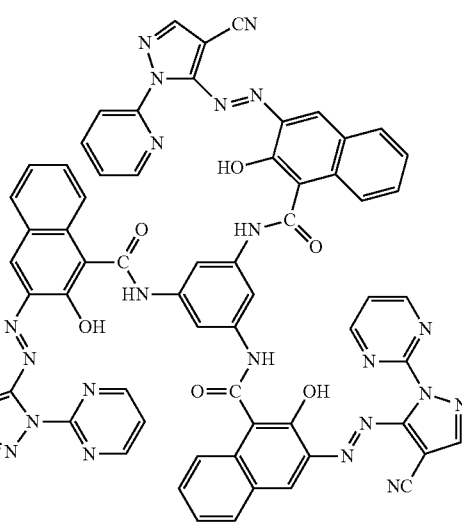

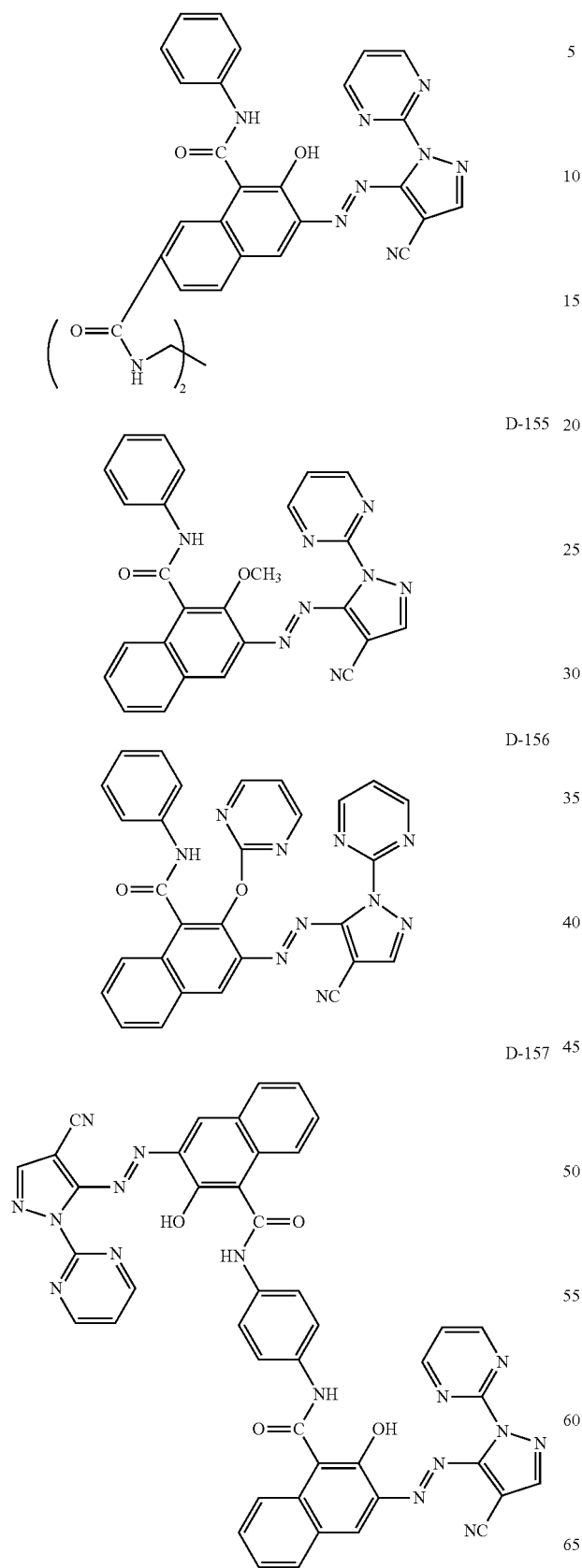
D-154
D-155
D-156
D-157
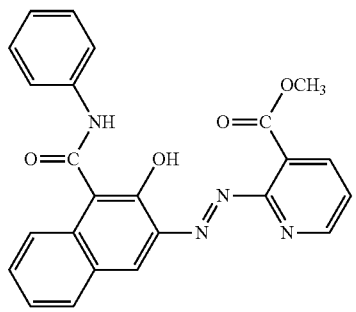
D-201
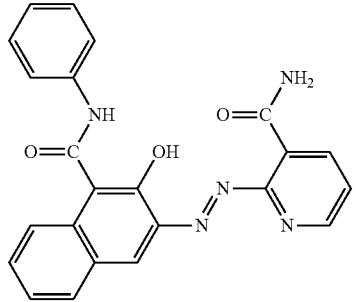
D-202
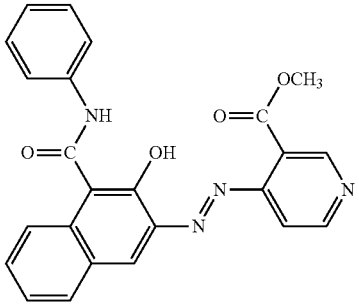
D-203
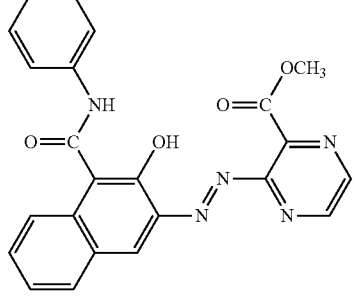
D-204
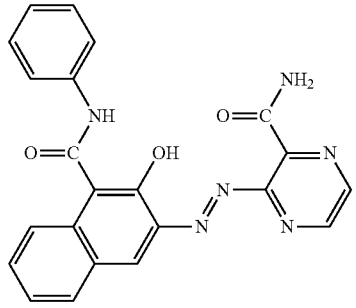
D-205

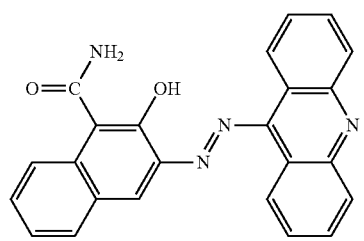 D-206
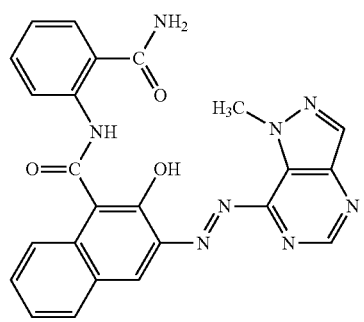 D-207
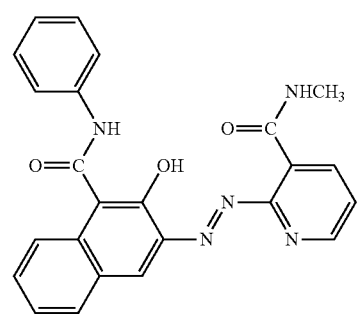 D-208
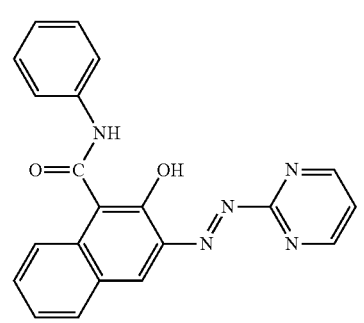 D-209
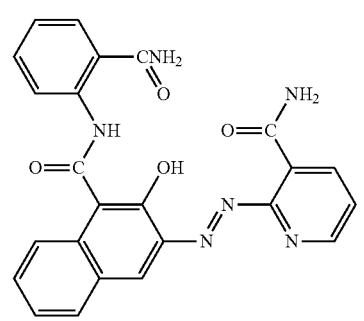 D-210
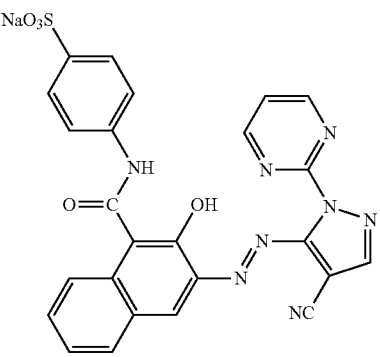 D-301
D-302
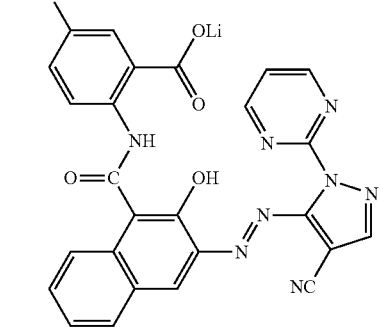 D-303
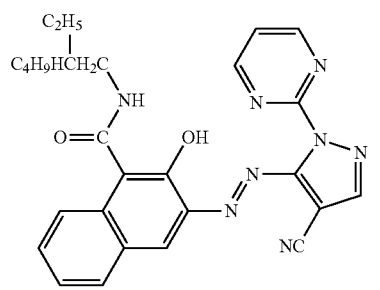 D-304

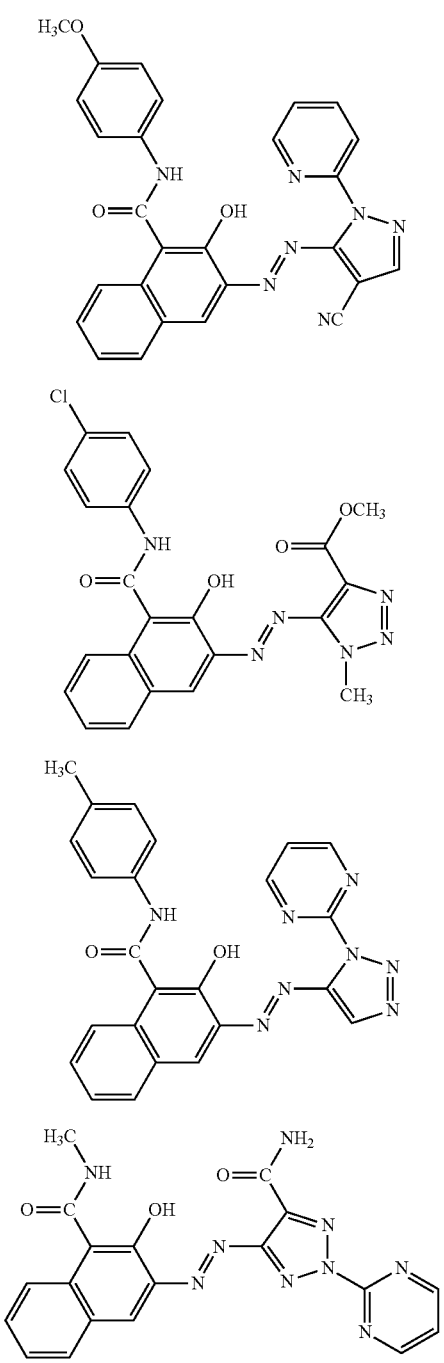

D-111
D-112
D-113
D-114

The pigments of the invention represented by the general formula (1), the general formula (2), and the general formula (3) may have a chemical structure represented by the general formula (1), the general formula (2), and the general formula (3) or may be the tautomers thereof, and may be of any crystal form called polymorphic form.

Polymorphism means that crystals having the same chemical composition can be different from each other in the conformation of building block (molecules or ions) in the crystal. Chemical and physical properties of the pigments are decided by the crystal structure, and polymorphic forms of the same pigment can be discriminated from each other by rheology, color, and other color characteristics. Also, different polymorphic forms can be confirmed by X-Ray Diffraction (results of powder X-ray diffractiometry) or by X-Ray Analysis (results of X-ray analysis of crystal structure).

In the case where the pigments of the invention represented by the general formula (1) exhibit polymorphism, they may be in any polymorphic forms and may be a mixture of two or more polymorphic forms. However, pigments wherein a single crystal form is predominant are preferred. That is, pigments not contaminated with polymorphic form crystals are preferred. The content of the azo pigment having a single crystal form is from 70% to 100%, preferably from 80% to 100%, more preferably from 90% to 100%, still more preferably from 95% to 100%, particularly preferably 100%, based on the entire azo pigment. When the azo pigment contains a single crystal form azo pigment as a major component, regularity of alignment of the pigment molecules is improved, and the intramolecular and intermolecular interaction is enhanced, thus a high-level three-dimensional network being easily formed. As a result, performances required for pigments, such as hue, light fastness, heat fastness, humidity fastness, fastness to an oxidative gas, and solvent resistance, are improved, thus the above-described content being preferred.

The mixing ratio of polymorphic forms in the azo pigment can be confirmed from values obtained by physicochemical measurement such as X-ray crystal structure analysis of single crystal, powder X-ray diffractiometry (XRD), microscopic photography of the crystals (TEM, SEM), or IR (KBr method).

Control of the above-described tautomerism and/or polymorphism may be achieved by controlling production conditions upon coupling reaction.

With those which have acid groups among the azo pigments of the invention represented by the general formula (1), the general formula (2), and the general formula (3) part or all of the acid groups may be in a salt form, or the pigment may be a mixture of a salt type pigment and a free acid type pigment. Examples of the salt type include salts of an alkali metal such as Na, Li, or K, salts of ammonium optionally substituted by an alkyl group or a hydroxyalkyl group, and salts of an organic amine. Examples of the organic amine include a lower alkyl amine, a hydroxyl-substituted lower alkyl amine, a carboxy-substituted lower alkyl amine, and a polyamine having from 2 to 10 alkyleneimine units containing from 2 to 4 carbon atoms. With these salt type pigments, they are not necessarily limited to one as to kind, but may be in a mixture of two or more thereof.

Further, as to the structure of the pigment to be used in the invention, in the case where plural acid groups exist in one molecule, the plural acid groups may be of a salt type or an acid type, and may be different from each other.

The azo pigments represented by the foregoing general formula (1), the general formula (2), and the general formula (3) may be hydrates which contain water molecules within the crystal.

Next, an example of processes for producing the azo pigments represented by the above general formula (1) will be described hereinafter. For example, the azo pigment of the invention represented by the general formula (6) can be produced by diazotizing a heterocyclic amine represented by the following general formula (4) under a non-aqueous, acidic condition, subjecting the resulting diazonium salt to coupling reaction with a compound represented by the following general formula (5) in an acidic state, and conducting conventional after-treatment. Azo pigments represented by the general formula (1) can be produced by conducting the similar procedures using a heterocyclic amine corresponding to A in the general formula (1) in place of the compound of the general formula (4).

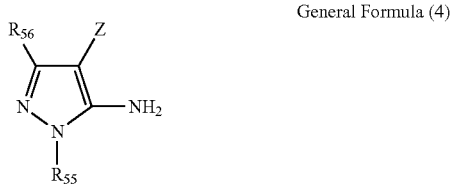

General Formula (4)

In the above formula, $R_{55}$, $R_{56}$, and Z are the same as those defined with respect to the foregoing general formula (3).

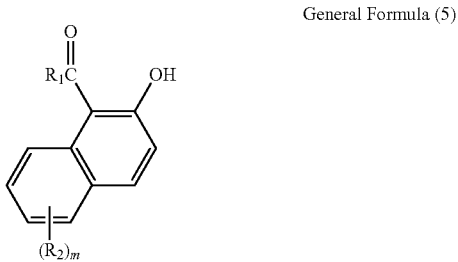

General Formula (5)

In the above formula, $R_1$, $R_2$, and m are the same as those defined with respect to the foregoing general formula (1).

The reaction scheme is shown below.

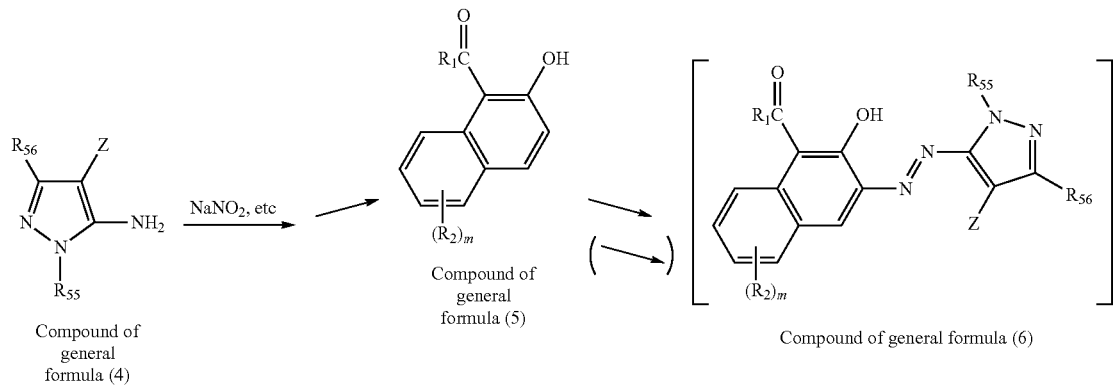

In the above formulae, $R_1$ to $R_2$, $R_{55}$, $R_{56}$, Z, m, and n are the same as those defined with respect to the foregoing general formula (1), the general formula (2), and the general formula (3).

Some of the heterocyclic amine represented by the amino compound of the above general formula (4), and (A-1) to (A-34) may be commercially available but, generally, the heterocyclic amines may be produced in a conventionally known manner by, for example, the process described in Japanese Patent No. 4,022,271. The heterocyclic coupler represented by the above general formula (5) is commercially available, or can be produced by, or according to, the processes described in JP-A-2008-13472. The diazotization reaction of the heterocyclic amine shown by the above-described reaction scheme can be conducted, for example, by reacting it with a reagent such as sodium nitrite, nitrosylsulfuric acid, or isoamyl nitrite in an acidic solvent such as sulfuric acid, phosphoric acid, or acetic acid at a temperature of 15° C. or less for about 10 minutes to about 6 hours. The coupling reaction is preferably conducted by reacting the diazonium salt obtained by the above-mentioned process with the compound represented by the above general formula (5) at 40° C. or less, preferably 25° C. or less, for about 10 minutes to about 12 hours.

Regarding synthesis of the azo pigments of the general formula (1), the general formula (2), and the general formula (3) wherein n is 2 or more, they can be synthesized in the same manner as in the aforesaid scheme by synthesizing a starting material wherein a substitutable divalent, trivalent, or tetravalent substituent is introduced into $R_1$ to $R_2$, $R_{55}$, $R_{56}$, $R_{58}$, and the like in the general formula (4) or the general formula (5).

The reaction product may form precipitated crystals but, in general, water or an alcoholic solvent is added to the reaction solution to thereby precipitate crystals, and the precipitated crystals can be collected by filtration. Also, an alcoholic solvent and water may be added to the reaction solution to thereby precipitate crystals, and the precipitated crystals can be collected by filtration. The crystals thus collected by filtration are washed and dried, as needed, to obtain the azo pigment represented by the general formula (1).

The compounds represented by the general formula (1), the general formula (2), and the general formula (3) are obtained as a crude azo pigment by the above-described production process. In the case of using them as the pigment dispersion of the invention, they are preferably subjected to after-treatment. As methods of the after-treatment, there are illustrated, for example, a pigment particle-controlling step such as milling treatment (e.g., solvent-salt milling, salt milling, dry milling, solvent milling or acid pasting) or solvent heating treatment; and a surface-treating step using, for example, a resin, a surfactant or a dispersing agent.

The compounds of the invention represented by the general formula (1), the general formula (2), and the general formula (3) are preferably subjected to the solvent heating treatment as the after-treatment. As a solvent to be used in the solvent heating treatment, there are illustrated, for example, water; aromatic hydrocarbon series solvents such as toluene and xylene; halogenated hydrocarbon series solvents such as chloroform, chlorobenzene, and o-dichlorobenzene; alcoholic solvents such as methanol, ethanol, isopropanol, and isobutanol; polar aprotic organic solvents such as acetone, N,N-dimethylformamide, N,N-dimethylacetamide, and N-methyl-2-pyrrolidone; glacial acetic acid; pyridine; and a mixture thereof. An inorganic or organic acid or base may further be added to the above-described solvents. The temperature of the solvent heating treatment varies depending upon the desired primary particle size of the pigment, but is preferably from 40 to 150° C., more preferably from 60 to 100° C.

The treating time is preferably from 30 minutes to 24 hours. As the solvent-salt milling, there is illustrated, for example, the procedure wherein a crude azo pigment, an inorganic salt, and an organic solvent which does not dissolve them are placed in a kneader, and knead-milling of the mixture is conducted therein. As the inorganic salt, water-soluble inorganic salts can preferably be used. For example, inorganic salts such as sodium chloride, potassium chloride, and sodium sulfate are preferably used. Also, it is more preferred to use inorganic salts having an average particle size of from 0.5 to 50 µM. The amount of the inorganic salt to be used is preferably a 3- to 20-fold amount by weight, more preferably a 5- to 15-fold amount by weight, based on the crude pigment. As the organic solvent, water-soluble organic solvents can preferably be used and, since the solvent becomes easily vaporizable due to an increase in temperature upon kneading, high-boiling solvents are preferred in view of safety. Examples of such organic solvents include diethylene glycol, glycerin, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, and a mixture thereof. The amount of the water-soluble organic solvent to be used is preferably a 0.1- to 5-fold amount based on the crude azo pigment. The kneading temperature is preferably from 20 to 130° C., particularly preferably from 40 to 110° C. As a kneader, there can be used, for example, a kneader and a mix muller.

[Pigment Dispersion]

The pigment dispersion of the invention is characterized in that it contains at least one of the azo pigments represented by the general formula (1), the general formula (2), and the general formula (3) the tautomers of the azo pigments, and the salts or hydrates thereof. Thus, there can be obtained a pigment dispersion having excellent coloring characteristics, durability, and dispersion stability.

The pigment dispersion of the invention may be aqueous or non-aqueous, but is preferably an aqueous pigment dispersion. As the aqueous liquid for dispersing the pigment in the aqueous pigment dispersion of the invention, a mixture containing water as a major component and, as needed, a hydrophilic organic solvent can be used.

Examples of the hydrophilic organic solvent include alcohols such as methanol, ethanol, propanol, isopropanol, butanol, isobutanol, sec-butanol, t-butanol, pentanol, hexanol, cyclohexanol, and benzyl alcohol; polyhydric alcohols such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol; glycol derivatives such as ethylene glycol monomethyl ether, ethylene glycol monoehyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, and ethylene glycol monophenyl ether; amines such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine; formamide; N,N-dimethylformamide; N,N-dimethylacetamide; dimethylsulfoxide; sulfolane; 2-pyrrolidone; N-methyl-2-pyrrolidone; N-vinyl-2-pyrolidone; 2-oxazolidone; 1,3-dimethyl-2-imidazolidinone; acetonitrile; and acetone.

Further, the aqueous pigment dispersion of the invention may contain an aqueous resin. As the aqueous resin, there are illustrated water-soluble resins which dissolve in water, water-dispersible resins which can be dispersed in water, colloidal dispersion resins, and a mixture thereof. Specific examples of the aqueous resins include acryl series resins, styrene-acryl series resins, polyester resins, polyamide resins, polyurethane resins, and fluorine-containing resins.

In the case where the aqueous pigment dispersion in the invention contains the aqueous resin, the content is not particularly limited. For example, the content may be from 0 to 100% by weight based on the weight of the pigment.

Further, in order to improve dispersibility of the pigment and quality of image, a surfactant and a dispersing agent may be used. As the surfactant, there are illustrated anionic, nonionic, cationic, and amphoteric surfactants, and any of them may be used. However, anionic or nonionic surfactants are preferred to use.

In the case where the aqueous pigment dispersion in the invention contains the surfactant, the content is not particularly limited. For example, the content may be from 0 to 100% by weight based on the weight of the pigment.

Examples of the anionic surfactants include aliphatic acid salts, alkyl sulfate salts, alkylbenzene sulfonate salts, alkylnaphthalene sulfonate salts, dialkyl sulfosuccinate salts, alkyldiaryl ether disulfonate salts, alkyl phosphate salts, polyoxyethylene alkyl ether sulfate salts, polyoxyethylene alkylaryl ether sulfate salts, naphthalenesulfonic acid-formalin condensates, polyoxyethylene alkyl phosphate salts, glycerol borate fatty acid esters, and polyoxyethylene glycerol fatty acid esters.

Examples of the nonionic surfactants include polyoxyethylene alkyl ethers, polyoxyethylene alkylaryl ethers, polyoxyethylene-oxypropylene block copolymers, sorbitan fatty acid esters, polyoxyethylene sorbitan fatty acid esters, polyoxyethylene sorbitol fatty acid esters, glycerin fatty acid esters, polyoxyethylene fatty acid esters, polyoxyethylene alkylamines, fluorine-containing surfactants, and silicon-containing surfactants.

The non-aqueous pigment dispersion of the invention comprises the pigment represented by the general formula (1), the general formula (2), and the general formula (3) dispersed in a non-aqueous vehicle. Examples of resin to be used as the non-aqueous vehicle include petroleum resin, casein, shellac, rosin-modified maleic acid resin, rosin-modified phenol resin, nitrocellulose, cellulose acetate butyrate, cyclized rubber, chlorinated rubber, oxidized rubber, rubber hydrochloride, phenol resin, alkyd resin, polyester resin, unsaturated polyester resin, amino resin, epoxy resin, vinyl resin, vinyl chloride, vinyl chloride-vinyl acetate copolymer, acryl resin, methacryl resin, polyurethane resin, silicone resin, fluorine-containing resin, drying oil, synthetic drying oil, styrene/maleic acid resin, styrene/acryl resin, polyamide resin, polyimide resin, benzoguanamine resin, melamine resin, urea resin, chlorinated polypropylene, butyral resin, and vinylidene chloride resin. It is also possible to use a photocurable resin as the non-aqueous vehicle.

Examples of the solvents to be used in the non-aqueous vehicles include aromatic solvents such as toluene, xylene, and methoxybenzene; acetate series solvents such as ethyl acetate, butyl acetate, propylene glycol monomethyl ether acetate, and propylene glycol monoethyl ether acetate; propionate series solvents such as ethoxyethyl propionate; alcoholic solvents such as methanol and ethanol; ether series solvents such as butyl cellosolve, propylene glycol monomethyl ether, diethylene glycol ethyl ether, and diethylene glycol dimethyl ether; ketone series solvents such as methyl ethyl ketone, methyl isobutyl ketone, and cyclohexanone; aliphatic hydrocarbon series solvents such as hexane; nitrogen-containing compound series solvents such as N,N-dimethylformamide, γ-butyrolactam, N-methyl-2-pyrrolidone, aniline, and pyridine; lactone series solvents such as γ-butyrolactone; and carbamic acid esters such as a 48:52 mixture of methyl carbamate and ethyl carbamate.

[Coloring Composition]

The coloring composition of the invention means a coloring composition containing at least one kind of the azo pigments or azo compounds of the invention. The coloring composition of the invention can contain a medium and, in the case where a solvent is used as the medium, the composition is particularly appropriate as an ink composition for inkjet recording. The coloring composition of the invention can be prepared by using an oleophilic medium or an aqueous medium as the medium and dispersing the azo pigment of the invention in the medium. Preferably, the aqueous medium is used. The coloring composition of the invention includes an ink composition excluding the medium. The coloring composition of the invention may contain, as needed, other additives within the range of not spoiling the advantages of the invention. Examples of the other additives include known additives (described in JP-A-2003-306623) such as a drying-preventing agent (a wetting agent), an antifading agent, an emulsion stabilizer, a penetration accelerator, an ultraviolet ray absorbent, an antiseptic, an antifungal agent, a pH-adjusting agent, a surface tension-adjusting agent, an anti-foaming agent, a viscosity-adjusting agent, a dispersing agent, a dispersion stabilizer, a rust inhibitor, and a chelating agent. In the case of aqueous ink compositions, these various additives are added directly to the ink solution. In the case of oil based ink compositions, it is general to add to a dispersion after preparing the azo pigment dispersion, but they may be added to an oil phase or an aqueous phase upon preparation.

[Ink for Inkjet Recording]

Next, the ink of the invention for inkjet recording will be described below. The ink of the invention for inkjet recording (hereinafter also referred to as "ink") contains the pigment dispersion described above, and is preferably prepared by mixing with a water-soluble solvent or water. However, in the case where no particular problems are involved, the pigment dispersion of the invention described above may be used as such.

In view of hue, color density, once again, and transparency of an image formed on a recording medium, the content of the pigment dispersion in the ink of the invention is in the range of preferably from 1 to 100% by weight, particularly preferably from 3 to 20% by weight, most preferably from 3 to 10% by weight.

The azo pigment or azo compound of the invention is contained in an amount of from 0.1 part by weight to 20 parts by weight, more preferably from 0.2 part by weight to 10 parts by weight, still more preferably from 1 to 10 parts by weight, in 100 parts by weight of the ink composition of the invention. The ink of the invention may further contain other pigment in combination with the pigment of the invention. In the case of using two or more kinds of pigments, the total amount of the pigments is preferably within the above-described range.

The ink composition of the invention can be used for forming a full-color image as well as a mono-color image. In order to form the full-color image, a magenta tone ink, a cyan tone ink, and a yellow tone ink can be used and, further, a black tone ink can be used for adjusting tone.

Further, in the ink of the invention may be used other pigments in addition to the azo pigment of the invention. As yellow pigments to be applied, there are illustrated, for example, C.I.P.Y.74, C.I.P.Y.128, C.I.P.Y.155, and C.I.P.Y.213. As magenta pigments to be applied, there are illustrated C.I.P.V.19 and C.I.P.R122. As cyan pigments to be applied, there are illustrated C.I.P.B.15:3 and C.I.P.B.15:4. Apart from these pigments, any pigment may be used as each pigment. As a black color material, there can be illustrated a dispersion of carbon black as well as disazo, trisazo, and tetrazo pigments.

As the water-soluble solvents to be used in the ink of the invention, polyhydric alcohols, polyhydric alcohol derivatives, nitrogen-containing solvents, alcohols, and sulfur-containing solvents are used.

Specific examples of the polyhydric alcohols include ethylene glycol, diethylene glycol, propylene glycol, butylenes glycol, triethylene glycol, 1,5-pentanediol, 1,2,6-hexanetriol, and glycerin.

Examples of the polyhydric alcohol derivatives include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and an ethylene oxide adduct of diglycerin.

Also, examples of the nitrogen-containing solvents include pyrrolidone, N-methyl-2-pyrrolidone, cyclohexylpyrrolidone, and triethanolamine, examples of the alcohols include ethanol, isopropyl alcohol, butyl alcohol, and benzyl alcohol, and examples of the sulfur-containing solvents include thiodiethanol, thiodiglycerol, sulfolane, and dimethylsulfoxide. Besides, propylene carbonate and ethylene carbonate may also be used.

The water-soluble solvents to be used in the invention may be used alone or as a mixture of two or more thereof. As to the content of the water-soluble solvent, the solvent is used in an amount of from 1% by weight to 60% by weight, preferably from 5% by weight to 40% by weight, based on the total weight of the ink. In case when the content of the water-soluble solvent in the entire ink is less than 1% by weight, there might result an insufficient optical density in some cases whereas, in case when the content exceeds 60% by weight, there might result unstable jet properties of the ink liquid in some cases due to the large viscosity of the liquid.

The preferred physical properties of the ink of the invention are as follows. The surface tension of the ink is preferably from 20 mN/m to 60 mN/m, more preferably from 20 mN/m to 45 mN/m, still more preferably from 25 mN/m to 35 mN/m. In case when the surface tension is less than 20 mN/m, the liquid might, in some cases, overflow onto the nozzle surface of the recording head, thus normal printing not being performed. On the other hand, in case when the surface tension exceeds 60 mN/m, the ink might, in some cases, slowly penetrate into the recording medium, thus the drying time becoming longer.

Additionally, the surface tension is measured under the environment of 23° C. and 55% RH by using a Wilhelmy surface tension balance as is the same described above.

The viscosity of the ink is preferably from 1.2 mPa·s to 8.0 mPa·s, more preferably from 1.5 mPa·s to 6.0 mPa·s, still more preferably from 1.8 mPa·s to 4.5 mPa·s. In case when the viscosity is more than 8.0 mPa·s, ink ejection properties might, in some cases, be deteriorated. On the other hand, in case when the viscosity is less than 1.2 mPa·s, the long-term ejection properties might be deteriorated in some cases. Additionally, the viscosity (including that to be described hereinafter) is measured by using a rotational viscometer Rheomat 115 (manufactured by Contraves Co.) at 23° C. and a shear rate of $1,400\ s^{-1}$.

In addition to the above-mentioned individual components, water is added to the ink within an amount of providing the preferred surface tension and viscosity described above. The addition amount of water is not particularly limited, but is in the range of preferably from 10% by weight to 99% by weight, more preferably from 30% by weight to 80% by weight, based on the total weight of the ink composition.

Further, for the purpose of controlling characteristic properties such as improvement of ejection properties, there can be used, as needed, polyethyleneimine, polyamines, polyvinylpyrrolidone, polyethylene glycol, cellulose derivatives such as ethyl cellulose and carboxymethyl cellulose, polysaccharides and derivatives thereof, water-soluble polymers, polymer emulsions such as an acrylic polymer emulsion, a polyurethane series emulsion, and a hydrophilic latex, hydrophilic polymer gels, cyclodextrin, macrocyclic amines, dendrimers, crown ethers, urea and derivatives thereof, acetamide, silicone surfactants, and fluorine-containing surfactants.

Also, in order to adjust electrical conductivity and pH, there can be used compounds of alkali metals such as potassium hydroxide, sodium hydroxide, and lithium hydroxide; nitrogen-containing compounds such as ammonium hydroxide, triethanolamine, diethanolamine, ethanolamine, and 2-amino-2-methyl-1-propanol; compounds of alkaline earth metals such as calcium hydroxide; acids such as sulfuric acid, hydrochloric acid, and nitric acid; and salts between a strong acid and a weak alkali, such as ammonium sulfate. Besides, pH buffers, antioxidants, antifungal agents, viscosity-adjusting agents, electrically conductive agents, and ultraviolet ray absorbents may also be added as needed.

[Coloring Composition for Color Filter]

The coloring composition of the invention can be used as a coloring composition for color filter.

The coloring composition of the invention for color filter contains an azo pigment represented by the foregoing general formula (1). The coloring composition of the invention for color filter (hereinafter also referred to merely as "coloring composition") means a coloring composition containing at least one azo pigment represented by the general formula (1).

The coloring composition of the invention preferably further contains a polymerizable compound and a solvent.

Also, in producing the coloring composition of the invention, the azo pigment obtained in the above-described manner may be blended as such or may be blended as a pigment dispersion wherein the pigment is dispersed in a solvent. The azo pigment exhibits excellent coloring characteristics, durability, dispersion stability, light fastness, and weatherability when in the form of a pigment dispersion, thus such pigment dispersion being preferred.

The amount of the azo pigment represented by the general formula (1) (in the case where other pigments are used in combination, the total amount of the pigments used) in the coloring composition of the invention is preferably from 0.01 to 2 parts by weight, particularly preferably from 0.1 to 1 part by weight, per 1 part by weight of a polymerizable compound.

[Polymerizable Compounds]

The polymerizable compound may properly be selected in consideration of the production process of a color filter and, as the polymerizable compound, there are illustrated photo-sensitive compounds and/or thermosetting compounds, with photo-sensitive compounds being particularly preferred.

The photo-sensitive compound is selected from at least one of photo-polymerizable resins, photo-polymerizable monomers, and photo-polymerizable oligomers, with those which have an ethylenically unsaturated bond being preferred. It suffices for the coloring composition for color filter to contain a material which becomes a resin in a cured state, and a composition containing only components which are not resinous in an uncured state is included.

As the photo-polymerizable compounds, photo-polymerizable monomers, and photo-polymerizable oligomers, there are illustrated, for example, (meth)acrylates such as 2-hydroxyethyl (meth)acrylate, 2-hydroxypropyl (meth)acrylate, 2-ethylhexyl (meth)acrylate, ethylene glycol di(meth)acrylate, diethylene glycol di(meth)acrylate, triethylene glycol di(meth)acrylate, polyethylene glycol di(meth)acrylate, pentaerythritol di(meth)acrylate, dipentaerythritol tetra(meth)acrylate, dipentaerythritol hexa(meth)acrylate, bisphenol A type epoxy di(meth)acrylate, bisphenol F type epoxy di(meth)acrylate, and bisphenol fluorene type epoxy di(meth)acrylate. Also, there are illustrated vinyl resins such as acrylic acid (co)polymers, (meth)acrylic acid (co)polymers, maleic acid (co)polymers, and resins having an ethylenic double bond in its side chain such as polyethylene oxide, polyvinylpyrrolidone, polyamide, polyurethane, polyether, polyester, etc. These may be used alone or in combination of two or more thereof. The content of the polymerizable compound is from 20 to 90% by weight, preferably from 40 to 80% by weight.

The blending ratio of the polymerizable compound is preferably from 40 to 95% by weight, more preferably from 50 to 90% by weight, based on the weight of all solid components in the composition for color filter. The composition may contain, as needed, other resins or the like. In such cases, the sum amount of the polymerizable resin and the other resins is preferably within the above-described range. Additionally, the term "all solid components" means those components which remain as solid components after drying and curing, with no solvents being contained and monomers being contained.

[Photo-Polymerization Initiators]

In the case of using a photo-sensitive compound as the photo-polymerizable compound, a photo-polymerization initiator is used together with a monomer and/or an oligomer of the photo-sensitive compound. As the photo-polymerization initiator, there are illustrated one or more members selected from among benzophenone derivatives, acetophenone derivatives, benzoin derivatives, benzoin ether derivatives, thioxanthone derivatives, anthraquinone derivatives, naphthoquinone derivatives, and triazine derivatives. Known photo-sensitizers may further be used together with these photo-polymerization initiators.

As the thermosetting resins, there are illustrated, for example, melamine resin, urea resin, alkyd resin, epoxy resin, phenol resin, cyclopentadiene resin, etc.

Additionally, in this specification and claims, the terms "photo-sensitive resins" and "thermosetting resins" mean not only cured resins but polymerizable monomers or oligomers as well.

Together with the above-described photo-sensitive resins and/or thermosetting resins, those other resins which are generally used in an ink, such as binder resins having an acid group, and acryl resins and urethane resins may be used.

[Solvent]

The pigment dispersion may be an aqueous system or a non-aqueous system, which depends on the production process of the color filter. For example, in a photo lithography process, a non-aqueous system is preferred and, in an inkjet process, either system may be employed.

As a solvent for the coloring composition of the invention, there are illustrated fatty acid esters such as ethyl acetate, butyl acetate, ethylene glycol monomethyl ether acetate, and propylene glycol monomethyl ether acetate; ketones such as acetone, methyl ethyl ketone, methyl isobutyl ketone, cyclohexanone, and diacetone alcohol; aromatic compounds such as benzene, toluene, and xylene; alcohols such as methanol, ethanol, n-propanol, isopropanol, and n-butanol; glycols such as ethylene glycol, diethylene glycol, triethylene glycol, tetraethylene glycol, polyethylene glycol, propylene glycol, dipropylene glycol, tripropylene glycol, polypropylene glycol, trimethylene glycol, and hexanetriol; glycerin; alkylene glycol monoalkyl ethers such as ethylene glycol monomethyl ether, ethylene glycol monoethyl ether, diethylene glycol monomethyl ether, diethylene glycol monoethyl ether, propylene glycol monomethyl ether, and propylene glycol monoethyl ether; alkylene glycol dialkyl ethers such as triethylene glycol dimethyl ether, triethylene glycol diethyl ether, tetraethylene glycol dimethyl ether, and tetraethylene glycol diethyl ether; ethers such as tetrahydrofuran, dioxane, and diethylene glycol diethyl ether; alkanolamines such as monoethanolamine, diethanolamine, and triethanolamine; nitrogen-containing polar organic solvents such as N,N-dimethylformamide, N,N-dimethylacetamide, N-methyl-2-pyrrolidone, 2-pyrrolidone, and 1,3-dimethyl-2-imidazolidinone; water; and the like.

Of these solvents, water-soluble solvents may be mixed with water to use as an aqueous medium. Also, two or more solvents selected from the above-described solvents excluding water may be mixed to use as an oily medium.

The azo pigments in the form of a pigment dispersion show excellent light fastness and weatherability in comparison with the azo pigments not in the form of a pigment dispersion.

Also, one or more of pigments selected from other pigments than the azo pigment represented by the general formula (1), such as azo series pigments, disazo series pigments, benzimidazolone series pigments, condensed azo series pigments, azo lake series pigments, anthraquinone series pigments, diketopyrrolopyrrole series pigments, quinacridone series pigments, isoindoline series pigments, isoindolinone series pigments, perinone series pigments, and perylene series pigments, or derivatives thereof may be used together with the azo pigments represented by the general formula (1) within the range of not inhibiting the objects of the invention.

Pigments which may be used together in the invention are not particularly limited. Specifically, there are illustrated compounds whose classification in Color index (C.I.; published by The Society of Dyers and Colourists) are pigments, that is, those which have the following color index (C.I.) number: yellow pigments such as C.I. pigment yellow 1, C.I. pigment yellow 3, C.I. pigment yellow 12, C.I. pigment yellow 13, C.I. pigment yellow 83, C.I. pigment yellow 138, C.I. pigment yellow 139, C.I. pigment yellow 150, C.I. pigment yellow 180, and C.I. pigment yellow 185; red pigments such as C.I. pigment red 1, C.I. pigment red 2, C.I. pigment red 3, C.I. pigment red 177, and C.I. pigment red 254; blue pigments such as C.I. pigment blue 15, C.I. pigment blue 15:3, C.I. pigment blue 15:4, and C.I. pigment blue 15:6; green pigments such as C.I. pigment green 7 and C.I. pigment green 36; and C.I. pigment violet 23 and C.I. pigment violet 23:19.

Also, as specific examples of the aforesaid inorganic pigment, there are illustrated titanium oxide, barium sulfate, calcium carbonate, zinc white, lead sulfate, yellow lead, zinc yellow, iron oxide red (red iron oxide (III)), cadmium red, ultramarine, deep blue, chromium oxide green, cobalt green, amber, titanium black, synthetic iron black, carbon black, etc. In the invention, these pigments may be used alone or as a mixture of two or more kinds thereof.

In the case of using other pigments than the azo pigments represented by the general formula (1) together therewith, the content thereof is preferably 50% by weight or less, particularly preferably 20% by weight or less, based on the weight of the total pigments in the coloring composition.

Additionally, in this specification, the term "azo pigment represented by the general formula (1)" is used to mean not only one kind of azo pigment represented by the general formula (1) but also a combination of two or more of azo pigments represented by the general formula (1) and a combination of an azo pigment represented by the general formula (1) and other pigment.

[Pigment Dispersion (2)]

The pigment dispersion is preferably obtained by dispersing the above-described azo pigment and the aqueous or non-aqueous medium using a dispersing apparatus. As the dispersing apparatus, there can be used a simple stirrer, an impeller-stirring system, an in-line stirring system, a mill system (for example, colloid mill, ball mill, sand mill, beads mill, attritor, roll mill, jet mill, paint shaker, or agitator mill), an ultrasonic wave system, a high-pressure emulsion dispersion system (high-pressure homogenizer; specific commercially available apparatuses being Gaulin homogenizer, a microfluidizer, and DeBEE2000).

In the invention, the volume-average particle diameter of the pigment is preferably from 10 nm to 250 nm. Additionally, the term "volume-average particle diameter of the pigment" means the particle diameter of the pigment itself or, in the case where an additive such as a dispersant is adhered to the pigment particles, means the diameter of the particle with the additive being adhered thereto. In the invention, as an apparatus for measuring the volume-average particle diameter of the pigment, a particle size analyzer of Nanotrac UPA (UPA-EX150; manufactured by Nikkiso Co., Ltd.) is used. The measurement is conducted according to a predetermined measuring method placing 3 ml of a pigment dispersion in a measuring cell. Additionally, with respect to parameters to be inputted upon measurement, an ink viscosity is used as a viscosity, and a pigment density is used as a density of the dispersed particles.

The volume-average particle diameter of the pigment is more preferably from 20 nm to 250 nm, still more preferably from 30 nm to 230 nm. In case when the volume-average particle diameter of the particles in the pigment dispersion is less than 20 nm, storage stability might not be ensured in some cases whereas, in case when the volume-average particle diameter of the particles in the pigment dispersion exceeds 250 nm, the optical density might be reduced in some cases.

The content of the pigment contained in the pigment dispersion of the invention is preferably in the range of from 1 to 35% by weight, more preferably in the range of from 2 to 25% by weight. In case when the content is less than 1% by weight, a sufficient image density might not be obtained in some cases when the pigment dispersion is used independently as an ink. In case when the content exceeds 35% by weight, there might result reduced dispersion stability.

The pigment dispersion of the invention is obtained by dispersing the above-described azo pigment and the aqueous or non-aqueous medium using a dispersing apparatus. As the dispersing apparatus, there can be used a simple stirrer, an impeller-stirring system, an in-line stirring system, a mill system (for example, colloid mill, ball mill, sand mill, beads mill, attritor, roll mill, jet mill, paint shaker, or agitator mill), an ultrasonic wave system, a high-pressure emulsion dispersion system (high-pressure homogenizer; specific commercially available apparatuses being Gaulin homogenizer, a microfluidizer, and DeBEE2000).

Regarding uses of the azo pigments of the invention, there are illustrated image recording materials for forming images, particularly color images. Specifically, there are illustrated recording materials for an ink jet system to be described in detail hereinafter, thermally sensitive recording materials, pressure-sensitive recording materials, recording materials for an electro-photographic system, transfer type silver halide light-sensitive materials, printing inks, and recording pens, preferably recording materials for an ink jet system, thermally sensitive recording materials, and recording materials for an electro-photographic system, more preferably recording materials for an ink jet system.

Also, the pigments of the invention can be applied to color filters to be used in solid state imaging devices such as CCDs and in displays such as LCDs and PDPs for recording and reproducing color images, and to dyeing solutions for dyeing various fibers.

Physical properties such as solvent resistance, dispersibility, and heat transfer properties of the azo pigments of the invention are adjusted through the substituents thereof according to the use. Also, the azo pigments of the invention can be used in an emulsion dispersion state or in a solid dispersion state according to the system in which they are used.

Also, in order to well disperse the component in a short time, a dispersant may be contained in the composition.

The coloring composition in the invention for color filter preferably further contains one or more dispersants selected from among surfactants, silicone series additives, pigment series additives, silane series coupling agents, and titanium series coupling agents. These dispersants may be used in combination of two or more thereof.

Specific examples of the aforesaid dispersants will be described below.

The surfactants are not particularly limited as long as they have surface-active action, and there can be illustrated cationic, anionic, nonionic, and amphoteric surfactants, etc. Specific examples include anionic surfactants such as alkane sulfonate salts, straight chain alkylbenzene sulfonate salts, branched alkylbenzene sulfonate salts, alkylnaphthalene sulfonate salts, naphthalenesulfonic acid salt-formaldehyde condensates, alkylsulfate salts, polyoxyethylene alkyl ether sulfate salts, alkyl phosphate salts, polyoxyethylene alkyl ether phosphate salts, and aliphatic monocarbooxylic acid salts; cationic surfactants such as alkylamine salts and quaternary amine salts; nonionic surfactants such as glycerin fatty acid esters, sorbitan fatty acid esters, polyoxyethylene alkyl ethers, polyoxyethylene alkylphenyl ethers, polyethylene glycol fatty acid esters, and polyoxyethylene sorbitan fatty acid esters; amphoteric surfactants such as alkylbetaines; and cationic, anionic, nonionic, and amphoteric high-molecular surfactants.

Specific examples of the silicone series additives include polyalkylsiloxanes, polyalkylphenylsiloxanes, polyorganosiloxanes, polydimethylsiloxane, polyorganosiloxane polyether copolymers, polyfluorosiloxanes, and organosiloxanes. These silicone series additives may be used in combination of two or more thereof.

The pigment series additives are pigment derivatives wherein a substituent such as a basic group, an acidic group, a straight chain alkyl group, a branched alkyl group, or a polyoxyethylene group is introduced to the pigment structure. As preferred pigment structures, there are illustrated monoazo series pigments, disazo series pigments, benzimidazolone series pigments, condensed azo series pigments, azo lake series pigments, anthraquinone series pigments, diketopyrrolopyrrole series pigments, quinacridone series pigments, isoindoline series pigments, isoindolinone series pigments, perinone series pigments, and perylene series pigments.

Of these pigment series additives, those wherein the above-described substituent is introduced to the azo series pigment structure have good affinity for the azo compounds represented by the general formula (1), thus being preferred.

As specific examples of the silane coupling agents, there are illustrated vinyltrimethoxysilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-glycidoxypropylmethyldiethoxysilane, γ-aminopropyltriethoxysilane, N-phenyl-γ-aminopropyltrimethoxysilane, γ-methacryloxypropyltrimethoxysilane, vinyltriacetoxysilane, methyltrimethoxysilane, dimethyldimethoxysilane, phenyltrimethoxysilane, diphenyldimethoxysilane, methyltriethoxysilane, dimethyldiethoxysilane, phenyltriethoxysilane, diphenyldiethoxysilane, n-butyltrimethoxysilane, isobutyltrimethoxysilane, trimethylmethoxysilane, hydroxypropyltrimethoxysilane, n-hexadecyltrimethoxysilane, and n-octadecyltrimethoxysilane.

As specific examples of the titanium series coupling agents, there are illustrated isopropyltri(N-aminoethylaminoethyl)titanate and dibutoxybistriethanolamine titanate.

The amount of the above-described dispersant to be used is preferably from 0.1 to 100 parts by weight, particularly preferably from 0.5 to 80 parts by weight, per 100 parts by weight of the azo compound represented by the general formula (1), though depending upon kind of the dispersant to be used.

Methods of using the dispersant are not particularly limited, and may be used according to the known methods for preparing a coloring composition for photolithography process.

The invention relates to a process of preparing a coloring composition for color filter as well. The process of preparing a coloring composition for color filter includes a step of obtaining a pigment dispersion by dispersing one or more dispersants selected from among the surfactants, silicone series additives, pigment series additives, silane series coupling agents, and titanium series coupling agents, and an azo compound represented by the general formula (1) in part of a solvent, and a step of mixing the pigment dispersion with a polymerizable compound and the rest of the solvent. As a process of preparing a coloring composition for color filter, it is preferred to employ the process of the invention.

[Color Filter]

The invention further provides a color filter formed by using the above-described coloring composition for color filter. The color filter shows a high contrast and good light transmittance. Specifically, it shows light transmittance of preferably 85% or more, more preferably 90% or more, at a wavelength of 650 nm.

For producing the color filter of the invention, any known process may be employed, and there are preferably illustrated a photolithography process and an inkjet process. The photolithography process and the inkjet process will be described in detail below.

1) Photolithography Method

In the case of forming a color filter according to photolithography method, a photo-sensitive resin is used as a polymerizable compound in the coloring composition of the invention for color filter. The photo-sensitive resin is contained in the coloring composition as a monomer and/or an oligomer together with a photo-polymerization initiator, and is cured by irradiation with light to form a film on a transparent substrate.

As the photo-sensitive resin, a polymer or copolymer of the aforesaid polymerizable monomer having one or more ethylenic double bond within the molecule is preferably used.

As these photo-sensitive resins (polymerizable monomers), acrylates and methacrylates are particularly preferred and, specifically, there are illustrated methyl acrylate, methyl methacrylate, butyl methacrylate, butyl acrylate, pentaerythritol tetraacrylate, pentaaerythritol tetramethacrylate, pentaerythritol triacrylate, pentaerythritol trimethacrylate, dipentaerythritol hexaacrylate, dipentaerythritol hexamethacrylate, dipentaerythritol pentaacrylate, dipentaerythritol pentamethacrylate, glycerol diacrylate, glycerol dimethacrylate, 1,4-butanediol diacrylate, 1,4-butanediol dimethacrylate, bisphenol A diacrylate, and bisphenol A dimethacrylate.

In the case of using the photolithography method, a binder resin having an acidic group is used in the coloring composition of the invention in addition to the aforesaid photo-sensitive resin. As the binder resin having an acidic group, there are illustrated resins having a carboxyl group, a hydroxyl group, a sulfonic acid group, or the like, with binder resins having a carboxyl group and/or a hydroxyl group being preferred.

As the above-described binder resins having an acidic group, there are preferably used copolymers between a monomer having an ethylenic double bond, such as those which are selected from acrylates, methacrylates, styrene, vinyl acetate, vinyl chloride, N-vinylpyrrolidone, and acrylamide, and a monomer having an acidic group and an ethylenic double bond, such as those which are selected from acrylic acid, methacrylic acid, p-styrenecarboxylic acid, p-styrenesulfonic acid, p-hydroxystyrene, and maleic anhydride.

The binder resin having an acidic group is used in an amount of preferably from 0.5 to 4 parts by weight, particularly preferably from 1 to 3 parts by weight, per 1 part by weight of the photo-sensitive resin (polymerizable monomer).

As a solvent to be used in the coloring composition for the photolithography method, there are illustrated one or more oily media selected from fatty acid esters, ketones, aromatic compounds, alcohols, glycols, glycerin, alkylene glycol monoalkyl ethers, alkylene glycol dialkyl ethers, ethers, and nitrogen-containing polar organic solvents.

The amount of these solvents to be used is preferably a 3- to 30-fold amount, particularly preferably a 4- to 15-fold amount, based on the whole weight of components other than the solvent in the coloring composition.

Also, the coloring composition in the invention for use in the photolithography method may contain, as needed, known additives in addition to the aforesaid components, such as a wetting agent, an antifading agent, an emulsion stabilizer, an ultraviolet ray absorbent, an antiseptic, an antifungal agent, a pH-adjusting agent, a surface tension-adjusting agent, an anti-foaming agent, a viscosity-adjusting agent, a dispersion stabilizer, a rust inhibitor, and a chelating agent (described in JP-A-2003-306623). These various additives may be added to the oil phase or the aqueous phase upon preparation.

The coloring composition of the invention for color filter can be prepared by the process including a step of uniformly dispersing and dispersing the azo compound represented by the general formula (1), the polymerizable compound, a solvent, and other various additives using an apparatus such as a beads mill, a ball mill, a sand mill, a two-roll mill, a three-roll mill, a homogenizer, a kneader, or a vibration dispersing apparatus; and a step of adjusting the viscosity using the aforesaid solvent or the like.

As a method for forming a color filter on a display substrate by using the coloring composition of the invention for color filter, a known photolithography method may be employed. For example, a color filter is obtained by a process including a step of uniformly coating the coloring composition of the invention on a display substrate according to a known method such as a spraying method, a bar-coating method, a roll-coating method, or a spin-coating method; a step of removing the solvent in the ink by heating; a step of exposing a color filter pattern on the display substrate using a high-pressure mercury lamp or the like; an alkali-developing step; a washing step; and a baking step.

As a developing solution for use in the process of producing a color filter of the invention, any one can be employed that dissolves the composition of the invention but does not dissolve the radiation-irradiated portion. Specifically, a combination of various organic solvents or an alkaline aqueous solution can be used.

As the organic solvent, there are illustrated those which have been described hereinbefore and are to be used upon preparation of the composition of the invention.

As the alkaline aqueous solution, there are used, for example, alkaline aqueous solutions containing dissolved therein 0.001 to 10% by weight, preferably 0.01 to 1% by weight, of an alkaline compound such as sodium hydroxide, potassium hydroxide, sodium carbonate, sodium silicate, sodium metasilicate, aqueous ammonia, ethylamine, diethylamine, dimethylethanolamine, tetramethylammonium hydroxide, choline, pyrrole, piperidine, or 1,8-diazobicyclo-[5.4.0]-7-undecene. Additionally, in the case of using such developing solution comprising an alkaline aqueous solution, water washing is generally conducted after development.

2) Inkjet Method

In the case of forming a color filter by employing an inkjet method, the polymerizable compound in the coloring composition of the invention for color filter is not particularly limited, and any conventionally known one which has been used in an ink for inkjet system may be used. A monomer of a photo-sensitive resin and/or a thermosetting resin is preferably used.

As these photo-sensitive resins, there are illustrated acryl resins, methacryl resins, and epoxy resins, with acryl resins and methacryl resins being preferably used. The acryl resins and the methacryl resins are preferably those which are obtained by using a combination of a photo-polymerizable monomer selected from among acrylates, methacrylates, urethane acrylate, urethane methacrylate, acrylamide, methacrylamide, alkyl acrylates, benzyl methacrylate, benzyl acrylate, aminoalkyl methacrylates, etc. and a photo-polymerization initiator selected from among benzophenone derivatives, acetophenone derivatives, benzoin derivatives, benzoin ether derivatives, thioxanthone derivatives, anthraquinone derivatives, naphthoquinone derivatives, and triazine derivatives. Also, in addition to the above-described photo-polymerizable monomers, photo-polymerizable monomers having a hydrophilic group, such as acrylic acid, methacrylic acid, maleic acid, and vinyl acetate may further be added.

As the thermosetting resins, there are illustrated, for example, melamine resin, urea resin, alkyd resin, epoxy resin, phenol resin, and cyclopentadiene resin.

In the case of employing the inkjet process, the solvent to be used in the coloring composition may be an oily medium or an aqueous medium, with an aqueous medium being more preferably used. As the aqueous medium, water or a mixed solvent of water and a water-soluble organic solvent is used, with a mixed solvent of water and a water-soluble organic solvent being preferred. Also, it is preferred to use deionized water.

The oily medium to be used in the above-described coloring composition is not particularly limited, but there can be used, for example, those which have been illustrated as solvents for the coloring composition for use in photolithography.

Solvents to be used in the aqueous medium are selected from among those alcohols, ketones, ethers, glycols, glycerin, alkylene glycol monoalkyl ethers, alkylene glycol dialkyl ethers, alkanolamines, nitrogen-containing polar organic solvents, etc. which are soluble in water. These water-soluble organic solvents may be used alone or in combination of two or more thereof.

The amount of these solvents to be used is not particularly limited, but it is preferred to properly adjust the amount so that the viscosity of the coloring composition at room temperature becomes 20 mPa·s or less, preferably 10 mPa·s or less.

The coloring composition of the invention for inkjet can be prepared by a process including a step of dispersing and mixing components as is the same with the coloring composition for use in photolithography process. Upon dispersing, a dispersant may be contained, as needed, as is the same with the case of photolithography.

Also, the coloring composition in the invention for inkjet may contain, as needed, known additives in addition to the aforesaid components, such as a wetting agent, an antifading agent, an emulsion stabilizer, an ultraviolet ray absorbent, an antiseptic, an antifungal agent, a pH-adjusting agent, a surface tension-adjusting agent, an anti-foaming agent, a viscosity-adjusting agent, and a dispersion stabilizer.

Methods for forming a color filter using the coloring composition obtained as described above are not particularly limited, and any known method of forming a color filter according to the inkjet system may be employed. For example, a color filter can be formed by a method including a step of forming a predetermined color filter pattern in a droplet state on a substrate, a step of drying this, and a step of heat treatment, irradiation with light, or both of them to cure the color filter pattern on the display substrate, thus forming a film.

Although description has been made hereinbefore with respect to photolithography method and inkjet method, the color filter of the invention may be obtained by other method.

In the case of employing other color filter-forming methods (for example, various printing methods such as an offset printing method) than the above-described methods, coloring compositions for color filter and resulting color filters fall within the scope of the invention as long as the coloring composition contains the aforesaid polymerizable compound and the solvent and contains the azo pigment represented by the general formula (1) as a coloring material.

For example, components such as polymerizable compounds, solvents, and additives and formulation upon formation of a color filter may be selected according to conventional examples, and are not limited only to those which have been illustrated with respect to the above-described photolithography method and inkjet method.

The color filter obtained as described above forms pixels together with color filter patterns of G (green) and B (blue) according to a known method. Such filter has an extremely high transparency and excellent spectral characteristics and can provide a liquid crystal display which can display a distinct image with less polarization extinction.

Also, use of a device having formed therein this color filter can provide a camera module having good spectral characteristics. The color filter of the invention can be used in a liquid crystal display element or solid state imaging devices such as CCDs and CMOSs, and is appropriate for CCD elements or CMOS elements having high resolution exceeding 1,000,000 pixels.

EXAMPLES

The invention will be specifically described by reference to Examples, but the invention is not limited only to the Examples. In the following Examples, "parts" means "parts by weight".

Synthesis Example 1

Specific compound example D-1 is synthesized according to the following route.

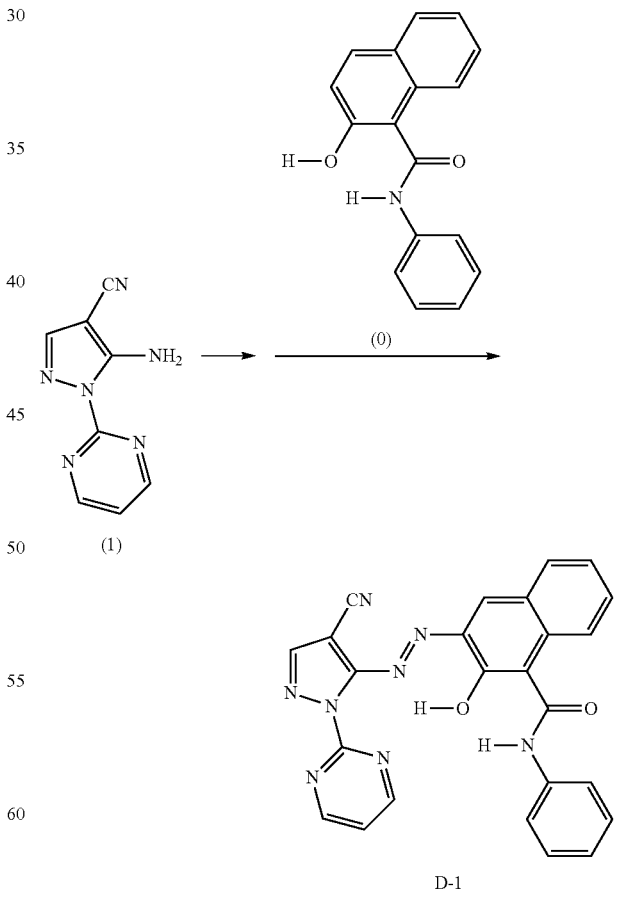

1.0 g of compound (1) is added to 7.5 ml of phosphoric acid (Wako Pure Chemical Industries, Ltd.; special grade reagent; purity: 85%; hereinafter the same) to dissolve. This solution is ice-cooled to keep the temperature to −2 to 0° C., and 0.38 g of sodium nitrite is added thereto, followed by stirring for 1 hour to obtain a diazonium salt solution. Separately, 25 ml of acetonitrile and 30 ml of trimethylamine are added to 1.30 g of compound (0) and, under stirring, the aforesaid diazonium salt solution is added thereto at 5° C. to 12° C. Simultaneously with completion of the addition, the ice bath is removed, and stirring is continued for further 2 hours. 5 ml of acetic acid (Wako Pure Chemical Industries, Ltd.; special grade reagent; purity: 99.7%) and 100 ml of water are added to the reaction solution, and the resulting mixture is stirred for 30 minutes, followed by adding thereto 200 ml of chloroform to extract. The chloroform layer is washed with 100 ml of water, and dried over magnesium sulfate. After removing magnesium sulfate by filtration, the filtrate is purified by silica gel column chromatography. 8 ml of dimethylacetamide (DMAc) and 8 ml of water are added to the solid product thus obtained, and the mixture is stirred at an internal temperature of 70° C. for 1 hour, then at room temperature for 1 hour. Crystals precipitated are spray-washed with 20 ml of dimethylacetamide/water=1/1 and 20 ml of water. The thus-obtained crystals are dried to obtain 0.8 g of compound D-1 of the invention. Yield: 35%.

Infrared absorption chart is shown in FIG. 1.

Synthesis Example of Comparative Compound 1

Synthesis of Comparative Compound 1
Comparative compound 1 is synthesized according to the following route.

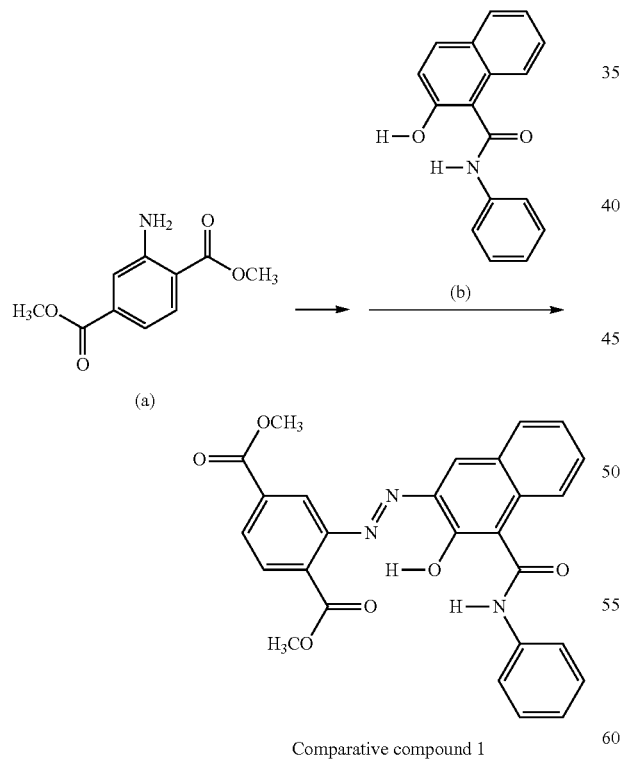

Comparative compound 1

15 ml of water and 2.2 ml of concentrated hydrochloric acid are added to 2.1 g of compound (a), followed by stirring at −2° C. to 2°. To this solution is dropwise added in 10 minutes a solution of 0.72 g of sodium nitrite dissolved in 5 ml of water to obtain a diazonium salt solution. Separately, 20 ml of DMAc and 20 ml of pyridine are added to 2.50 g of compound (b) and, under stirring, the aforesaid diazonium salt solution is added thereto at 5° C. to 10° C. Simultaneously with completion of the addition, the ice bath is removed, and stirring is continued for further 2 hours. Crystals precipitated are collected by filtration, and washed with 20 ml of methanol. The thus-obtained crystals are refluxed under heating in 50 ml of methanol for 1 hour, and cooled to 25° C., followed by collecting precipitated crystals. 50 ml of methanol and 10 ml of water are added to the thus-obtained crystals and, after stirring at 60° C. for 1 hour, the mixture is stirred at room temperature for 1 hour. Crystals precipitated are collected by filtration and spray-washed with 20 ml of methanol/water=5/1. The thus-obtained crystals are dried to obtain 1.3 g of comparative compound 1. Yield: 23.3%.

Synthesis Example of Comparative Compound 2

Synthesis of Comparative Compound 2
Comparative compound 2 is synthesized according to the following route.

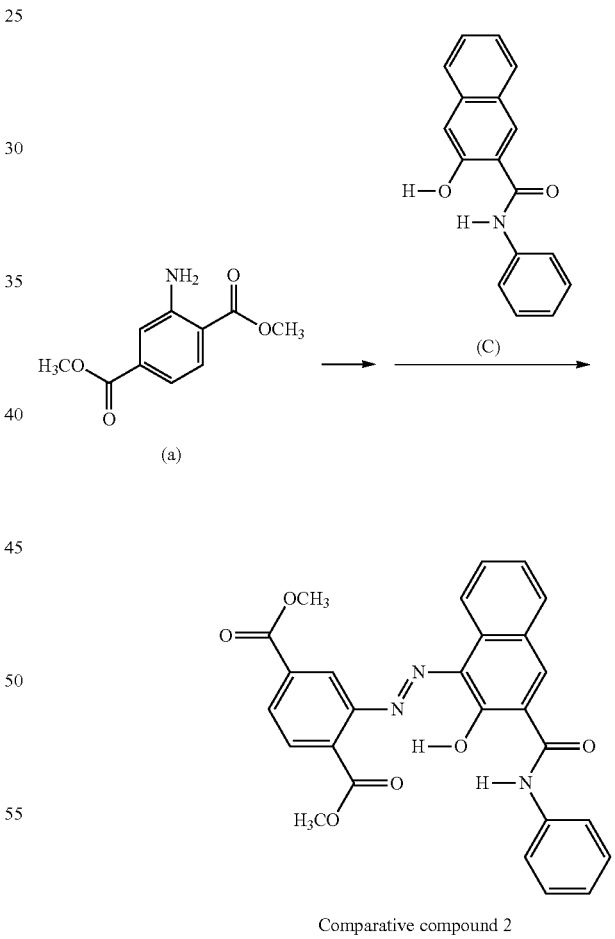

Comparative compound 2

Comparative compound 2 is synthesized in the same manner as described in the synthesis process of Comparative compound 1. Yield: 47.9%.

Synthesis Example of Comparative Compound 3

Synthesis of comparative compound 3

Comparative compound 3 is synthesized according to the following route.

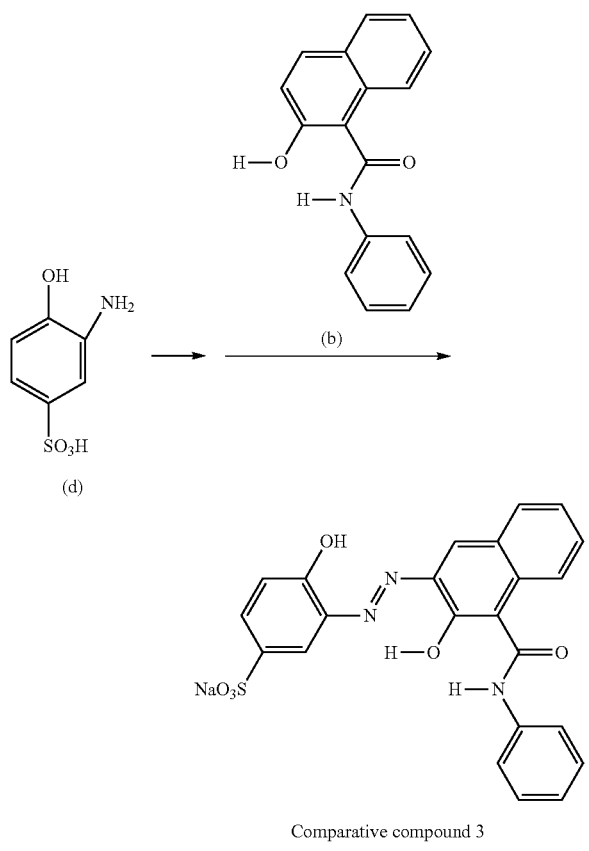

Comparative compound 3

15 ml of water and 2.2 ml of concentrated hydrochloric acid are added to 1.9 g of compound (d), followed by stirring at −2° C. to 2°. To this solution is dropwise added in 10 minutes a solution of 0.72 g of sodium nitrite dissolved in 5 ml of water to obtain a diazonium salt solution. Separately, 40 ml of water and 2 g of sodium carbonate are added to 2.6 g of compound (b) and, under stirring, the aforesaid diazonium salt solution is added thereto at 5° C. to 10° C. Simultaneously with completion of the addition, the ice bath is removed, and stirring is continued for further 2 hours. 200 ml of saturated salt solution is added to the reaction solution. Crystals precipitated are collected by filtration, and washed with 30 ml of saturated salt solution. The thus-obtained crystals are heated in 50 ml of methanol, and insoluble matter is filtrated. The solution is purified by Cephadex column chromatography, the water/methanol solution is concentrated, and crystals precipitated are collected by filtration and spray-washed with methanol to obtain 1.7 g of comparative compound 3. Yield: 35.4%.

Example 1

2.5 parts of the pigment of the specific compound D-1, 0.5 part of sodium oleate, 5 parts of glycerin, and 42 parts of water are mixed, and the resulting mixture is subjected to dispersing procedure together with 100 parts of 0.1-mm diameter zirconia beads for 6 hours at 300 rpm in a planetary ball mill. After completion of the dispersing procedure, the zirconia beads are removed to obtain pigment dispersion 1.

Example 2

5 parts of the pigment (D-1) synthesized in Synthesis Example 1, 25.5 parts of an aqueous solution of methacrylic acid-methacrylate copolymer shown as Dispersant Solution 10 described in WO2006/064193, p. 22 as a high-molecular dispersant, and 19.5 parts of water are mixed, and the resulting mixture is subjected to dispersing procedure together with 100 parts of 0.1 mm diameter zirconia beads for 6 hours at 300 rpm in a planetary ball mill. After completion of the dispersing procedure, the zirconia beads are removed to obtain pigment dispersion 2.

Comparative Example 1

A comparative pigment dispersion 1 is obtained in the same manner as described in Example 1, except for using the comparative compound 1 in place of the pigment used in Example 1.

Comparative Example 2

A comparative pigment dispersion 2 which is yellow in color is obtained in the same manner as described in Example 1, except for using C.I. pigment yellow 74 (trade name: Irgalite Yellow Go; manufactured by BASF SE) in place of the pigment (D-1) used in Example 1.

Comparative Example 3

A comparative pigment dispersion 3 is obtained in the same manner as described in Example 1, except for using the comparative compound 2 in place of the pigment (D-1) used in Example 1.

Comparative Example 4

A comparative pigment dispersion 4 is obtained in the same manner as described in Example 1, except for using the comparative compound 3 in place of the pigment (D-1) used in Example 1.

(Evaluation)
<Dispersion Stability>

Each of the pigment dispersions obtained above is subjected to measurement of volume-average particle size in a conventional manner using a dynamic light-scattering particle size-measuring apparatus (Microtrack UPA 150; manufactured by Nikkiso Co., Ltd.). Dispersion stability of each of the pigment dispersions is evaluated according to the following criteria: samples with which the volume-average particle size measured 2 hours after preparation of the pigment dispersion and the volume-average particle size measured after being stored at 70° C. for 2 days are both from 30 nm to 230 nm are ranked A (very good); and samples with which either of the volume-average particle size measured 2 hours after preparation of the pigment dispersion and the volume-average particle size measured after being stored at 70° C. for 2 days is outside this range are ranked C (bad). The results are shown in Table 1.

<Tinctorial Strength>

Each of the pigment dispersions obtained above is coated on a photo mat paper <pigment only> manufactured by Seiko Epson Corporation by using a No. 3 bar coater. Image density of each of the thus-obtained coated products is measured by means of a reflection densitometer (X-Rite 938; manufactured by X-Rite Co.) as "tinctorial strength (OD: Optical Density)". The results are shown in Table 1.

<Light Fastness>

The coated product used in tinctorial strength evaluation and having 1.0 in image density is irradiated with xenon light (170000 lux; in the presence of a cut filter which cuts light having a wavelength of 325 nm or less) for 14 days using a fade meter. Image density before and after irradiation with xenon light is measured using the reflection densitometer, and the pigment dispersions are evaluated in terms of colorant residual ratio [(density after irradiation/density before irradiation)×100%].

Examples 3 to 16

Pigment dispersions 3 to 16 is formed in the same manner as described in Example 1, except for using the compounds described in Table 1 in place of the specific compound (D-1), and is conducted the same evaluation.

and 95 parts by weight of deionized water, and the resulting mixture is mixed to roughly disperse by means of a dispersion impeller. 600 parts by weight of zirconia beads are added to the mixed and roughly dispersed liquid and, after conducting dispersing procedure for 4 hours in a dispersing machine (sand grinder mill), the liquid is separated into beads and a dispersion. To the thus-obtained mixture is gradually added 2 parts by weight of polyethylene glycol diglycidyl ether at 25° C.; and the mixture is stirred at 50° C. for 6 hours. Further, impurities are removed from the mixture by using a ultra-filtration membrane having molecular weight of fraction of 300,000, followed by filtering the mixture by using a syringe of 20 ml in volume equipped with a filter having a pore size of 5 μm (acetylcellulose membrane; outer diameter: 25 mm; manufactured by Fujifilm Corporation) to remove coarse particles. Thus, pigment dispersion 101 having a solid content of 10% (particle size: 80 nm; measured by using Nanotrac 150 (UPA-EX150) manufactured by Nikkiso Co., Ltd.) is obtained.

TABLE 1

| | Pigment Dispersion | Pigment | Dispersion Stability | Tinctorial Strength | Light Fastness |
|---|---|---|---|---|---|
| Example 1 | Pigment dispersion 1 | D-1 | A | 1.40 | 88.0% |
| Example 2 | Pigment dispersion 2 | D-1 | A | 1.42 | 89.5% |
| Example 3 | Pigment dispersion 3 | D-2 | A | 1.39 | 90.2% |
| Example 4 | Pigment dispersion 4 | D-8 | A | 1.39 | 87.2% |
| Example 5 | Pigment dispersion 5 | D-38 | A | 1.30 | 80.8% |
| Example 6 | Pigment dispersion 6 | D-40 | A | 1.40 | 88.3% |
| Example 7 | Pigment dispersion 7 | D-23 | A | 1.40 | 87.0% |
| Example 8 | Pigment dispersion 8 | D-37 | A | 1.37 | 85.9% |
| Example 9 | Pigment dispersion 9 | D-43 | A | 1.32 | 79.5% |
| Example 10 | Pigment dispersion 10 | D-47 | A | 1.38 | 86.3% |
| Example 11 | Pigment dispersion 11 | D-49 | A | 1.37 | 87.0% |
| Example 12 | Pigment dispersion 12 | D-65 | C | 1.28 | 70.0% |
| Example 13 | Pigment dispersion 13 | D-72 | A | 1.39 | 82.6% |
| Example 14 | Pigment dispersion 14 | D-73 | A | 1.30 | 62.6% |
| Example 15 | Pigment dispersion 15 | D-104 | A | 1.40 | 86.6% |
| Example 16 | Pigment dispersion 16 | D-201 | A | 1.20 | 53.6% |
| Comparative Example 1 | Comparative pigment dispersion 1 | Comparative compound 1 | A | 1.20 | 5.2% |
| Comparative Example 2 | Comparative pigment dispersion 2 | P.Y.74 | A | 1.45 | 12.5% |
| Comparative Example 3 | Comparative pigment dispersion 3 | Comparative compound 2 | A | 1.27 | 20.5% |
| Comparative Example 4 | Comparative pigment dispersion 4 | Comparative compound 3 | C | 0.80 | 6.0% |

As is apparent from Table 2, the pigment dispersions containing the pigments of the present invention are shown to have excellent performance with respect to dispersion stability, light fastness, and tinctorial strength. The pigment dispersions of the present invention is superior with respect to all properties, particularly, light fastness to comparative examples.

Example 101

The high-molecular dispersant represented by Dispersant 10 described in WO2006/064193, p. 22 is neutralized with a potassium hydroxide aqueous solution. To 75 parts by weight (concentration of solid components: 20%) of the thus-obtained dispersant aqueous solution are added 30 parts by weight of the azo pigment (D-1) synthesized hereinbefore Comparative Example 101

A comparative pigment dispersion is obtained in the same manner as described in Example 101, except for using the comparative compound 101 in place of the azo pigment used in Example 101.

Example 102

5% by weight, as a solid component, of the pigment dispersion 101 obtained in Example 101, 10% by weight of glycerin, 5% by weight of 2-pyrrolidone, 2% by weight of 1,2-hexanediol, 2% by weight of triethylene glycol monobutyl ether, 0.5% by weight of propylene glycol, and 75.5% by weight of deionized water are mixed, and the resulting mixed liquid is filtered by using a syringe of 20 ml in volume equipped with a filter having a pore size of 1 μm (acetylcellulose membrane; outer diameter: 25 mm; manufactured by Fujifilm Corporation) to remove coarse particles. Thus, pigment ink liquid 5 of the invention.

Comparative Example 102

Comparative pigment ink liquid 5 is obtained in the same manner as in Example 101 except for using the comparative pigment dispersion 101 obtained in Comparative Example 101 in place of the pigment dispersion 101 obtained in Example 101.

Additionally, in Table 2, "ejection stability", "light fastness", "heat fastness", "ozone fastness", "metallic gloss", and "ink liquid stability" are evaluated as follows. Each ink is placed in a cartridge for an yellow ink liquid adapted for an inkjet printer PX-V630 manufactured by Seiko Epson Corporation, whereas, as other color inks, pigment ink liquids adapted for PX-630 are used, and a mono-color image pattern and green, red, and gray image patterns wherein density is stepwise changed are printed on image-receiving sheets of photographic paper <Kotaku> manufactured by Seiko Epson Corporation and photographic paper CRISPIA <Ko-kotaku> manufactured by Seiko Epson Corporation selecting recommended kirei mode so as to thereby evaluate image quality (metallic gloss), ejecting properties of the ink, and image fastness. Evaluations are conducted with respect to mono-color samples except for evaluation of metallic gloss.

The inkjet inks used in the above-described Example 102 (pigment ink liquid 5) and Comparative Example 102 (comparative pigment ink liquid 5) are subjected to the following evaluations. The results are shown in Table 2.

Evaluation Experiments

1) Regarding ejection stability, the cartridge is mounted on a printer and, after confirming ejection of the ink through all nozzles, an image is outputted on 20 sheets of A4 size and evaluated according to the following criteria:
A: Printing is not disordered from the start to the end.
B: Printing is disordered in some outputs.
C: Printing is disordered from the start to the end.
2) Regarding image storage stability, the following evaluation is conducted using printed image samples.
[1] Light fastness is evaluated as follows. Image density Ci of the sample just after printing is measured by X-rite 310. The sample is irradiated with xenon light (100,000 lux) using a weather meter (manufactured by Atlas Material Testing Technology LLC) for 14 days and then image density Cf of the sample is measured to determine an image remaining ratio, Cf/Ci×100, whereby the light fastness is evaluated. The image remaining ratio is determined at 3 points having reflection density of 1, 1.5 and 2 respectively, and a case wherein the image remaining ratio is 80% or more at all three points is ranked A, a case wherein the image remaining ratio is less than 80% at two points is ranked B, and a case wherein the image remaining ratio is less than 80% at all three points is ranked C.
[2] Heat fastness is evaluated as follows. Density of the printed sample is measured by X-rite 310 before and after preservation of the sample under conditions of 80° C. and 60% RH for 7 days and an image remaining ratio is determined, whereby the heat fastness is evaluated. The image remaining ratio is determined at 3 points having reflection density of 1, 1.5 and 2, respectively, and a case wherein the image remaining ratio is 95% or more at all three points is ranked A, a case wherein the image remaining ratio is less than 95% at two points is ranked B, and a case wherein the image remaining ratio is less than 95% at all three points is ranked C.
[3] Ozone resistance (ozone fastness) is evaluated as follows. The printed sample is left for 14 days in a box wherein the ozone gas concentration is adjusted to 5 ppm (25° C., 50%), and the image density is measured before and after leaving the paper in the ozone gas atmosphere using a reflection densitometer (Photographic Densitometer 310 manufactured by X-rite Co.) to determine the image-remaining ratio. Additionally, the reflection density is measured at three points where the densities are 1, 1.5 and 2.0, respectively. The ozone gas density within the box is monitored by means of an ozone gas monitor (model: OZG-EM-01) made by APPLICS Co., Ltd.

The evaluation is conducted in three ranks: a case wherein the image remaining ratio is 80% or more at all three points is ranked A; a case wherein the image remaining ratio is less than 80% at one or two points is ranked B; and a case wherein the image remaining ratio is less than 70% at all three points is ranked C.
3) Generation of metallic gloss:
Yellow, green, and red solid printed portions of the samples are visually observed under reflected light to evaluate.
A sample with which no metallic gloss is observed is ranked A, and a sample with which metallic gloss is observed is ranked B.
4) Ink liquid stability: Each of the pigment ink liquids obtained in Examples and Comparative Examples are allowed to stand at 60° C. for 10 days, and ink liquid stability is evaluated as follows. A sample wherein particle size of the particles in the pigment ink is not changed is ranked A, and a sample wherein particle size of the particles is changed is ranked B. The results are shown in the following Table 2.

TABLE 2

| Ink Liquid | Ejection Stability | Light Fastness | Heat Fastness | Ozone Fastness | Metallic Gloss | Ink Liquid Stability |
|---|---|---|---|---|---|---|
| Ex. 101 (photographic paper Kotaku) | A | A | A | A | A | A |
| Ex. 101 (CRISPIA Ko-kotaku) | A | A | A | A | A | A |
| Comp. Ex. 101 (photographic paper Kotaku) | B | C | A | C | A | B |
| Comp. Ex. 101 (CRISPIA Ko-kotaku) | B | C | A | C | A | B |

It is seen from the results shown in Table 2 that the pigment ink liquid using the pigment of the invention has excellent ejection properties and excellent weatherability, can suppress generation of metallic gloss, and shows excellent pigment ink liquid stability.

As is apparent from the results shown in Table 2, it is seen that the system using the pigment ink liquid of the invention is excellent in every performance. In particular, in comparison with the samples of Comparative Examples, the samples of the invention show excellent ejection stability, light fastness, ozone fastness, and ink liquid stability.

Example 103

When an image is printed on inkjet paper of photographic glossy paper "Gasai" manufactured by FujiFilm Corporation by using the pigment ink liquid prepared in Example 102 and using PX-V 630 manufactured by Seiko Epson Corporation, and then the printed paper is subjected to the same evaluation as in Example 102, there are obtained the same results.

As is apparent from the results shown in Table 1 and Table 2, the pigment dispersions 1 to 16, and 101 using the pigments of the invention, and the pigment ink liquid 5 using the pigments of the invention are excellent in color tone, and show high tinctorial strength and high light fastness.

Therefore, the pigment dispersions using the pigments of the invention can favorably be used for an ink for printing such as inkjet printing.

Example 201

<Making of Color Filter by Photolithography Method>

The pigment shown in D-1 synthesized in Synthesis Example 1 is used. The materials shown below are placed in a 70-cc mayonnaise bottle, and the bottle is shaken for 6 hours in a dispersing shaker (DAS2000; manufactured by LAU Industries) so as to obtain a pigment dispersion 201.

TABLE 3

| (Formulation of pigment dispersion 201) | |
|---|---|
| Pigment (Compound D-1) | 0.6 g |
| 1,2-propanediol-1-monomethyleter-2-acetate (Solvent 1) (manufactured by Tokyo Chemical Industry Co., Ltd.) | 5.0 g |
| Zirconia beads (φ0.3 mm) | 10 g |

TABLE 4

| (Formulation of the coloring composition 201 for color filter) | |
|---|---|
| Pigment dispersion 201 | 15.6 g |
| Photo-sensitive resin (CYCLOMER P200; manufactured by Daicel Chemical Industries, Ltd.) | 2.5 g |
| Pentaerythritol tetraacrylate (manufactured by Sigma-Aldrich Corporation) | 0.2 g |
| 2-benzyl-2-dimethylamino-4'-morpholinobutyrophenone (manufactured by Sigma-Aldrich Corporation) | 0.05 g |
| 2,4-diethyl-9H-thioxanthen-9-one (manufactured by Tokyo Chemical Industry Co., Ltd.) | 0.05 g |
| 1,2-propanediol-1-monomethyleter-2-acetate (manufactured by Tokyo Chemical Industry Co., Ltd.) | 0.8 g |
| Cyclohexanone (manufactured by Tokyo Chemical Industry Co., Ltd.) | 0.2 g |

The obtained coloring composition 201 for color filter is applied on a slide glass with a bar-coater Rod No. 10, and the slide glass is dried for 5 minutes in an oven at 80° C. to obtain a coated film of ink.

An appropriate masking is applied on a part of the obtained coated film, and the film is then exposed to a high-pressure mercury lamp with an irradiation condition of 200 mJ/cm². Thereafter, the film is developed using a 0.5% sodium carbonate aqueous solution at 25° C., and dried for 20 minutes in an oven at 220° C. so as to obtain a color filter. The light transmittance of the film is measured by using spectrophotometer (U-3310; manufactured by Hitachi Ltd.). Also, a value of [wavelength at which the obtained color filter exhibits the highest transmittance–wavelength at which the obtained color filter exhibits the lowest transmittance] is determined. Results are shown in Table 7.

A coloring composition is prepared in the same manner as in Example 201 except for using a pigment shown by compound D-23 synthesized in Synthesis Example 2 in place of the pigment used in Example 201 and changing the amount of the solvent (1,2-propanediol-1-monomethylester-2-acetate) in the formulation of the pigment dispersion 201 to the amount shown in Table 5. A color filter is prepared by using the thus-obtained coloring composition, and the light transmittance thereof is measured. Also, a value of [wavelength at which the obtained color filter exhibits the highest transmittance–wavelength at which the obtained color filter exhibits the lowest transmittance] is determined. Results are shown in Table 7.

A coloring composition is prepared in the same manner as in Example 201 except for using a pigment described in Table 5 in place of the pigment used in Example 201 and changing the amount of the solvent (1,2-propanediol-1-monomethylester-2-acetate) in the formulation of the pigment dispersion 201 to the amount shown in Table 5. A color filter is prepared by using the thus-obtained coloring composition. Also, a value of [wavelength at which the obtained color filter exhibits the highest transmittance–wavelength at which the obtained color filter exhibits the lowest transmittance] is determined. Results are shown in Table 7.

TABLE 5

| | Pigment | Amount of Solvent 1 used |
|---|---|---|
| Example 201 | D-1 | 5 g |
| Example 202 | D-23 | 5 g |
| Example 203 | D-37 | 6 g |
| Example 204 | D-72 | 5 g |
| Example 205 | D-73 | 5 g |
| Example 206 | D-104 | 5 g |
| Example 207 | D-105 | 5 g |
| Example-208 | D-47 | 5 g |

Example 209

When dispersing procedure is conducted in Example 201 by adding 0.5 g of a surfactant (pigment-wetting dispersant BYK-161; manufactured by Byk-Chemie GmbH) as a dispersant to 0.6 g of the pigment, there is obtained a color filter having the same performance as in Example 201 by dispersing for 6 hours.

Examples 210 to 215

When pigment dispersions are prepared in the same manner as in Example 201 using a dispersing shaker (DAS 200; manufactured by LAU Industries) except for using the dispersants shown in Table 6 and changing the amounts thereof used as shown in Table 6, there are respectively obtained color filters having the same performance as in Example 201 by dispersing for 6 hours.

TABLE 6

| | Dispersants | Amount of dispersant used |
|---|---|---|
| Example 210 | Pigment series additive (SOLSPERSE 22000; manufactured by Zeneca Inc.) | 0.012 g |
| Example 211 | Silicone series additive (PAINTAD 32; manufactured by Dow Corning Toray Co., Ltd.) | 0.006 g |
| Example 212 | Silicone series additive (PAINTAD 57; manufactured by Dow Corning Toray Co., Ltd.) | 0.0012 g |
| Example 213 | Silicone series additive (DK Q8-8011; manufactured by Dow Corning Toray Co., Ltd.) | 0.0012 g |
| Example 214 | Surfactant (DISPARLON DA-325; manufactured by Kusumoto Chemicals, Ltd.) | 0.200 g |
| Example 215 | Surfactant (DISPARLON DA-1860; manufactured by Kusumoto Chemicals, Ltd.) | 0.120 g |

Comparative Examples 201 and 202

In absolutely the same manner as in Example 201 except for using each C.I. Pigment Red 254 (IRGAPHORE DPP RED; manufactured by BASF SE) and a pigment represented by the formula (1) below in place of the pigment used in Example 201, there is prepared a colored film. Measurement of light transmittance of the thus-obtained film is conducted so as to determine a value of [wavelength at which the obtained color filter exhibits the highest transmittance—wavelength at which the obtained color filter exhibits the lowest transmittance] is determined. The results are shown in Table 7. The evaluation is conducted in three ranks: a case wherein the value of [wavelength at which the obtained color filter exhibits the highest transmittance—wavelength at which the obtained color filter exhibits the lowest transmittance] is less than 70 nm is ranked A; a case wherein the value is 70 nm or more and less than 100 nm is ranked B; and a case wherein the value is 100 run or more is ranked C.

Formula [I]

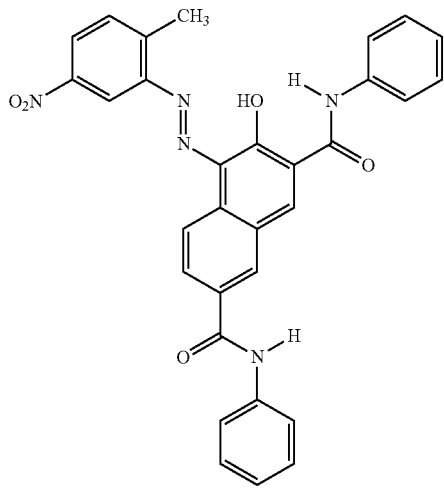

TABLE 7

| | Pigment | Wavelength at which transmittance is the highest – Wavelength at which transmittance is the lowest |
|---|---|---|
| Example 201 | D-1 | A |
| Example 202 | D-23 | A |
| Example 203 | D-37 | A |
| Example 204 | D-72 | A |
| Example 205 | D-73 | A |
| Example 206 | D-104 | A |
| Example 207 | D-105 | A |
| Example 208 | D-47 | A |
| Comparative Example 201 | C.I.P.R.254 | A |
| Comparative Example 202 | Compound of formula [I] | C |

Color filters prepared by using the coloring compositions of the invention for color filter containing compounds D-1, 23, 37, 72, 73, 104, 105, and compound D-47, respectively, as coloring materials, show a sharp rise in transmittance curve and show a high transmittance, thus showing excellent transmittance curves.

That is, the coloring composition of the invention for color filter is useful in that, by selecting the structure of the azo pigment represented by the general formula (1), the wavelength at which transmittance sharply changes can be properly adjusted between about 500 nm and about 590 nm, whereby a color with an optimal hue can be obtained in accordance with the wavelength of a light source of back light in a display.

[Evaluation of Heat Fastness]

Heat fastness test is conducted using color filters obtained in Examples 201 to 208 and Comparative Examples 201 and 202.

<Method of Testing Heat Fastness>

A color filter is exposed to the atmosphere at 250° C. for 90 minutes, and color difference before and after the exposure ($\Delta E^*_{ab}$) is measured by means of a spectrophotometer (Macbeth Color eye-3000; manufactured by Sakata Inx Eng., Co., Ltd.). Evaluation is conducted according to the following criteria, and the results are shown in Table 8.

<Evaluation Criteria>
A: $\Delta E^*_{ab} < 1.0$
B: $1.0 \leq \Delta E^*_{ab} < 1.1$
C: $1.1 \leq \Delta E^*_{ab}$

TABLE 8

| | Pigment | Results of Heat Fastness Test Color; Difference ($\Delta E^*ab$) |
|---|---|---|
| Example 201 | D-1 | A |
| Example 202 | D-23 | A |
| Example 203 | D-37 | A |
| Example 204 | D-72 | B |
| Example 205 | D-73 | B |
| Example 206 | D-104 | B |
| Example 207 | D-105 | A |
| Example 208 | D-47 | B |
| Comparative Example 201 | C.I.P.R.254 | C |
| Comparative Example 202 | Compound of formula [I] | B |

In comparison with the sample using the pigment of Comparative Examples 201 and 202, the color filters of Examples 201 to 208 prepared by using the coloring compositions of the invention for color filter respectively containing the azo compounds represented by the general formula (1) as coloring materials show the same or more heat fastness.

[Evaluation of Heat Fastness]

The coated product used in tinctorial strength evaluation and having 1.0 in image density is irradiated with xenon light (170000 lux; in the presence of a cut filter which cuts light having a wavelength of 325 nm or less) for 20 days using a fade meter. Color difference before and after the exposure ($\Delta E^*_{ab}$) is measured by means of a spectrophotometer (Macbeth Color eye-3000; manufactured by Sakata Inx Eng., Co., Ltd.). Evaluation is conducted according to the following criteria, and the results are shown in Table 9.

<Evaluation Criteria>
A: $\Delta E^*_{ab} < 3.0$
B: $3.0 \leq \Delta E^*_{ab} < 6.0$
C: $6.0 \leq \Delta E^*_{ab}$

TABLE 9

| | Pigment | Results of Light Fastness Test Color; Difference ($\Delta E^*ab$) |
|---|---|---|
| Example 201 | D-1 | A |
| Example 202 | D-23 | A |
| Example 203 | D-37 | A |
| Example 204 | D-72 | A |
| Example 205 | D-73 | B |
| Example 206 | D-104 | A |
| Example 207 | D-105 | A |
| Example 208 | D-47 | B |
| Comparative Example 201 | C.I.P.R.254 | C |
| Comparative Example 202 | Compound of formula [I] | B |

In comparison with the sample using the pigment of Comparative Examples 201 and 202, the color filters of Examples 201 to 208 prepared by using the coloring compositions of the invention for color filter respectively containing the azo compounds represented by the general formula (1) as coloring materials show the same or more light fastness.

[Evaluation of Contrast]

Contrast of each of the obtained color filters is measured by using a contrast tester CT-1 manufactured by Tsubosaka Electric Co., Ltd. Evaluation is conducted according to the criteria that a sample with contrast $\geq 23000$ is ranked A, a sample with $23000 >$ contrast $\geq 18000$ is ranked B, and a sample with $18000 >$ contrast is ranked C, and the results are shown in Table 10.

TABLE 10

| | Pigment | Contrast |
|---|---|---|
| Example 201 | D-1 | A |
| Example 202 | D-23 | A |
| Example 203 | D-37 | A |
| Example 204 | D-72 | A |
| Example 205 | D-73 | A |
| Example 206 | D-104 | A |
| Example 207 | D-105 | A |
| Example 208 | D-47 | A |
| Comparative Example 201 | C.I.P.R.254 | A |
| Comparative Example 202 | Compound of formula [I] | B |

In comparison with the sample using the pigment of Comparative Examples 201 and 202, the color filters of Examples 201 to 208 prepared by using the coloring compositions of the invention for color filter respectively containing the azo compounds represented by the general formula (1) as coloring materials show excellent contrast.

[Evaluation of Age-Storage Stability of Dispersion]

Coloring compositions 201 to 208, and comparative coloring compositions 1 and 2 prepared in Examples 201 to 208 and Comparative Examples 201 and 202, respectively, are stored in a dark room at room temperature for 2 weeks, and then degree of precipitation of foreign body is visually evaluated according to the following criteria.

<Evaluation Criteria>
A: No precipitation is observed.
B: Slight precipitation is observed.
C: Precipitation is observed.

TABLE 11

| | Pigment | Age-storage stability of Dispersion |
|---|---|---|
| Example 201 | D-1 | A |
| Example 202 | D-23 | A |
| Example 203 | D-37 | A |
| Example 204 | D-72 | A |
| Example 205 | D-73 | A |
| Example 206 | D-104 | A |
| Example 207 | D-105 | A |
| Example 208 | D-47 | A |
| Comparative Example 201 | C.I.P.R.254 | B |
| Comparative Example 202 | Compound of formula [I] | C |

In comparison with the sample using the pigment of Comparative Examples 201 and 202, the color filters of Examples 201 to 208 prepared by using the coloring compositions of the invention for color filter respectively containing the azo compounds represented by the general formula (1) as coloring materials do not generate foreign substance with time, thus being excellent age-storage stability of dispersion.

Example 216

Preparation of Green Pigment Dispersion

Preparation of Green Pigment Dispersion P1

A mixture composed of 12.6 parts of a 100/55 (by weight) pigment mixture of C.I. Pigment Green 36 and C.I. Pigment Yellow 139, 5.2 parts of a dispersant of BYK2001 (Disperbyk; manufactured by Byk-Chemie GmbH; solid content: 45.1% by weight), 2.7 parts of a dispersing resin of benzyl methacrylate/methacrylic acid copolymer (acid value: 134 mgKOH/g; Mw=30,000), and 78.3 parts of a solvent of propylene glycol monomethyl ether acetate is mixed and dispersed in a beads mill for 15 hours to obtain a green pigment dispersion P1.

Preparation of Red Pigment Dispersion

Preparation of red pigment dispersion P2

A mixture composed of 12.1 parts of a 100/45 (by weight) pigment mixture of D-1 and C.I. Pigment Yellow 139, 10.4 parts of a dispersant of BYK2001 (Disperbyk; manufactured by Byk-Chemie GmbH; solid content: 45.1% by weight), 3.8 parts of a dispersing resin of benzyl methacrylate/methacrylic acid copolymer (acid value: 134 mgKOH/g; Mw=30,000), and 73.7 parts of a solvent of propylene glycol monomethyl ether acetate is mixed and dispersed in a beads mill for 15 hours to obtain a red pigment dispersion P2.

Preparation of Blue Pigment Dispersion

Preparation of blue pigment dispersion P3

A mixture composed of 14 parts of a 100/25 (by weight) pigment mixture of C.I. Pigment Blue 15:6 and C.I. Pigment Violet 23, 4.7 parts of a dispersant of BYK2001 (Disperbyk; manufactured by Byk-Chemie GmbH; solid content: 45.1% by weight), 3.5 parts of a dispersing resin of benzyl methacrylate/methacrylic acid copolymer (acid value: 134 mgKOH/g; Mw=30,000), and 77.8 parts of a solvent of propylene glycol monomethyl ether acetate is mixed and dispersed in a beads mill for 15 hours to obtain a blue pigment dispersion P3.

Preparation of Green-Colored Photo-Sensitive Composition (Coating Solution) A-1

The above-described green pigment dispersion P1 is used, and components of the following formulation are mixed and stirred to prepare a colored photo-sensitive composition A-1.

TABLE 12

| <Formulation> | |
|---|---|
| Aforesaid Green pigment dispersion P1 | 83.3 parts |
| Alkali-soluble resin: P-1 | 2.05 parts |
| OXE-01 (photopolymerization initiator; manufactured by CIBA Specialty Chemicals) | 1.2 parts |
| Monomer 1: KARAYAD DPHA (manufactured by Nippon Kayaku Co., Ltd.) | 1.4 parts |
| Monomer 2: M-305 (manufactured by Toagosei Co., Ltd.) | 1.4 parts |
| p-methoxyphenol | 0.001 part |
| Polyethylene glycol methyl ether acetate [PGMEA (hereinafter, the same abbreviation will be used); solvent] | 7.4 parts |
| Surfactant (trade name: F-781; 0.2% solution of PGMEA; manufactured by DIC Corporation) | 4.2 parts |

Preparation of Red-Colored Photo-Sensitive Composition (Coating Solution) B-1

The above-described red pigment dispersion P2 is used, and components of the following formulation are mixed and stirred to prepare a colored photo-sensitive composition B-1.

TABLE 13

| <Formulation> | |
|---|---|
| Aforesaid Red pigment dispersion P2 | 59.6 parts |
| Alkali-soluble resin: P-1 | 1.2 parts |
| OXE-02 (photopolymerization initiator; manufactured by CIBA Specialty Chemicals) | 0.7 part |
| Monomer 1: KARAYAD DPHA (manufactured by Nippon Kayaku Co., Ltd.) | 1.6 parts |
| Monomer 2: SR-494 (manufactured by Sartomer Company, Inc..) | 1.6 parts |
| p-methoxyphenol | 0.002 part |
| Polyethylene glycol methyl ether acetate [PGMEA (hereinafter, the same abbreviation will be used); solvent] | 31 parts |
| Surfactant (trade name: F-781; 0.2% solution of PGMEA; manufactured by DIC Corporation) | 4.2 parts |

Preparation of Blue-Colored Photo-Sensitive Composition (Coating Solution) C-1

The above-described blue pigment dispersion P3 is used, and components of the following formulation are mixed and stirred to prepare a colored photo-sensitive composition C-1.

TABLE 14

| <Formulation> | |
|---|---|
| Aforesaid Blue pigment dispersion P3 | 50.6 parts |
| Alkali-soluble resin: P-1 | 2.1 parts |
| OXE-01 (photopolymerization initiator; manufactured by CIBA Specialty Chemicals) | 1.2 parts |
| Monomer 1: KARAYAD DPHA (manufactured by Nippon Kayaku Co., Ltd.) | 1.2 parts |
| Monomer 2: SR-494 (manufactured by Sartomer Company, Inc..) | 3.5 parts |
| p-methoxyphenol | 0.002 part |
| Polyethylene glycol methyl ether acetate [PGMEA (hereinafter, the same abbreviation will be used); solvent] | 36 parts |
| Surfactant (trade name: F-78]; 0.2% solution of PGMEA; manufactured by DIC Corporation) | 4.2 parts |

The green-colored photo-sensitive composition A-1 having been prepared hereinbefore is coated on a silicon wafer on which 8-inch device has been formed and previously sprayed with hexamethyldisilazane, thus a photo-curable coated film being formed. Then, this coated film is subjected to heating treatment (prebake) for 180 seconds using a 100° C. hot plate so that the dry thickness of the coated film becomes 1.0 μm. Subsequently, the film is irradiated through a 1,0-μm square Bayer pattern mask at a wavelength of 365 nm using an i-line stepper exposure apparatus FPA-3000i5+(manufactured by Canon Inc.) in an irradiation amount of from 50 to 1,000 ml/cm$^2$ (exposure amount being changed stepwise by 50 mJ/cm$^2$). Thereafter, the silicon wafer on which the irradiated coated film is formed is placed on a horizontal rotary table of a spin shower developing machine (model DW-30; manufactured by Chemitronics Co., Ltd.), and paddle development is conducted at 23° C. for 180 seconds using a 40% diluting solution of CD-2000 (manufactured by Fujifilm Electronics Materials) to form a colored pattern on the silicon wafer.

The silicon wafer on which the colored pattern is formed is fixed on the aforesaid horizontal rotary table by vacuum-chucking system and, while rotating the silicon wafer at a rotation number of 50 rpm by means of a rotating apparatus, pure water is supplied from above the rotation center through a jet nozzle in a shower state to conduct rinsing treatment, followed by spray drying.

Next, the silicon wafer is heated for 5 minutes on a 200° C. hot plate to obtain a color film on which a pattern is formed.

Further, the same procedures as with Green except for using the above-described Red-colored photo-sensitive composition B-1 and Blue-colored photo-sensitive composition C-1 and exposing through a 1.0-μm square island pattern mask are conducted to thereby form a color filter formed by RGB patterns.

Good spectral characteristics can be confirmed by preparing a camera module using a device wherein this color filter is formed.

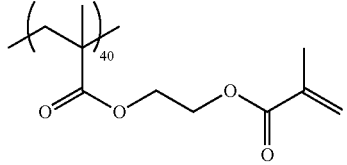

Resin P-1

-continued

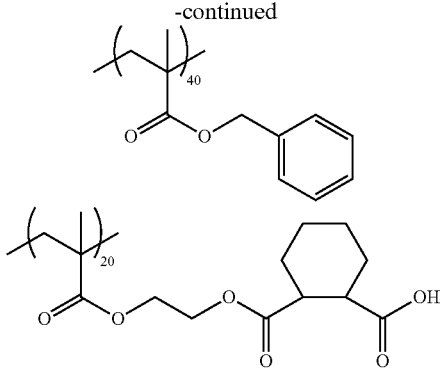

Acid value 54 mgKOH/g
$M_w$:15,000

Industrial Applicability

According to the present invention, there is to provide azo compounds and azo pigments having excellent coloring characteristics such as tinctorial strength and hue and excellent fastness such as light fastness and ozone fastness, an azo pigment dispersion, a coloring composition, a coloring composition for color filter, a color filter, and an ink for inkjet recording.

Although the invention has been described in detail and by reference to specific embodiments, it is apparent to those skilled in the art that it is possible to add various alterations and modifications insofar as the alterations and modifications do not depart from the spirit and the scope of the invention.

This application is based on a Japanese patent application filed on Sep. 2, 2008 (Japanese Patent Application No. 2008-225037) and a Japanese patent application filed on Aug. 31, 2009 (Japanese Patent Application No. 2009-201142), and the contents thereof are incorporated herein by reference.

The invention claimed is:

1. An azo pigment represented by the following general formula (2), a tautomer, salt, or hydrate thereof:

General Formula (2)

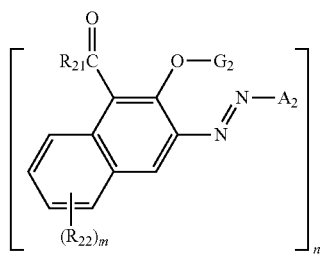

wherein

G$_2$ represents a hydrogen atom, an aliphatic group, an aryl group, or a heterocyclic group, R$_{21}$ represents an aryl amino group containing a total of from 6 to 14 carbon atoms, a saturated or unsaturated heterocyclic amino group containing a total of from 2 to 12 carbon atoms, an aliphatic oxy group, an aliphatic group, an aryl group, or a heterocyclic group, R$_{22}$ represents a substituent, and A$_2$ represents any one of the following general formulae (A-1) to (A-34), m represents an integer of from 0 to 5, n represents an integer of from 1 to 4 and, when n=2, the general formula (2) represents a dimer formed through R$_{21}$, R$_{22}$, G$_2$, or A$_2$ and, when n=3, the general formula represents a trimer formed through R$_{21}$, R$_{22}$, G$_2$, or A$_2$ and, when n=4, the general formula represents a tetramer formed through R$_{21}$, R$_{22}$, G$_2$, or A$_2$:

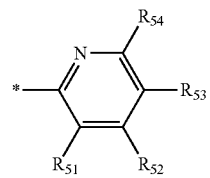
(A-1)

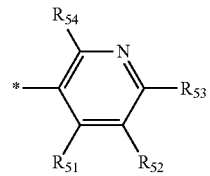
(A-2)

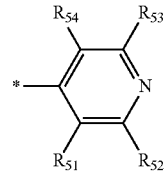
(A-3)

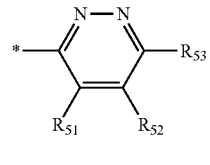
(A-4)

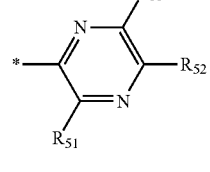
(A-5)

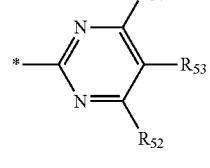
(A-6)

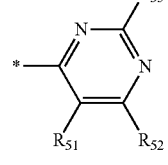
(A-7)

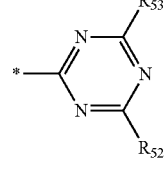
(A-8)

-continued
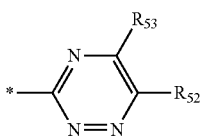
(A-9)
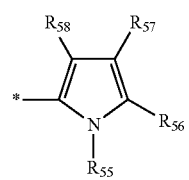
(A-10)
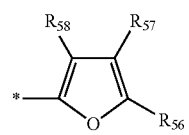
(A-11)
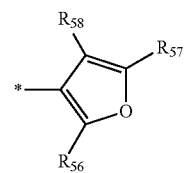
(A-12)
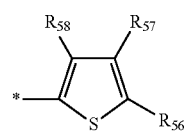
(A-13)
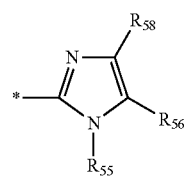
(A-14)
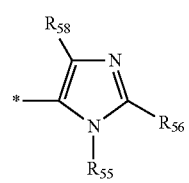
(A-15)
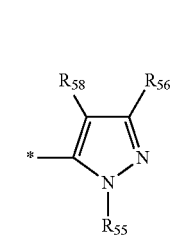
(A-16)
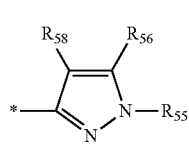
(A-17)
-continued
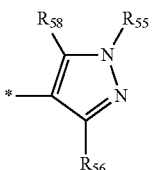
(A-18)
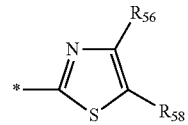
(A-19)
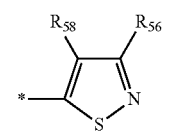
(A-20)
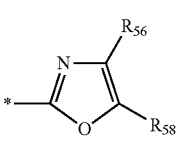
(A-21)
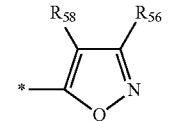
(A-22)
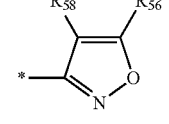
(A-23)
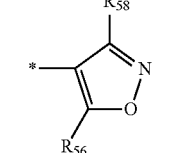
(A-24)
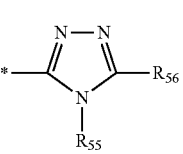
(A-25)
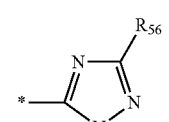
(A-26)
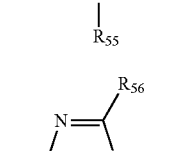
(A-27)
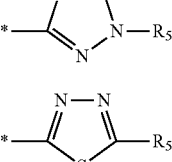
(A-28)

-continued (A-29) 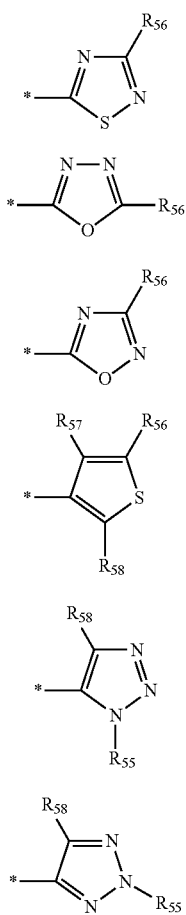

(A-30)

(A-31)

(A-32)

(A-33)

(A-34)

wherein

R$_{51}$ to R$_{58}$ each represents a hydrogen atom or a substituent, adjacent substituents may be connected to each other to form a 5- or 6-membered ring, and

* shows the point of attachment to the azo group in the general formula (2).

2. The azo pigment according to claim 1, a tautomer, salt, or hydrate thereof, wherein A$_2$ represents any one of the following general formulae (A-1) to (A-5), (A-7), (A-10) to (A-18), (A-20), (A-22) to (A-26), and (A-32) to (A-34):

(A-1) 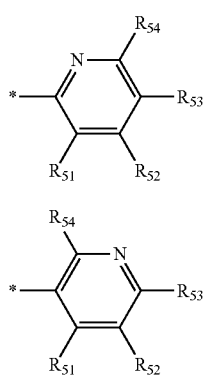

(A-2)

-continued (A-3) 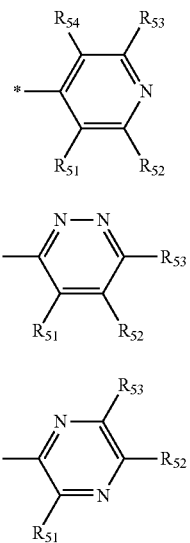

(A-4)

(A-5)

(A-7)

(A-10) 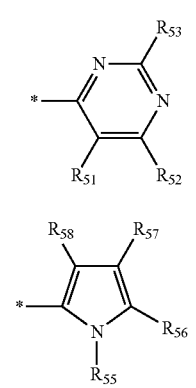

(A-11) 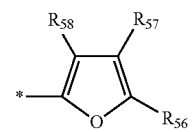

(A-12) 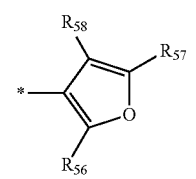

(A-13) 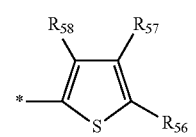

(A-14) 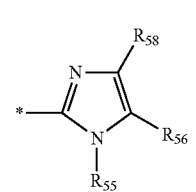

-continued

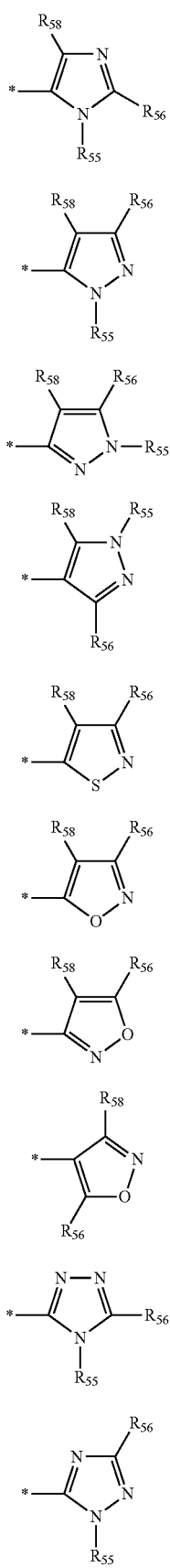

(A-15)
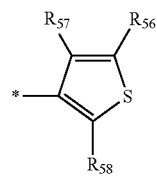

(A-16)
(A-17)
(A-18)
(A-20)
(A-22)
(A-23)
(A-24)
(A-25)
(A-26)

-continued (A-32)
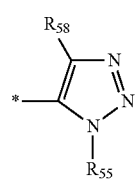

(A-33)
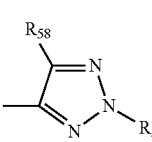

(A-34)

wherein
R$_{55}$ represents a substituent,
R$_{51}$ to R$_{54}$ and R$_{56}$ to R$_{58}$ each independently represents a hydrogen atom or a substituent,
adjacent substituents may be connected to each other to form a 5- or 6-membered ring, and
* shows the point of attachment to the azo group in the general formula (2).

3. The azo pigment according to claim 1, a tautomer, salt, or hydrate thereof, wherein A$_2$ represents the following general formula (A-16):

(A-16)
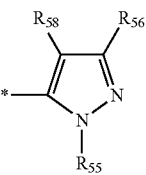

wherein
R$_{55}$ represents a substituent,
R$_{56}$ and R$_{58}$ each independently represents a hydrogen atom or a substituent, and
* shows the point of attachment to the azo group in the general formula (2).

4. A pigment dispersion comprising at least one azo pigment according to claim 1, a tautomer, salt, or hydrate thereof.

5. An ink for inkjet recording using the pigment dispersion according to claim 4.

6. A coloring composition comprising at least one azo pigment according to claim 1, a tautomer, salt, or hydrate thereof.

7. A coloring composition for color filter using the coloring composition according to claim 6.

8. The coloring composition for color filter according to claim 7, further comprising a polymerizable compound and a solvent.

9. The coloring composition for color filter according to claim 8, wherein the azo pigment represented by the foregoing general formula (1) in an amount of from 0.01 to 2 parts by weight per 1 part by weight of the polymerizable compound.

10. A color filter comprising the coloring composition for filter according to claim 9.

11. The coloring composition for color filter according to claim 8, wherein the polymerizable compound is a light-sensitive compound.

12. The coloring composition for color filter according to claim 7, further comprising one or more dispersants selected from the group consisting of surfactants, silicone series additives, pigment series additives, silane series coupling agents, and titanium series coupling agents.

13. A process of preparing the coloring composition for color filter according to claim 7, comprising:
   obtaining a pigment dispersion by dispersing one or more dispersants selected from the group consisting of surfactants, silicone series additives, pigment series additives, silane series coupling agents, and titanium series coupling agents, and an azo compound represented by the general formula (1) in part of a solvent; and
   mixing the pigment dispersion with a polymerizable compound and the rest of the solvent.

14. An azo compound represented by the general formula (2), a tautomer, salt, or hydrate thereof:

General Formula (2)

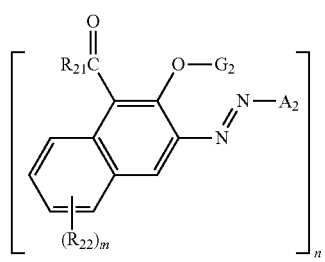

wherein $G_2$ represents a hydrogen atom, an aliphatic group, an aryl group, or a heterocyclic group, $R_{21}$ represents an aryl amino group containing a total of from 6 to 14 carbon atoms, a saturated or unsaturated heterocyclic amino group containing a total of from 2 to 12 carbon atoms, an aliphatic on/ group, an aliphatic group, an aryl group, or a heterocyclic group, $R_{22}$ represents a substituent, $A_2$ represents any one of the following general formulae (A-1) to (A-34), m represents an integer of from 0 to 5, n represents an integer of from 1 to 4 and, when n=2, the general formula (2) represents a dimer formed through $R_{21}$, $R_{22}$, $G_2$, or $A_2$ and, when n=3, the general formula represents a trimer formed through $R_{21}$, $R_{22}$, $G_2$, or $A_2$ and, when n=4, the general formula represents a tetramer formed through $R_{21}$, $R_{22}$, $G_2$, or $A_2$:

(A-1)

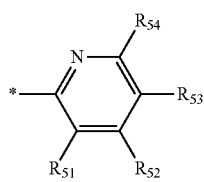

(A-2)

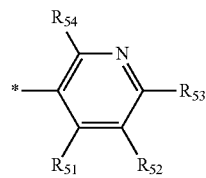

(A-3)

(A-4)

(A-5)

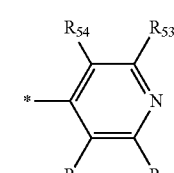

(A-6)

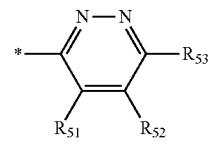

(A-7)

(A-8)

(A-9)

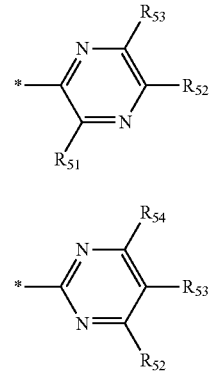

(A-10)

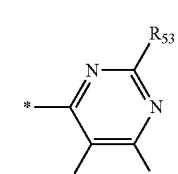
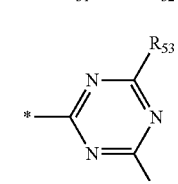
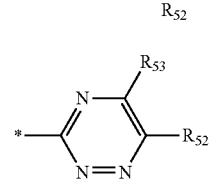
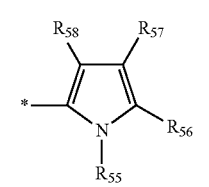

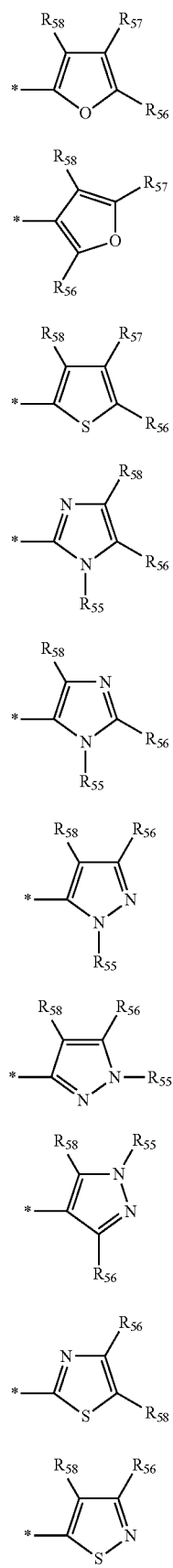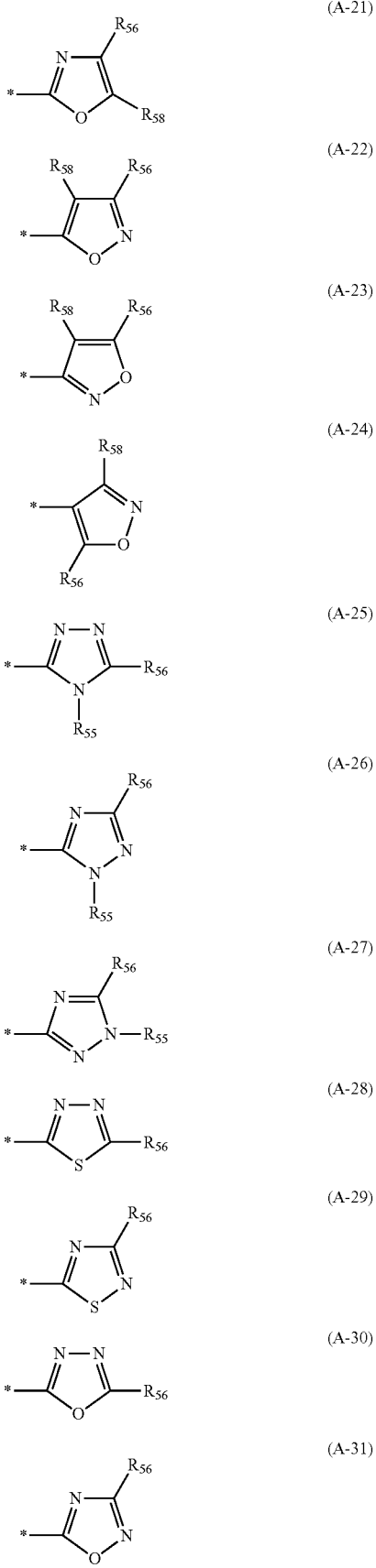

-continued

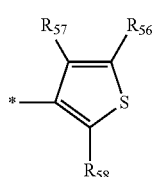
(A-32)

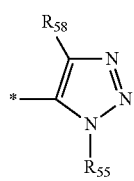
(A-33)

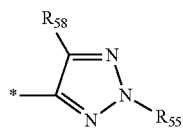
(A-34)

wherein
$R_{51}$ to $R_{58}$ each represents a hydrogen atom or a substituent,
adjacent substituents may be connected to each other to form a 5- or 6-membered ring, and
\* shows the point of attachment to the azo group in the general formula (2).

15. The azo compound according to claim 14 represented by the general formula (2), which is an azo compound represented by a following general formula (2'), a tautomer, salt, or hydrate thereof:

General Formula (2')

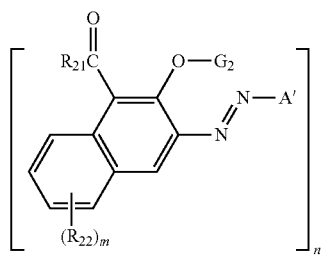

wherein
$G_2$ represents a hydrogen atom, an aliphatic group, an aryl group, or a heterocyclic group,
$R_{21}$ represents an aryl amino group containing a total of from 6 to 14 carbon atoms, a saturated or unsaturated heterocyclic amino group containing a total of from 2 to 12 carbon atoms, an aliphatic oxy group, an aliphatic group, an aryl group, or a heterocyclic group,
$R_{22}$ represents a substituent,
A' represents any one of the following general formulae (A-1) to (A-5), (A-7), (A-10) to (A-18), (A-20), (A-22) to (A-26), and (A-32) to (A-34),
m represents an integer of from 0 to 5, and
n represents an integer of from 1 to 4 and, when n=2, the general formula (2') represents a dimer formed through $R_{21}$, $R_{22}$, $G_2$, or A' and, when n=3, the general formula represents a trimer formed through $R_{21}$, $R_{22}$, $G_2$, or A' and, when n=4, the general formula represents a tetramer formed through $R_{21}$, $R_{22}$, $G_2$, or A':

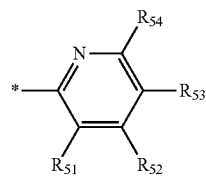
(A-1)

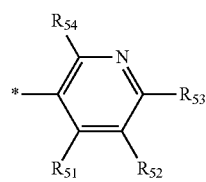
(A-2)

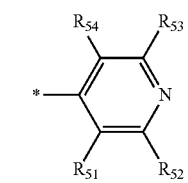
(A-3)

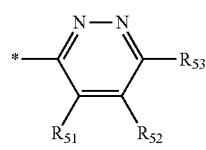
(A-4)

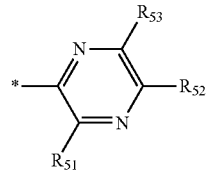
(A-5)

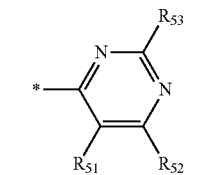
(A-7)

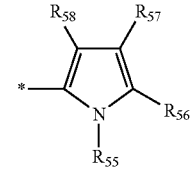
(A-10)

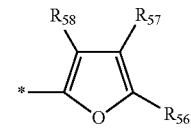
(A-11)

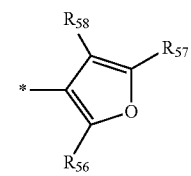
(A-12)

wherein

R$_{55}$ represents a substituent,

R$_{51}$ to R$_{54}$ and R$_{56}$ to R$_{58}$ each independently represents a hydrogen atom or a substituent, adjacent substituents may be connected to each other to form a 5- or 6-membered ring, and

* shows the point of attachment to the azo group in the general formula (2').

16. The azo compound according to claim 15 represented by the general formula (2'), which is an azo compound represented by a following general formula (3), a tautomer, salt, or hydrate thereof:

wherein $R_{21}$, $R_{22}$, $R_{55}$, $R_{56}$, m, and n are the same as those defined with respect to the general formula (2'), and Z represents an electron-withdrawing group having a Hammett σp value of 0.2 or more and, when n=2, the general formula (3) represents a dimer formed through $R_{21}$, $R_{22}$, $R_{55}$, $R_{56}$, or Z and, when n=3, the general formula represents a trimer formed through $R_{21}$, $R_{22}$, $R_{55}$, $R_{56}$, or Z and, when n=4, the general formula represents a tetramer formed through $R_{21}$, $R_{22}$, $R_{55}$, $R_{56}$, or Z.

* * * * *